US012645340B2

(12) United States Patent
Blachnitzky et al.

(10) Patent No.: US 12,645,340 B2
(45) Date of Patent: Jun. 2, 2026

(54) METHOD AND DEVICE FOR FACILITATING INTERACTIONS WITH A PERIPHERAL DEVICE

(71) Applicant: Apple Inc., Cupertino, CA (US)

(72) Inventors: Benjamin R. Blachnitzky, San Francisco, CA (US); Aaron M. Burns, Sunnyvale, CA (US); Anette L. Freiin von Kapri, Mountain View, CA (US); Arun Rakesh Yoganandan, San Francisco, CA (US); Benjamin H. Boesel, Sunnyvale, CA (US); Evgenii Krivoruchko, Cupertino, CA (US); Jonathan Ravasz, Sunnyvale, CA (US); Shih-Sang Chiu, Menlo Park, CA (US); Stephen O. Lemay, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/950,770

(22) Filed: Sep. 22, 2022

(65) Prior Publication Data

US 2023/0095282 A1 Mar. 30, 2023

Related U.S. Application Data

(60) Provisional application No. 63/280,729, filed on Nov. 18, 2021, provisional application No. 63/248,225, filed on Sep. 24, 2021.

(51) Int. Cl.
*G06F 3/04815* (2022.01)
*G06F 3/01* (2006.01)
*G06T 19/00* (2011.01)

(52) U.S. Cl.
CPC .......... *G06F 3/04815* (2013.01); *G06F 3/013* (2013.01); *G06T 19/00* (2013.01)

(58) Field of Classification Search
CPC ...... G06F 3/04815; G06F 3/013; G06F 3/011; G06T 19/00
USPC .......................................... 715/848
See application file for complete search history.

(56) References Cited

U.S. PATENT DOCUMENTS

| 10,334,076 B2 | 6/2019 | Mckenzie et al. | |
| 10,531,262 B2 * | 1/2020 | Cho | G06F 3/0482 |
| 10,852,828 B1 | 12/2020 | Gatson et al. | |
| 2007/0092243 A1 * | 4/2007 | Allen | G06F 3/04892 396/147 |

(Continued)

*Primary Examiner* — Stephen S Hong
*Assistant Examiner* — Broderick C Anderson
(74) *Attorney, Agent, or Firm* — Fernando & Partners, LLP

(57) ABSTRACT

In one implementation, a method for displaying a first pairing affordance that is world-locked to a first peripheral device. The method may be performed by an electronic device including a non-transitory memory, one or more processors, a display, and one or more input devices. The method includes detecting the first peripheral device within a three-dimensional (3D) environment via a computer vision technique. The method includes receiving, via the one or more input devices, a first user input that is directed to the first peripheral device within the 3D environment. The method includes, in response to receiving the first user input, displaying, on the display, the first pairing affordance that is world-locked to the first peripheral device within the 3D environment.

20 Claims, 58 Drawing Sheets

(56)         References Cited

U.S. PATENT DOCUMENTS

| 2011/0037712 | A1* | 2/2011 | Kim | G06F 3/0488 |
| | | | | 345/173 |
| 2015/0133051 | A1* | 5/2015 | Jamal-Syed | H04M 1/72427 |
| | | | | 455/41.2 |
| 2015/0319554 | A1* | 11/2015 | Blanche | H04W 4/80 |
| | | | | 455/41.2 |
| 2017/0244811 | A1* | 8/2017 | Mckenzie | H04W 76/14 |
| 2018/0181199 | A1* | 6/2018 | Harvey | G06F 3/014 |
| 2020/0301553 | A1* | 9/2020 | Taylor | G06F 3/04812 |
| 2021/0160938 | A1 | 5/2021 | Anchan et al. | |
| 2021/0201581 | A1* | 7/2021 | Xie | G06T 19/20 |

* cited by examiner

Figure 2:
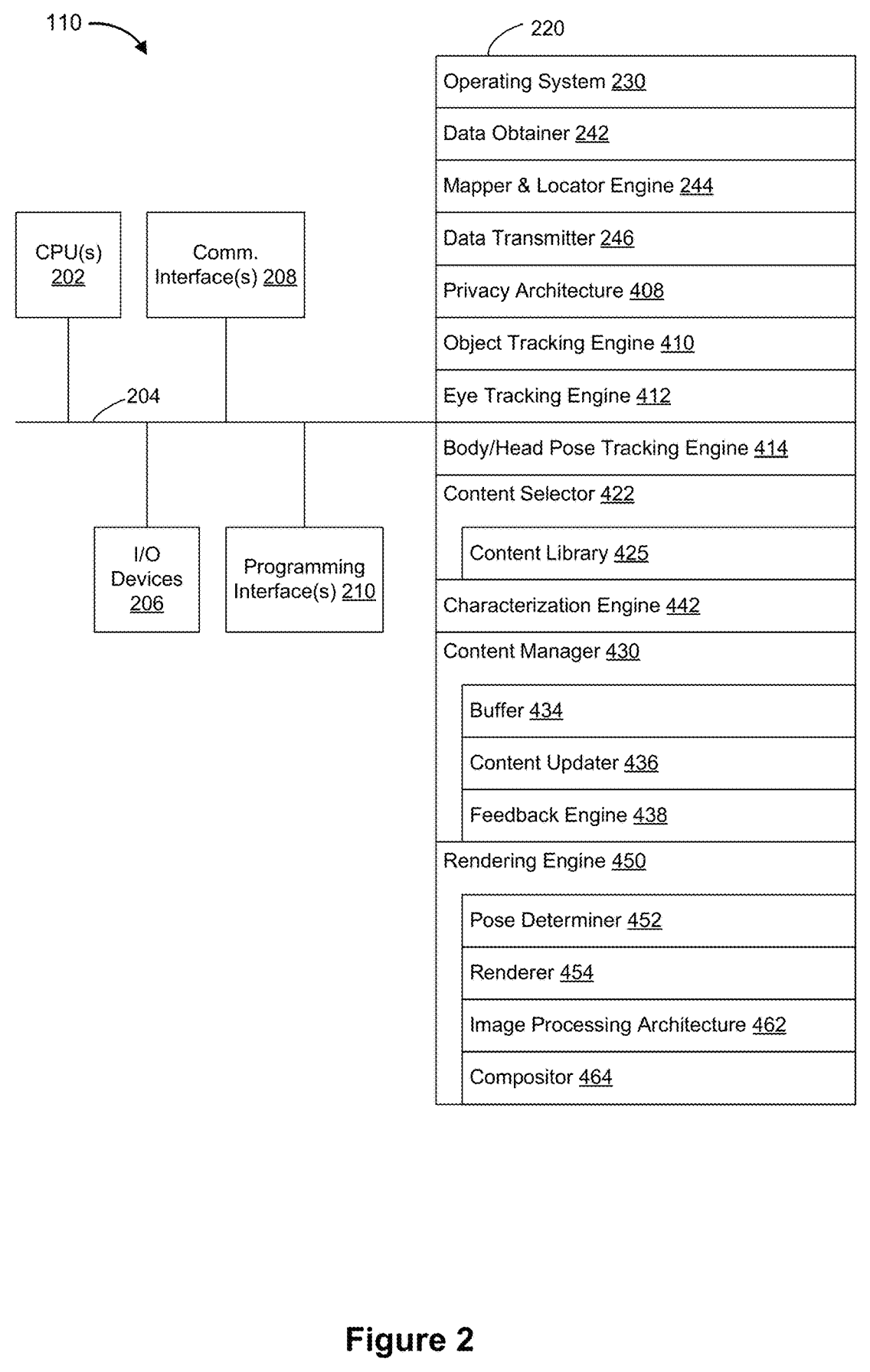

| Operating System 230 |
| Data Obtainer 242 |
| Mapper & Locator Engine 244 |
| Data Transmitter 246 |
| Privacy Architecture 408 |
| Object Tracking Engine 410 |
| Eye Tracking Engine 412 |
| Body/Head Pose Tracking Engine 414 |

CPU(s) 202

Comm. Interface(s) 208

204

I/O Devices 206

Programming Interface(s) 210

| Content Selector 422 |
| --- |
| Content Library 425 |
| Characterization Engine 442 |
| Content Manager 430 |
| Buffer 434 |
| Content Updater 436 |
| Feedback Engine 438 |
| Rendering Engine 450 |
| Pose Determiner 452 |
| Renderer 454 |
| Image Processing Architecture 462 |
| Compositor 464 |

Object Tracking Vector 411

| Timestamp 471 | Object Descriptor(s) 472 | Translational Value(s) 474 | Rotational Value(s) 476 | Misc. 478 |
|---|---|---|---|---|

Eye Tracking Vector 413

| Timestamp 481 | Angular Value(s) 482 | Translational Values 484 | Misc. 486 |
|---|---|---|---|

Pose Char. Vector 415

| Timestamp 491 | Head Pose Descriptor 492A | Translational Values for Head Pose 492B | Rotational Values for Head Pose 492C | Body Pose Descriptor 494A | Translational Values for Body Sections/ Extremities/Limbs/ Joints 494B | Rotational Values for Body Sections/ Extremities/Limbs/ Joints 494C | Misc. 496 |
|---|---|---|---|---|---|---|---|

Char. Vector 443

| Timestamp 4101 | Object Tracking Info 4102 | Gaze Direction Info 4104 | Head Pose Info 4106A | Body Pose Info 4106B | Extremity Tracking Info 4106C | Location Info 4108 | Misc. 4109 |
|---|---|---|---|---|---|---|---|

600

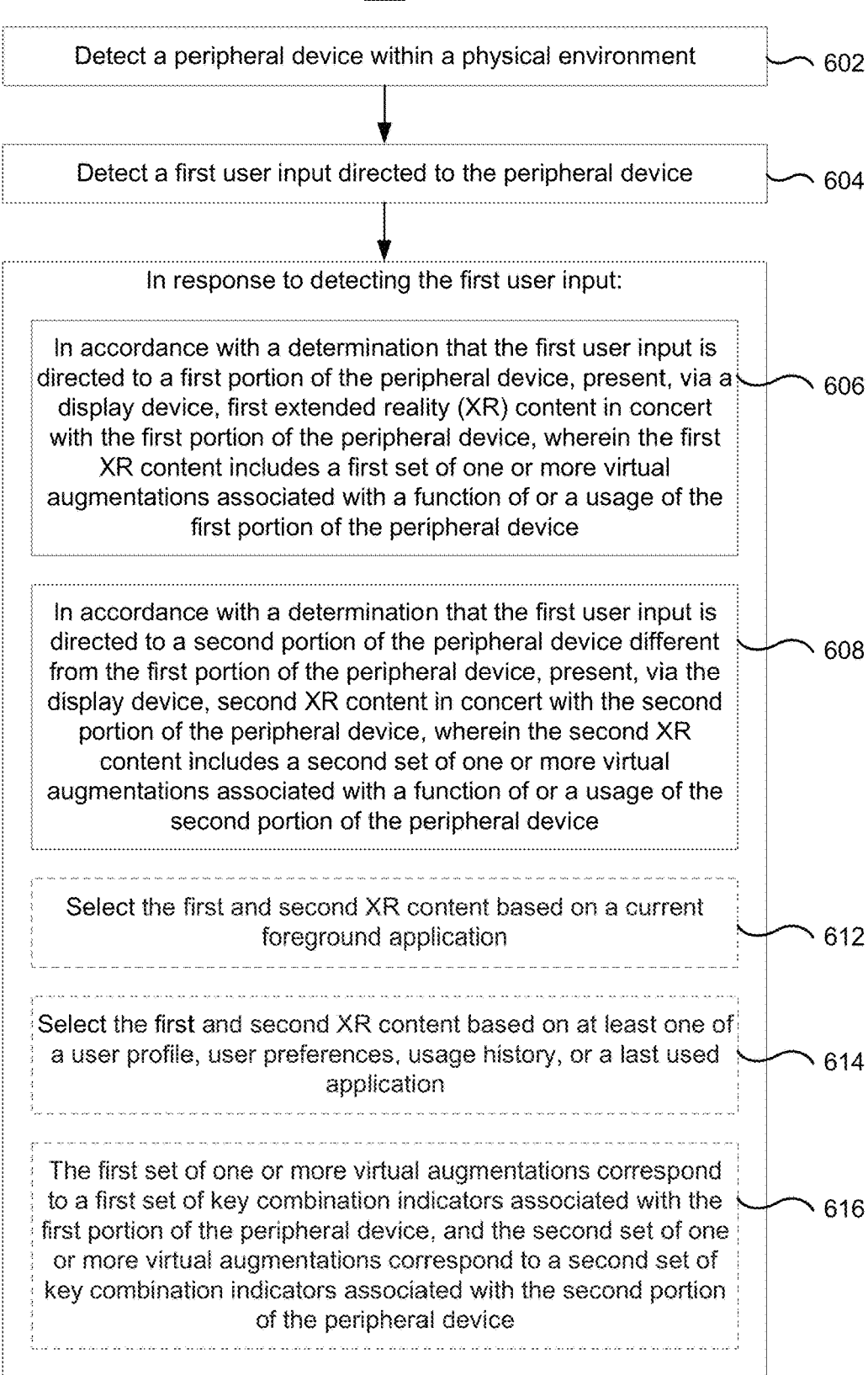

Detect a peripheral device within a physical environment — 602

Detect a first user input directed to the peripheral device — 604

In response to detecting the first user input:

In accordance with a determination that the first user input is directed to a first portion of the peripheral device, present, via a display device, first extended reality (XR) content in concert with the first portion of the peripheral device, wherein the first XR content includes a first set of one or more virtual augmentations associated with a function of or a usage of the first portion of the peripheral device — 606

In accordance with a determination that the first user input is directed to a second portion of the peripheral device different from the first portion of the peripheral device, present, via the display device, second XR content in concert with the second portion of the peripheral device, wherein the second XR content includes a second set of one or more virtual augmentations associated with a function of or a usage of the second portion of the peripheral device — 608

Select the first and second XR content based on a current foreground application — 612

Select the first and second XR content based on at least one of a user profile, user preferences, usage history, or a last used application — 614

The first set of one or more virtual augmentations correspond to a first set of key combination indicators associated with the first portion of the peripheral device, and the second set of one or more virtual augmentations correspond to a second set of key combination indicators associated with the second portion of the peripheral device — 616

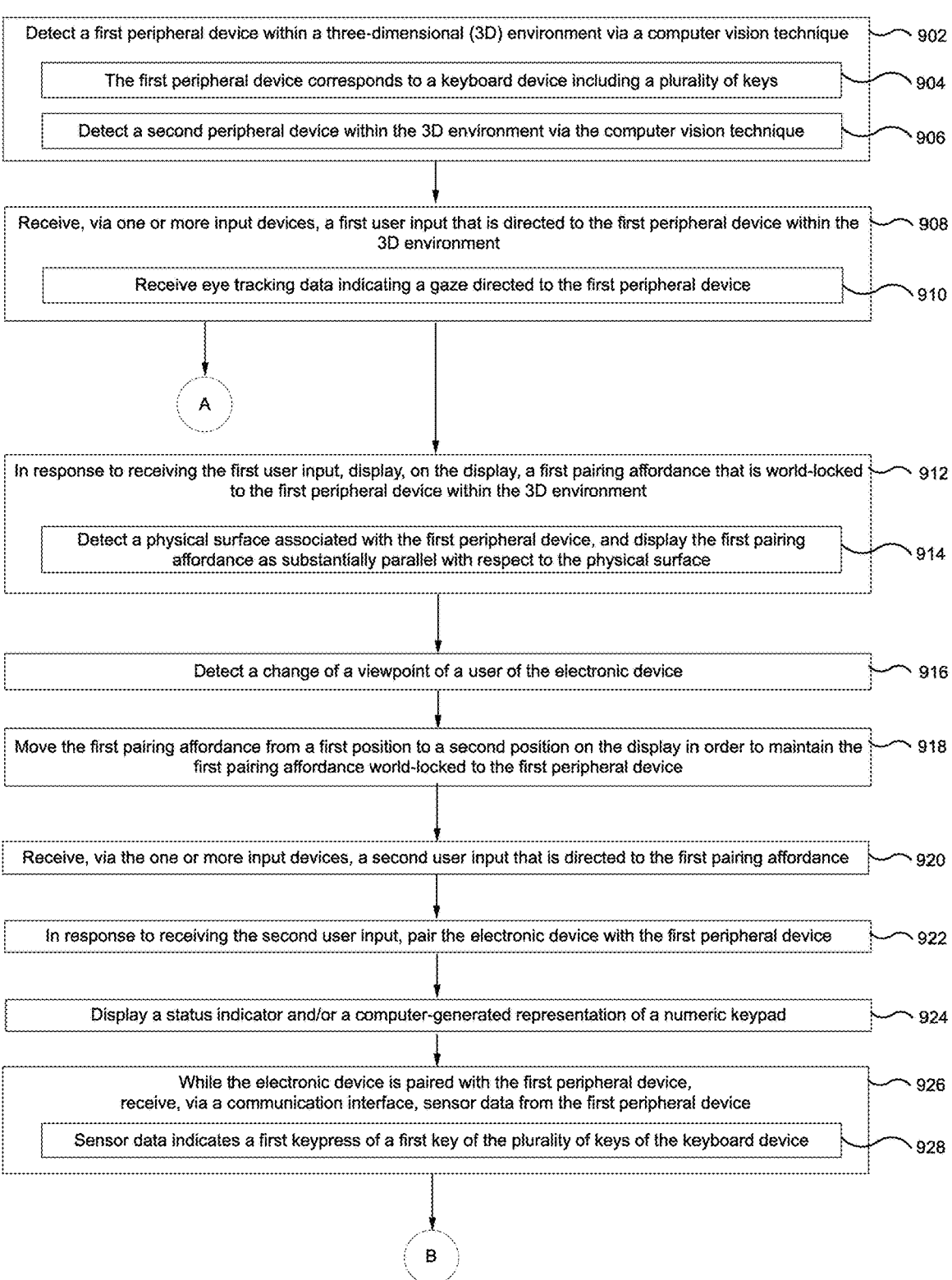

Detect a first peripheral device within a three-dimensional (3D) environment via a computer vision technique — 902

The first peripheral device corresponds to a keyboard device including a plurality of keys — 904

Detect a second peripheral device within the 3D environment via the computer vision technique — 906

Receive, via one or more input devices, a first user input that is directed to the first peripheral device within the 3D environment — 908

Receive eye tracking data indicating a gaze directed to the first peripheral device — 910

A

In response to receiving the first user input, display, on the display, a first pairing affordance that is world-locked to the first peripheral device within the 3D environment — 912

Detect a physical surface associated with the first peripheral device, and display the first pairing affordance as substantially parallel with respect to the physical surface — 914

Detect a change of a viewpoint of a user of the electronic device — 916

Move the first pairing affordance from a first position to a second position on the display in order to maintain the first pairing affordance world-locked to the first peripheral device — 918

Receive, via the one or more input devices, a second user input that is directed to the first pairing affordance — 920

In response to receiving the second user input, pair the electronic device with the first peripheral device — 922

Display a status indicator and/or a computer-generated representation of a numeric keypad — 924

While the electronic device is paired with the first peripheral device, receive, via a communication interface, sensor data from the first peripheral device — 926

Sensor data indicates a first keypress of a first key of the plurality of keys of the keyboard device — 928

METHOD AND DEVICE FOR FACILITATING INTERACTIONS WITH A PERIPHERAL DEVICE

CROSS-REFERENCE TO RELATED APPLICATIONS

This application claims priority to U.S. Provisional Patent App. No. 63/280,729, filed on Nov. 18, 2021 and to U.S. Provisional Patent App. No. 63/248,225, filed on Sep. 24, 2021, both of which are hereby incorporated by reference in their entirety.

TECHNICAL FIELD

The present disclosure generally relates to interacting with a peripheral device, in particular, interacting with the peripheral device via one or more user interfaces.

BACKGROUND

An electronic device may provide various user interfaces that enable user interactions with peripheral devices. For example, the electronic device and the peripheral devices are included in a particular environment, such that the electronic device may communicate with the peripheral devices. However, the user interfaces provide inefficient and unintuitive user interactions. For example, the electronic device displays a pairing menu including selection options for pairing the electronic device with one of the peripheral devices. However, the selection options and the display position of the pairing menu are independent of user engagement with respect to the particular environment, resulting in a degraded user experience. Additionally, the user interfaces fail to inform a user of hot key combinations or accelerators associated with a particular peripheral device, further degrading the user experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1 is a block diagram of an example operating architecture in accordance with some implementations.

FIG. 2 is a block diagram of an example controller in accordance with some implementations.

FIG. 4B illustrates example data structures in accordance with some implementations.

FIG. 6 is a flowchart representation of a method of presenting virtual augmentations associated with a function of or a usage of a portion of the peripheral device in accordance with some implementations.

FIGS. 9A and 9B illustrate a flowchart representation of a method of displaying one or more pairing affordances world-locked to respective peripheral devices in accordance with some implementations.

Figure 3:
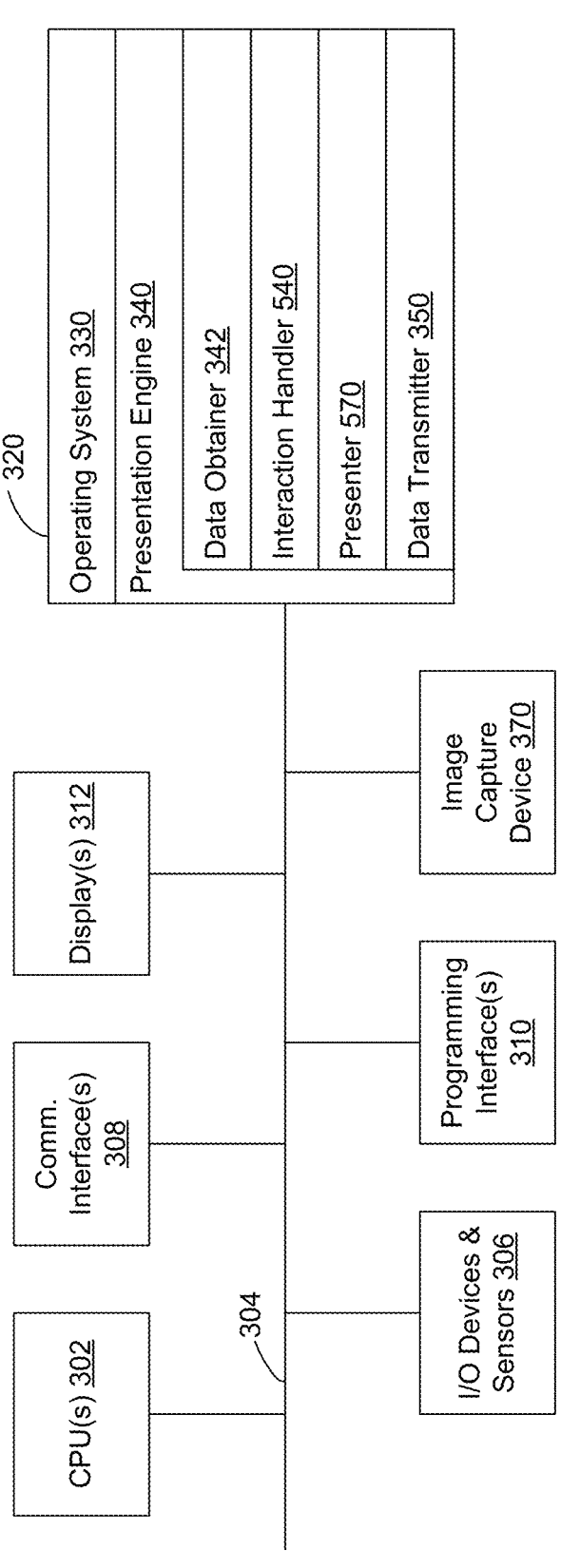
FIG. 3 is a block diagram of an example electronic device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for presenting virtual augmentations associated with a function of or a usage of a portion of the peripheral device. According to some implementations, the method is performed at a computing system including non-transitory memory and one or more processors, wherein the computing system is communicatively coupled to a display device and one or more input devices. The method includes: detecting a peripheral device within a physical environment; detecting a first user input directed to the peripheral device; and in response to detecting the first user input: in accordance with a determination that the first user input is directed to a first portion of the peripheral device, presenting, via the display device, first extended reality (XR) content in concert with the first portion of the peripheral device, wherein the first XR content includes a first set of one or more virtual augmentations associated with a function of or a usage of the first portion of the peripheral device; and in accordance with a determination that the first user input is directed to a second portion of the peripheral device different from the first portion of the peripheral device, presenting, via the display device, second XR content in concert with the second portion of the peripheral device, wherein the second XR content includes a second set of one or more virtual augmentations associated with a function of or a usage of the second portion of the peripheral device.

Various implementations disclosed herein include devices, systems, and methods for displaying a pairing affordance that is world-locked to a peripheral device, to enable pairing with the peripheral device. According to some implementations, the method is performed at an electronic device including a non-transitory memory, one or more processors, a display, and one or more input devices. The method includes detecting a first peripheral device within a three-dimensional (3D) environment via a computer vision technique. The method includes receiving, via the one or more input devices, a first user input that is directed to the first peripheral device within the 3D environment. The method includes, in response to receiving the first user input, displaying, on the display, a first pairing affordance that is world-locked to the first peripheral device within the 3D environment.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1:
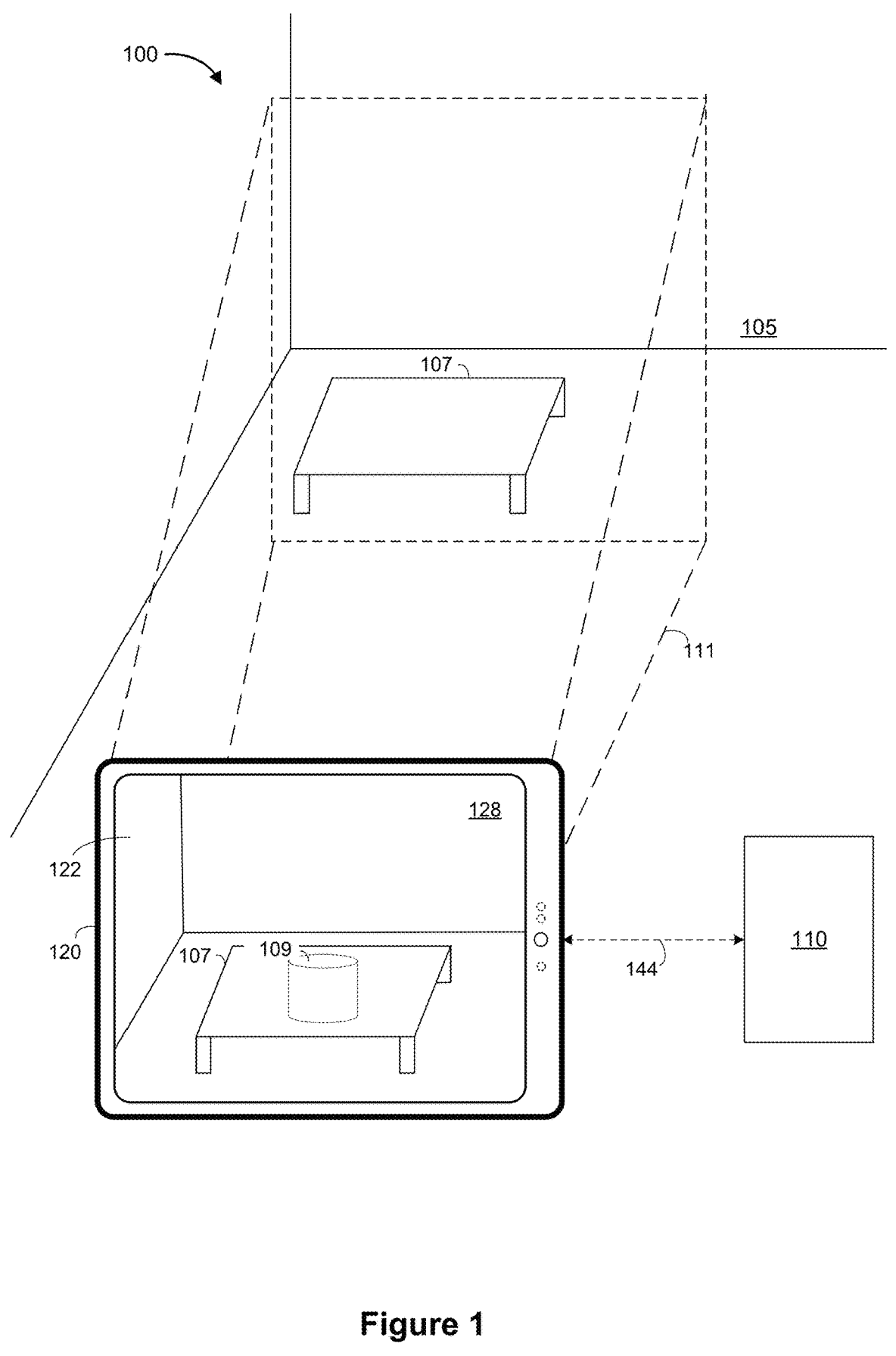

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in their hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107 or a representation thereof) on a display 122. For example, the XR environment 128, including the XR cylinder 109, is volumetric or three-dimensional (3D).

In one example, the XR cylinder 109 corresponds to head/display-locked content such that the XR cylinder 109 remains displayed at the same location on the display 122 as the FOV 111 changes due to translational and/or rotational movement of the electronic device 120. As another example, the XR cylinder 109 corresponds to world/object-locked content such that the XR cylinder 109 remains displayed at its origin location as the FOV 111 changes due to translational and/or rotational movement of the electronic device 120. As such, in this example, if the FOV 111 does not include the origin location, the displayed XR environment 128 will not include the XR cylinder 109. As another example, the XR cylinder 109 corresponds to body-locked content such that it remains at a positional and rotational offset from the body of the user 150. In some examples, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as their hands. In some implementations, the input data indicates joint positions and/or joint orientations of the user 150. In some implementations, the remote input devices include feedback devices such as speakers, lights, or the like.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/ or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

In some implementations, a privacy architecture 408 is configured to ingest data and filter user information and/or identifying information within the data based on one or more privacy filters. The privacy architecture 408 is described in more detail below with reference to FIG. 4A. To that end, in various implementations, the privacy architecture 408 includes instructions and/or logic therefor, and heuristics and metadata therefor.

Figure 4A:
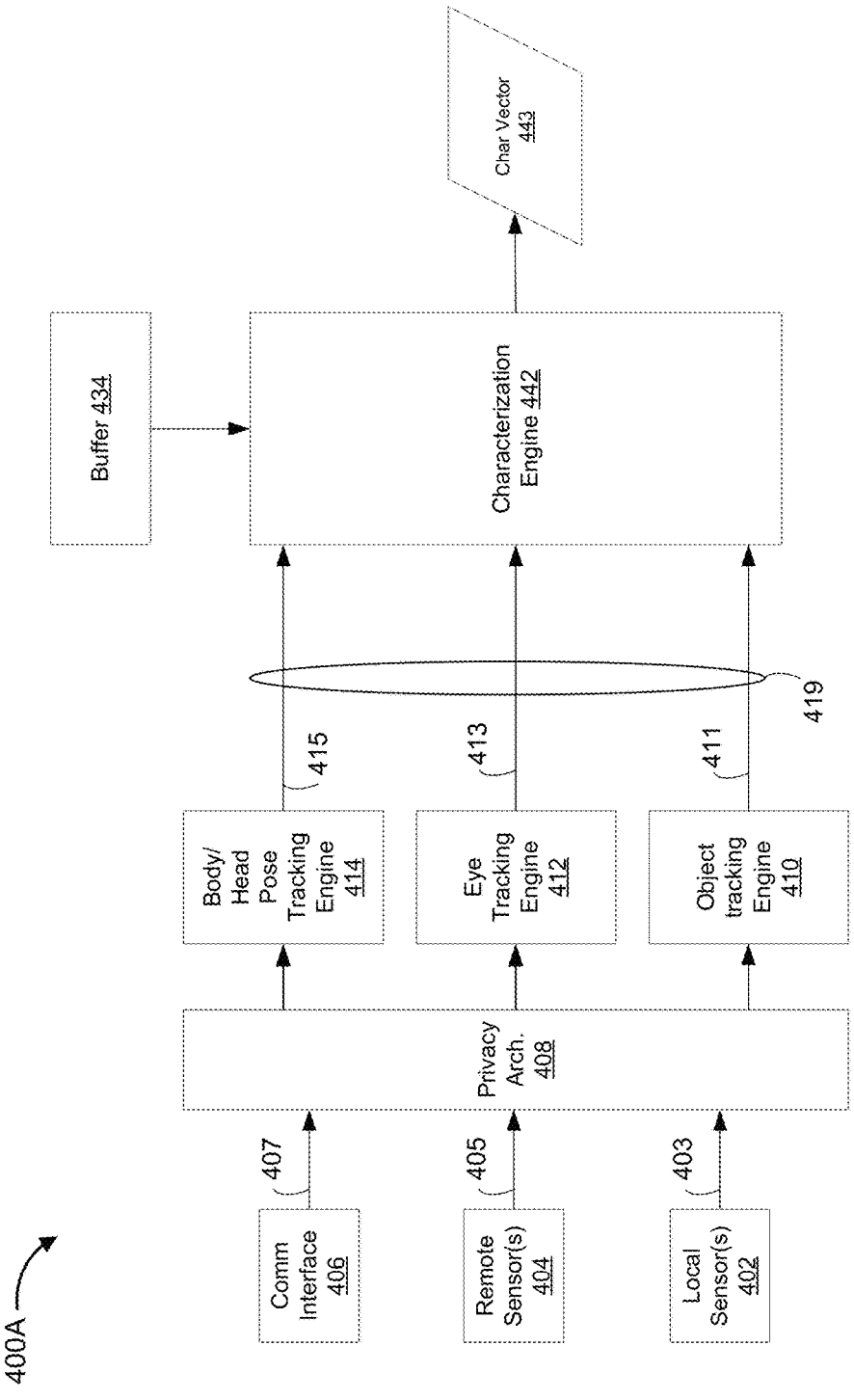
FIG. 4A is a block diagram of a first portion of an example content delivery architecture in accordance with some implementations.

In some implementations, an object tracking engine 410 is configured to localize and track one or more physical objects within the physical environment 105 by obtaining (e.g., receiving, retrieving, or determining/generating) an object tracking vector 411 as shown in FIG. 4B based on the input data and update the object tracking vector 411 over time. According to some implementations, the one or more physical objects within the physical environment 105 correspond to peripheral devices such as a keyboard, a mouse, a touch-sensitive surface (TSS) such as a trackpad or touchscreen, a joystick, a game controller, or the like. For example, as shown in FIG. 4B, the object tracking vector 411 includes one or more object descriptors 472 (e.g., a label for each of the one or more tracked physical objects), translational values 474 for each of the one or more tracked physical objects, rotational values 476 for each of the one or more tracked physical objects, and/or the like. The object tracking engine 410 is described in more detail below with reference to FIG. 4A. To that end, in various implementations, the object tracking engine 410 includes instructions and/or logic therefor, and heuristics and metadata therefor.

In some implementations, an eye tracking engine 412 is configured to obtain (e.g., receive, retrieve, or determine/generate) an eye tracking vector 413 as shown in FIG. 4B (e.g., with a gaze direction) based on the input data and update the eye tracking vector 413 over time. For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking. The eye tracking engine 412 is described in more detail below with reference to FIG. 4A. To that end, in various implementations, the eye tracking engine 412 includes instructions and/or logic therefor, and heuristics and metadata therefor.

In some implementations, a body/head pose tracking engine 414 is configured to obtain (e.g., receive, retrieve, or determine/generate) a pose characterization vector 415 based on the input data and update the pose characterization vector 415 over time. For example, as shown in FIG. 4B, the pose characterization vector 415 includes a head pose descriptor 492A (e.g., upward, downward, neutral, etc.), translational values 492B for the head pose, rotational values 492C for the head pose, a body pose descriptor 494A (e.g., standing, sitting, prone, etc.), translational values 494B for body sections/extremities/limbs/joints, rotational values 494C for the body sections/extremities/limbs/joints, and/or the like. The body/head pose tracking engine 414 is described in more detail below with reference to FIG. 4A. To that end, in various implementations, the body/head pose tracking engine 414 includes instructions and/or logic therefor, and heuristics and metadata therefor. In some implementations, the object tracking engine 410, the eye tracking engine 412, and the body/head pose tracking engine 414 may be located on the electronic device 120 in addition to or in place of the controller 110.

In some implementations, a content selector 422 is configured to select XR content (sometimes also referred to herein as "graphical content" or "virtual content") from a content library 425 based on one or more user requests and/or inputs (e.g., a voice command, a selection from a user interface (UI) menu of XR content items or virtual agents (VAs), and/or the like). The content selector 422 is described in more detail below with reference to FIG. 4A. To that end, in various implementations, the content selector 422 includes instructions and/or logic therefor, and heuristics and metadata therefor.

In some implementations, the content library 425 includes a plurality of content items such as audio/visual (A/V) content, VAs, and/or XR content, objects, items, scenery, etc. As one example, the XR content includes 3D reconstructions of user captured videos, movies, TV episodes, and/or other XR content. In some implementations, the content library 425 is pre-populated or manually authored by the user 150. In some implementations, the content library 425 is located local relative to the controller 110. In some implementations, the content library 425 is located remote from the controller 110 (e.g., at a remote server, a cloud server, or the like).

In some implementations, the characterization engine 442 is configured to determine/generate a characterization vector 443 based on at least one of the object tracking vector 411, the eye tracking vector 413, the pose characterization vector 415, and information associated with one or more past frames or instances from the buffer 434 as shown in FIG. 4A. In some implementations, the characterization engine 442 is also configured to update the characterization vector 443 over time. As shown in FIG. 4B, the characterization vector 443 includes object tracking information 4102, gaze direction information 4104, head pose information 4106A, body pose information 4106B, extremity tracking information 4106C, location information 4108, and/or the like. The characterization engine 442 is described in more detail below with reference to FIG. 4A. To that end, in various implementations, the characterization engine 442 includes instructions and/or logic therefor, and heuristics and metadata therefor.

In some implementations, a content manager 430 is configured to manage and update the layout, setup, structure, and/or the like for the XR environment 128 including one or more of VA(s), XR content, one or more user interface (UI) elements associated with the XR content, and/or the like. The content manager 430 is described in more detail below with reference to FIG. 4C. To that end, in various implementations, the content manager 430 includes instructions and/or logic therefor, and heuristics and metadata therefor. In some implementations, the content manager 430 includes a buffer 434, a content updater 436, and a feedback engine 438. In some implementations, the buffer 434 includes XR content, a rendered image frame, and/or the like for one or more past instances and/or frames.

In some implementations, the content updater 436 is configured to modify the XR environment 128 over time based on translational or rotational movement of the electronic device 120 or physical objects within the physical environment 105, user inputs (e.g., a change in context, hand/extremity tracking inputs, eye tracking inputs, touch inputs, voice commands, modification/manipulation inputs directed to the one or more tracked objects, modification/manipulation inputs directed to XR content, and/or the like), and/or the like. To that end, in various implementations, the content updater 436 includes instructions and/or logic therefor, and heuristics and metadata therefor.

In some implementations, the feedback engine 438 is configured to generate sensory feedback (e.g., visual feedback such as text or lighting changes, audio feedback, haptic feedback, etc.) associated with the XR environment 128. To that end, in various implementations, the feedback engine 438 includes instructions and/or logic therefor, and heuristics and metadata therefor.

In some implementations, a rendering engine 450 is configured to render an XR environment 128 (sometimes also referred to herein as a "graphical environment" or "virtual environment") or image frame associated therewith as well as the VA(s), XR content, one or more UI elements associated with the XR content, and/or the like. To that end, in various implementations, the rendering engine 450 includes instructions and/or logic therefor, and heuristics and metadata therefor. In some implementations, the rendering engine 450 includes a pose determiner 452, a renderer 454, an optional image processing architecture 462, and an optional compositor 464. One of ordinary skill in the art will appreciate that the optional image processing architecture 462 and the optional compositor 464 may be present for video pass-through configurations but may be removed for fully VR or optical see-through configurations.

In some implementations, the pose determiner 452 is configured to determine a current camera pose of the electronic device 120 and/or the user 150 relative to the A/V content and/or XR content. The pose determiner 452 is described in more detail below with reference to FIG. 4A. To that end, in various implementations, the pose determiner 452 includes instructions and/or logic therefor, and heuristics and metadata therefor.

In some implementations, the renderer 454 is configured to render the A/V content and/or the XR content according to the current camera pose relative thereto. The renderer 454 is described in more detail below with reference to FIG. 4A. To that end, in various implementations, the renderer 454 includes instructions and/or logic therefor, and heuristics and metadata therefor.

In some implementations, the image processing architecture 462 is configured to obtain (e.g., receive, retrieve, or capture) an image stream including one or more images of the physical environment 105 from the current camera pose of the electronic device 120 and/or the user 150. In some implementations, the image processing architecture 462 is also configured to perform one or more image processing operations on the image stream such as warping, color correction, gamma correction, sharpening, noise reduction, white balance, and/or the like. The image processing architecture 462 is described in more detail below with reference to FIG. 4A. To that end, in various implementations, the image processing architecture 462 includes instructions and/or logic therefor, and heuristics and metadata therefor.

In some implementations, the compositor 464 is configured to composite the rendered A/V content and/or XR content with the processed image stream of the physical environment 105 from the image processing architecture 462 to produce rendered image frames of the XR environment 128 for display. The compositor 464 is described in more detail below with reference to FIG. 4A. To that end, in various implementations, the compositor 464 includes instructions and/or logic therefor, and heuristics and metadata therefor.

Although the data obtainer 242, the mapper and locator engine 244, the data transmitter 246, the privacy architecture 408, the object tracking engine 410, the eye tracking engine 412, the body/head pose tracking engine 414, the content selector 422, the content manager 430, the operation modality manager 440, and the rendering engine 450 are shown as residing on a single device (e.g., the controller 110), it should be understood that in other implementations, any combination of the data obtainer 242, the mapper and locator engine 244, the data transmitter 246, the privacy architecture 408, the object tracking engine 410, the eye tracking engine 412, the body/head pose tracking engine 414, the content selector 422, the content manager 430, the operation modality manager 440, and the rendering engine 450 may be located in separate computing devices.

In some implementations, the functions and/or components of the controller 110 are combined with or provided by the electronic device 120 shown below in FIG. 3. Moreover, FIG. 2 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 470, an interaction handler 420, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the interaction handler 420 is configured to detect user interactions with a peripheral device within the physical environment 105, presented A/V content, and/or XR content. For example, the user interactions correspond to extremity/hand tracking inputs, eye gaze tracking inputs, touch inputs, voice inputs, and/or the like. In some implementations, the interaction handler 420 is configured to obtain (e.g., receive, or retrieve) and interpret signals from a peripheral device communicatively coupled hereto, wherein the signals correspond to input detection signals associated with touch inputs, keystrokes, etc. detected by the peripheral device. To that end, in various implementations, the interaction handler 420 includes instructions and/or logic therefor, and heuristics and metadata therefor.

In some implementations, the presenter 470 is configured to present and update A/V content and/or XR content (e.g., the rendered image frames associated with the user interface or the XR environment 128 including the VA(s), the XR content, one or more UI elements associated with the XR content, and/or the like) via the one or more displays 312. To that end, in various implementations, the presenter 470 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 420, the presenter 470, and the data transmitter 350 are shown as residing on a single device (e.g., the electronic device 120), it should be understood that in other implementations, any combination of the data obtainer 342, the interaction handler 420, the presenter 470, and the data transmitter 350 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4A is a block diagram of a first portion 400A of an example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof.

As shown in FIG. 4A, one or more local sensors 402 of the controller 110, the electronic device 120, and/or a combination thereof obtain local sensor data 403 associated with the physical environment 105. For example, the local sensor data 403 includes images or a stream thereof of the physical environment 105, simultaneous location and mapping (SLAM) information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 403 includes un-processed or post-processed information.

Similarly, as shown in FIG. 4A, one or more remote sensors 404 associated with the optional remote input devices within the physical environment 105 obtain remote sensor data 405 associated with the physical environment 105. For example, the remote sensor data 405 includes images or a stream thereof of the physical environment 105, SLAM information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 405 includes un-processed or post-processed information.

As shown in FIG. 4A, a communication interface 406 of the controller 110, the electronic device 120, and/or a combination thereof obtains signals 407 from a peripheral device communicatively coupled thereto via one or more wired or wireless communication channels (e.g., BLUETOOTH, ZIGBEE, IEEE 802.11x, IEEE 802.16x, IEEE 802.3x, etc.). For example, the signals 407 include input detection signals associated with touch inputs, keystrokes, etc. detected by the peripheral device.

According to some implementations, the privacy architecture 408 ingests the local sensor data 403, the remote sensor data 405, and the signals 407. In some implementations, the privacy architecture 408 includes one or more privacy filters associated with user information and/or identifying information. In some implementations, the privacy architecture 408 includes an opt-in feature where the electronic device 120 informs the user 150 as to what user information and/or identifying information is being monitored and how the user information and/or the identifying information will be used. In some implementations, the privacy architecture 408 selectively prevents and/or limits the content delivery architecture 400A/400B or portions thereof from obtaining and/or transmitting the user information. To this end, the privacy architecture 408 receives user preferences and/or selections from the user 150 in response to prompting the user 150 for the same. In some implementations, the privacy architecture 408 prevents the content delivery architecture 400A/400B from obtaining and/or transmitting the user information unless and until the privacy architecture 408 obtains informed consent from the user 150. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the object tracking engine 410 obtains the local sensor data 403, the remote sensor data 405, and the signals 407 after having been subjected to the privacy architecture 408. In some implementations, the object tracking engine 410 obtains (e.g., receives, retrieves, or determines/generates) an object tracking vector 411 based on the input data and updates the object tracking vector 411 over time.

FIG. 4B shows an example data structure for the object tracking vector 411 in accordance with some implementations. As shown in FIG. 4B, the object tracking vector 411 may correspond to an N-tuple characterization vector or characterization tensor that includes a timestamp 471 (e.g., the most recent time the object tracking vector 411 was updated), one or more objects descriptors 472 (e.g., a label for each of the one or more tracked physical objects), translational values 474 for each of the one or more tracked physical objects (e.g., x, y, and z values relative to the physical environment 105 or the world-at-large; rate of change of x, y, and z values relative to the physical environment 105 or the world-at-large; etc.), rotational values 476 for each of the one or more tracked physical objects (e.g., roll, pitch, and yaw values; rate of change of roll, pitch, and yaw values; etc.), and/or miscellaneous information 478. One of ordinary skill in the art will appreciate that the data structure for the object tracking vector 411 in FIG. 4B is merely an example that may include different information portions in various other implementations and be structured in myriad ways in various other implementations.

According to some implementations, the eye tracking engine 412 obtains the local sensor data 403 and the remote sensor data 405 after having been subjected to the privacy architecture 408. In some implementations, the eye tracking engine 412 obtains (e.g., receives, retrieves, or determines/generates) an eye tracking vector 413 based on the input data and updates the eye tracking vector 413 over time.

FIG. 4B shows an example data structure for the eye tracking vector 413 in accordance with some implementations. As shown in FIG. 4B, the eye tracking vector 413 may correspond to an N-tuple characterization vector or characterization tensor that includes a timestamp 481 (e.g., the most recent time the eye tracking vector 413 was updated), one or more angular values 482 for a current gaze direction (e.g., instantaneous and/or rate of change of roll, pitch, and yaw values), one or more translational values 484 for the current gaze direction (e.g., instantaneous and/or rate of change of x, y, and z values relative to the physical environment 105, the world-at-large, and/or the like), and/or miscellaneous information 486. One of ordinary skill in the art will appreciate that the data structure for the eye tracking vector 413 in FIG. 4B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking.

According to some implementations, the body/head pose tracking engine 414 obtains the local sensor data 403 and the remote sensor data 405 after having been subjected to the privacy architecture 408. In some implementations, the body/head pose tracking engine 414 obtains (e.g., receives, retrieves, or determines/generates) a pose characterization vector 415 based on the input data and updates the pose characterization vector 415 over time.

FIG. 4B shows an example data structure for the pose characterization vector 415 in accordance with some implementations. As shown in FIG. 4B, the pose characterization vector 415 may correspond to an N-tuple characterization vector or characterization tensor that includes a timestamp 491 (e.g., the most recent time the pose characterization vector 415 was updated), a head pose descriptor 492A (e.g., upward, downward, neutral, etc.), translational values for the head pose 492B, rotational values for the head pose 492C, a body pose descriptor 494A (e.g., standing, sitting, prone, etc.), translational values for body sections/extremities/limbs/joints 494B, rotational values for the body sections/extremities/limbs/joints 494C, and/or miscellaneous information 496. In some implementations, the pose characterization vector 415 also includes information associated with finger/hand/extremity tracking. One of ordinary skill in the art will appreciate that the data structure for the pose characterization vector 415 in FIG. 4B is merely an example that may include different information portions in various other implementations and be structured in myriad ways in various other implementations. According to some implementations, the motion state vector 411, the eye tracking vector 413 and the pose characterization vector 415 are collectively referred to as an input vector 419.

According to some implementations, the characterization engine 442 obtains the object tracking vector 411, the eye tracking vector 413, the pose characterization vector 415, and information associated with one or more past frames or instances from the buffer 434. In some implementations, the characterization engine 442 obtains (e.g., receives, retrieves, or determines/generates) the characterization vector 443 based on the object tracking vector 411, the eye tracking vector 413, the pose characterization vector 415, and information associated with one or more past frames or instances from the buffer 434.

FIG. 4B shows an example data structure for the characterization vector 443 in accordance with some implementations. As shown in FIG. 4B, the characterization vector 443 may correspond to an N-tuple characterization vector or characterization tensor that includes a timestamp 4101 (e.g., the most recent time the characterization vector 443 was updated), object tracking information 4102 (e.g., the object descriptor2 472 and the translation values 474 for the one or more physical objects within the physical environment 105 that are being tracked), gaze direction information 4104 (e.g., a function of the one or more angular values 482 and the one or more translational values 484 within the eye tracking vector 413), head pose information 4106A (e.g., the head pose descriptor 492A), body pose information 4106B (e.g., a function of the body pose descriptor 494A within the pose characterization vector 415), extremity tracking information 4106C (e.g., a function of the body pose descriptor 494A within the pose characterization vector 415 that is associated with extremities of the user 150 that are being tracked by the controller 110, the electronic device 120, and/or a combination thereof), location information 4108 (e.g., a household location such as a kitchen or living room, a vehicular location such as an automobile, plane, etc., and/or the like), and/or miscellaneous information 4109.

Figure 4C:
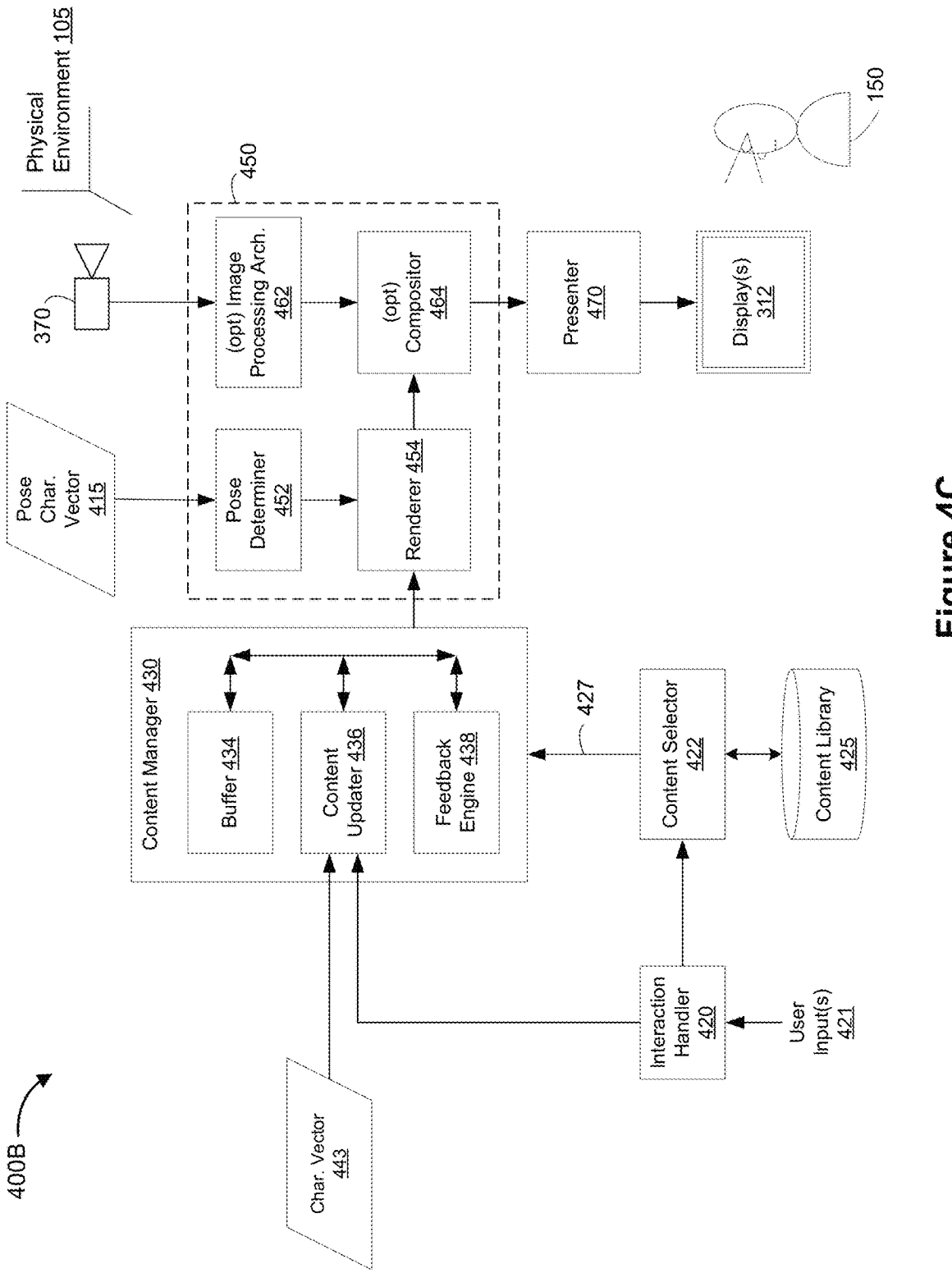
FIG. 4C is a block diagram of a second portion of the example content delivery architecture in accordance with some implementations.

FIG. 4C is a block diagram of a second portion 400B of the example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof. FIG. 4C is similar to and adapted from FIG. 4A. Therefore, similar reference numbers are used in FIGS. 4A and 4C. As such, only the differences between FIGS. 4A and 4C will be described below for the sake of brevity.

According to some implementations, the interaction handler 420 obtains (e.g., receives, retrieves, or detects) one or more user inputs 421 from a peripheral device communicatively coupled thereto via one or more wired or wireless communication channels (e.g., BLUETOOTH, ZIGBEE, IEEE 802.11x, IEEE 802.16x, IEEE 802.3x, etc.). For example, the one or more user inputs 421 include input detection signals associated with touch inputs, keystrokes, etc. detected by the peripheral device. According to some implementations, the interaction handler 420 obtains (e.g., receives, retrieves, or detects) one or more user inputs 421, via extremity/hand tracking, directed to the peripheral device using CV techniques.

In some implementations, the interaction handler 420 also obtains (e.g., receives, retrieves, or detects) one or more user inputs 421 provided by the user 150 that are associated with selecting A/V content, one or more VAs, and/or XR content for presentation. For example, the one or more user inputs 421 correspond to a gestural input selecting XR content from a UI menu detected via hand/extremity tracking, an eye gaze input selecting XR content from the UI menu detected via eye tracking, a voice command selecting XR content from the UI menu detected via a microphone, and/or the like.

In some implementations, the content selector 422 selects XR content 427 from the content library 425 based on one or more user inputs 421 (e.g., a voice command, a selection from a menu of XR content items, and/or the like).

In various implementations, the content manager 430 manages and updates the layout, setup, structure, and/or the like for the XR environment 128, including one or more of VAs, XR content, one or more UI elements associated with the XR content, and/or the like, based on the characterization vector 443, (optionally) the user inputs 421, and/or the like. To that end, the content manager 430 includes the buffer 434, the content updater 436, and the feedback engine 438.

In some implementations, the buffer 434 includes XR content, a rendered image frame, and/or the like for one or more past instances and/or frames. In some implementations, the content updater 436 modifies the XR environment 128 over time based on changes to the characterization vector 443, the user inputs 421 from a peripheral device communicatively coupled thereto, the user inputs 421 directed to the peripheral device (e.g., detected based on CV techniques), the user inputs 421 associated with modifying and/or manipulating the XR content or VA(s), translational or rotational movement of objects within the physical environment 105, translational or rotational movement of the electronic device 120 (or the user 150), and/or the like. In some implementations, the feedback engine 438 generates sensory feedback (e.g., visual feedback such as text or lighting changes, audio feedback, haptic feedback, etc.) associated with the XR environment 128.

According to some implementations, the pose determiner 452 determines a current camera pose of the electronic device 120 and/or the user 150 relative to the XR environment 128 and/or the physical environment 105 based at least in part on the pose characterization vector 415. In some implementations, the renderer 454 renders the XR content, one or more UI elements associated with the XR content, VA(s), the selected XR content 427, and/or the like according to the current camera pose relative thereto.

According to some implementations, the optional image processing architecture 462 obtains an image stream from an image capture device 370 including one or more images of the physical environment 105 from the current camera pose of the electronic device 120 and/or the user 150. In some implementations, the image processing architecture 462 also performs one or more image processing operations on the image stream such as warping, color correction, gamma correction, sharpening, noise reduction, white balance, and/or the like. In some implementations, the optional compositor 464 composites the rendered XR content with the processed image stream of the physical environment 105 from the image processing architecture 462 to produce rendered image frames of the XR environment 128. In various implementations, the presenter 470 presents the rendered image frames of the XR environment 128 to the user 150 via the one or more displays 312. One of ordinary skill in the art will appreciate that the optional image processing architecture 462 and the optional compositor 464 may not be applicable for fully virtual environments (or optical see-through scenarios).

Figure 5A:
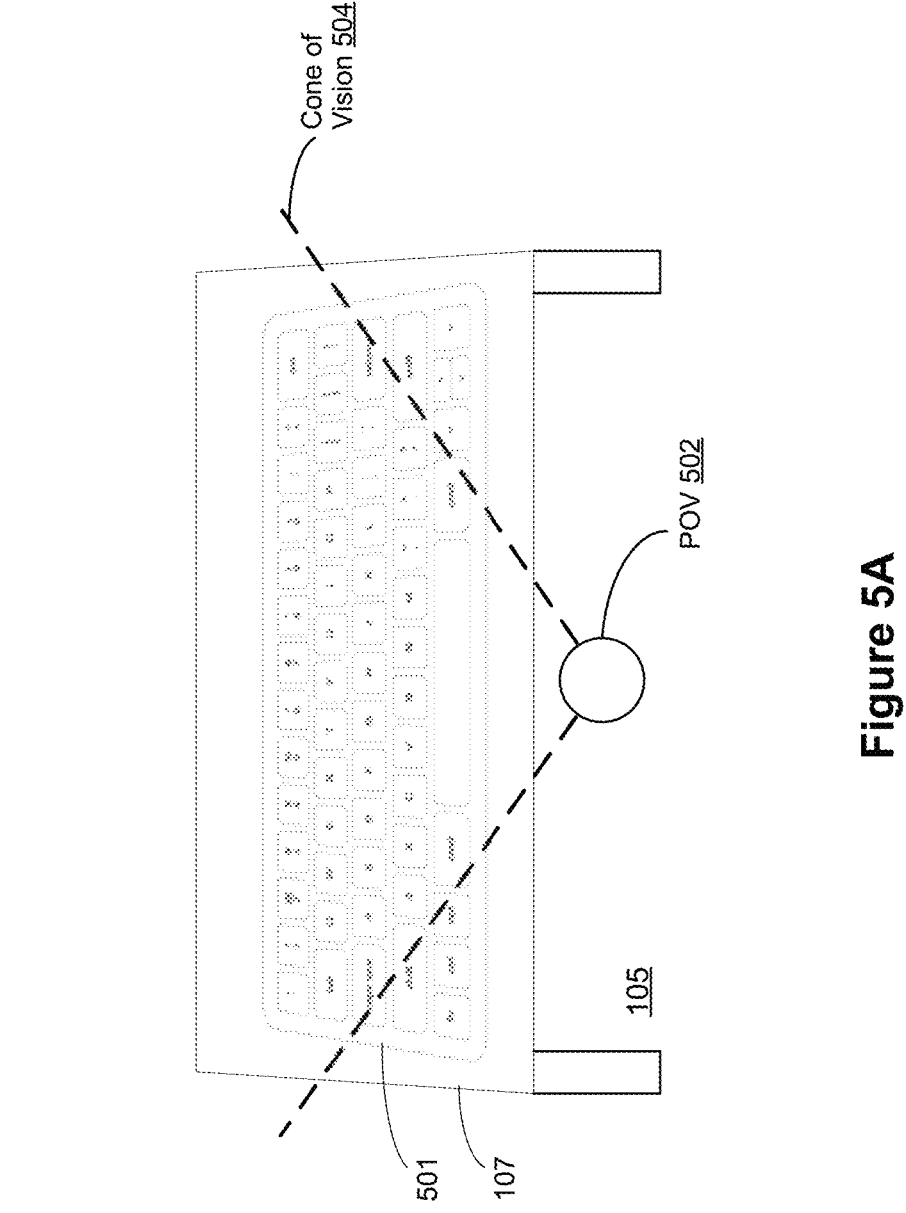
FIGS. 5A-5W illustrate a sequence of instances for a content delivery scenario in accordance with some implementations.
Figure 5B:
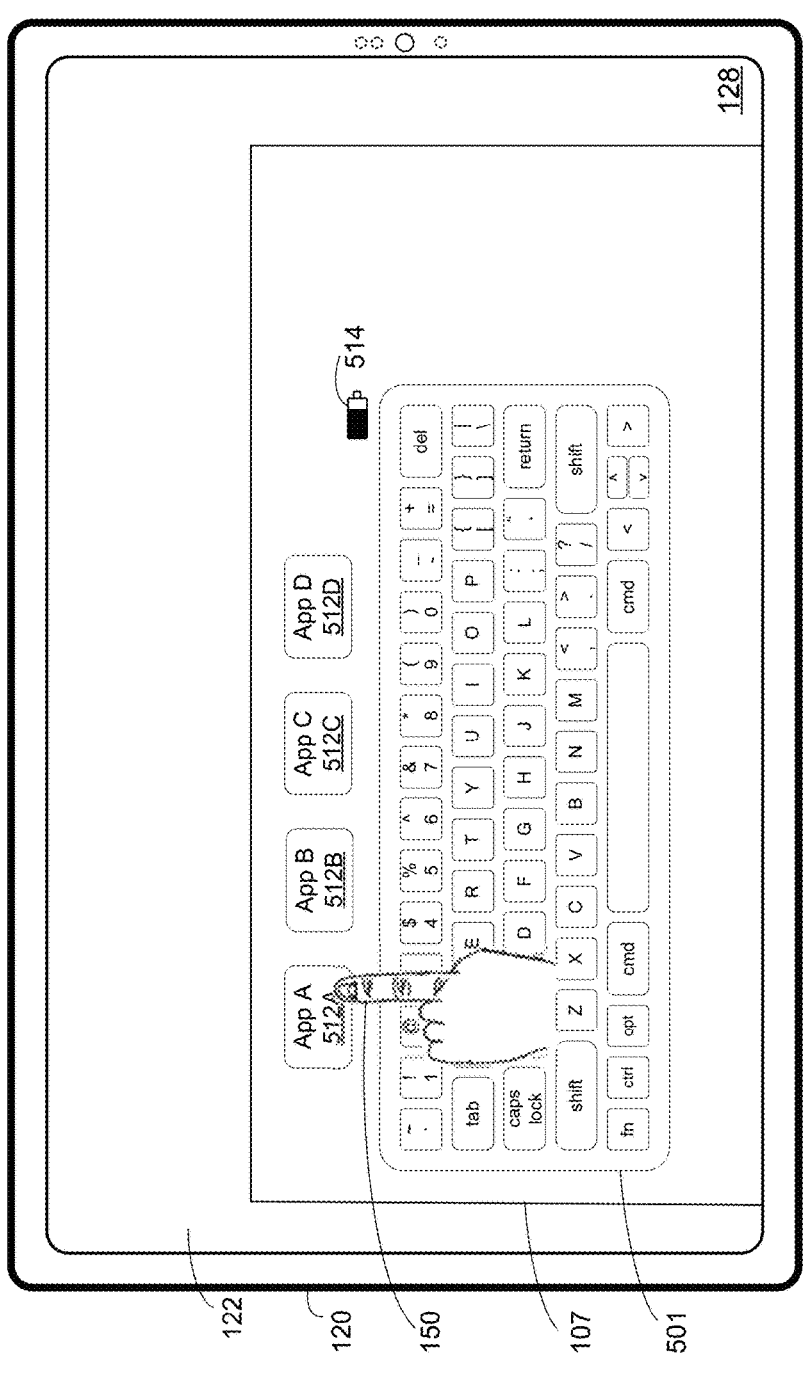
Figure 5C:
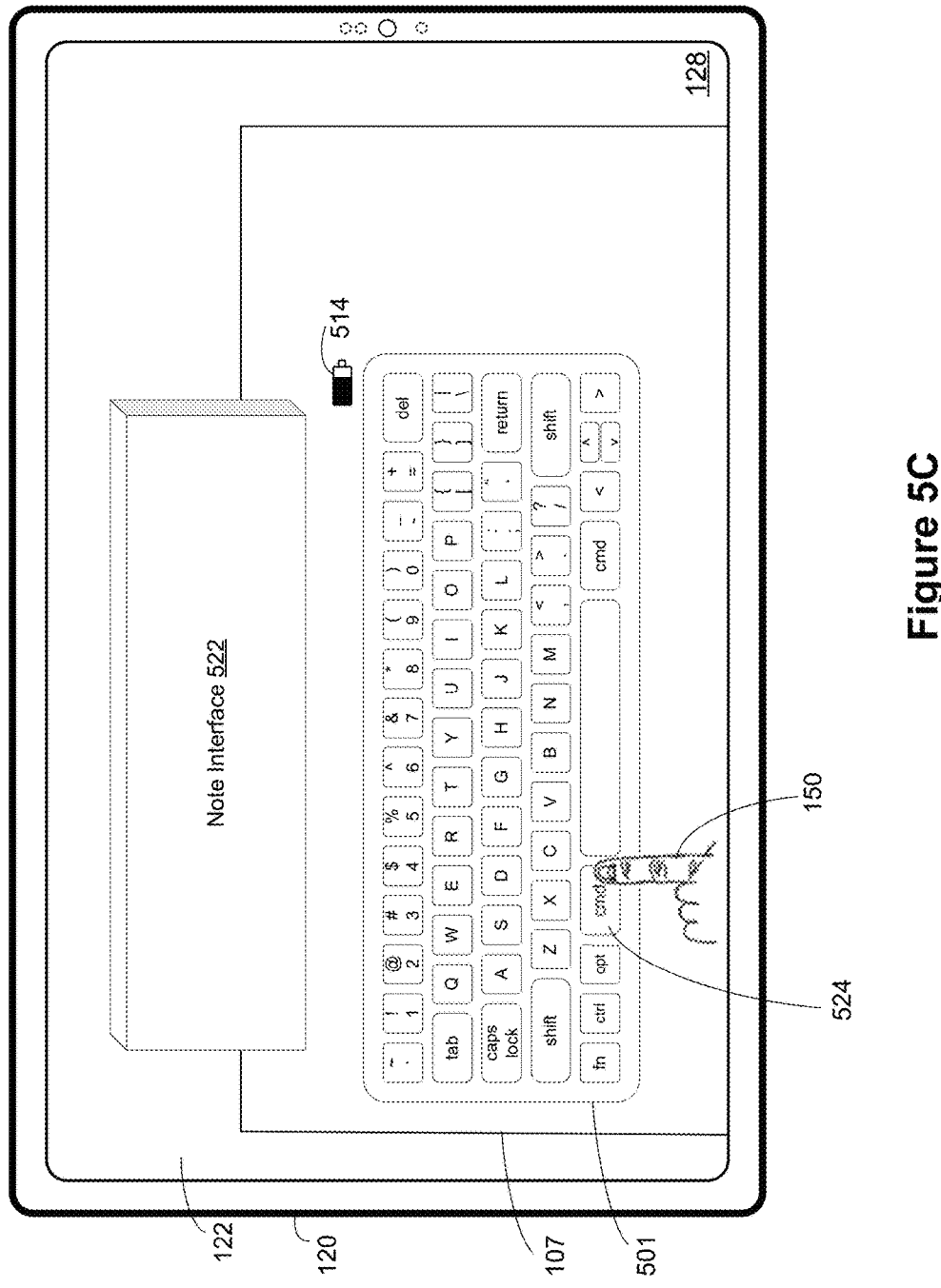
Figure 5D:
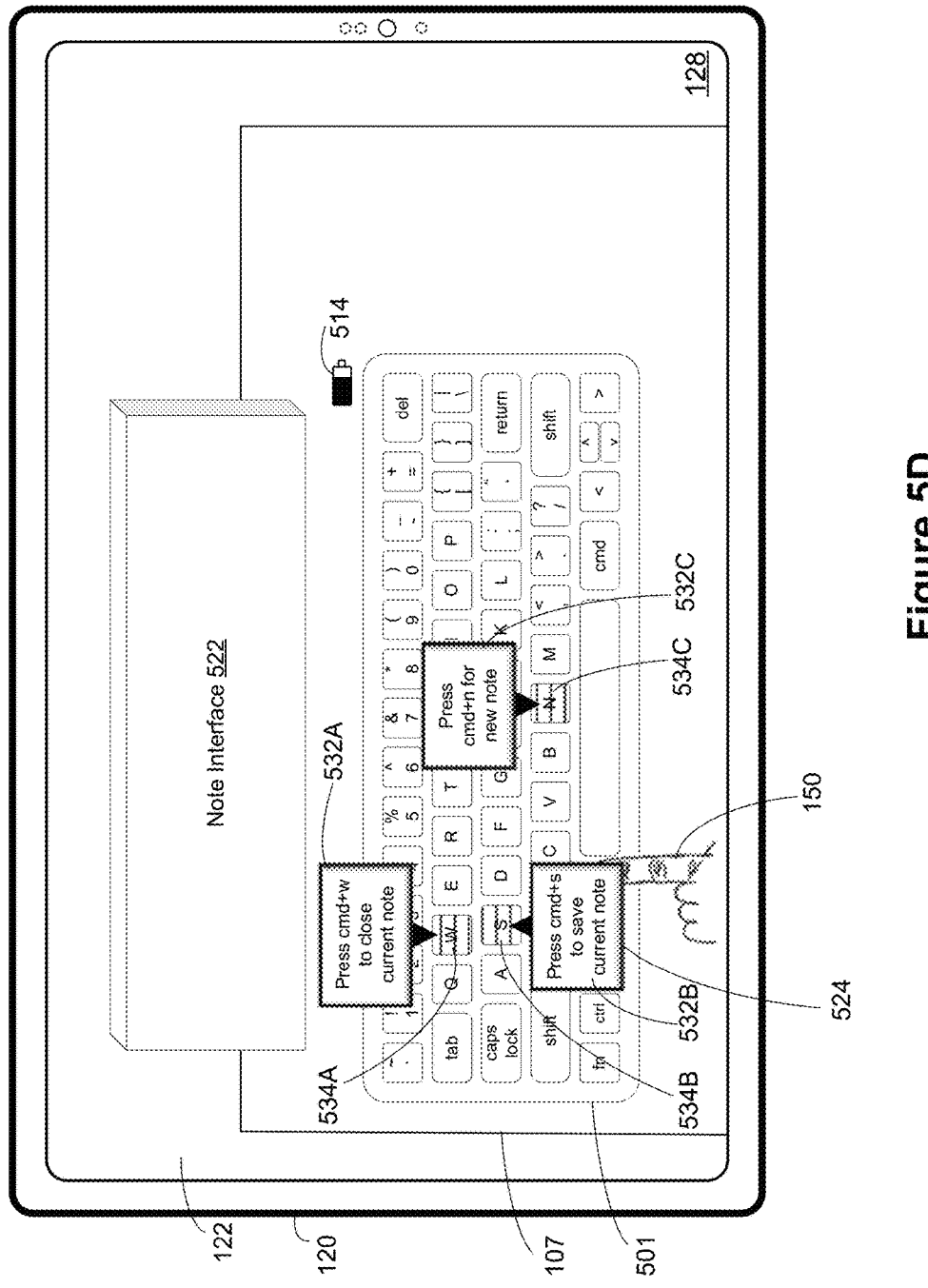
Figure 5E:
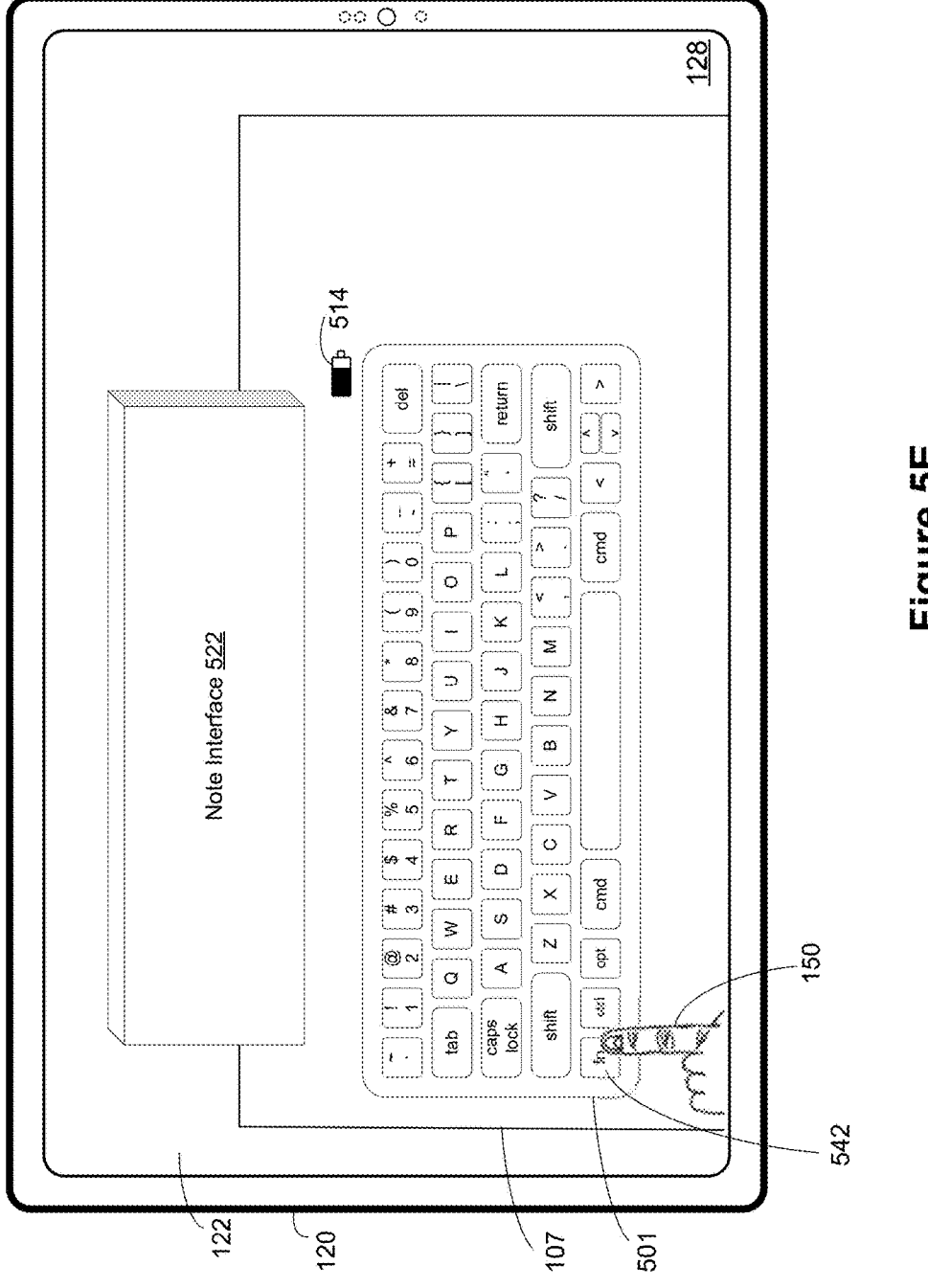
Figure 5F:
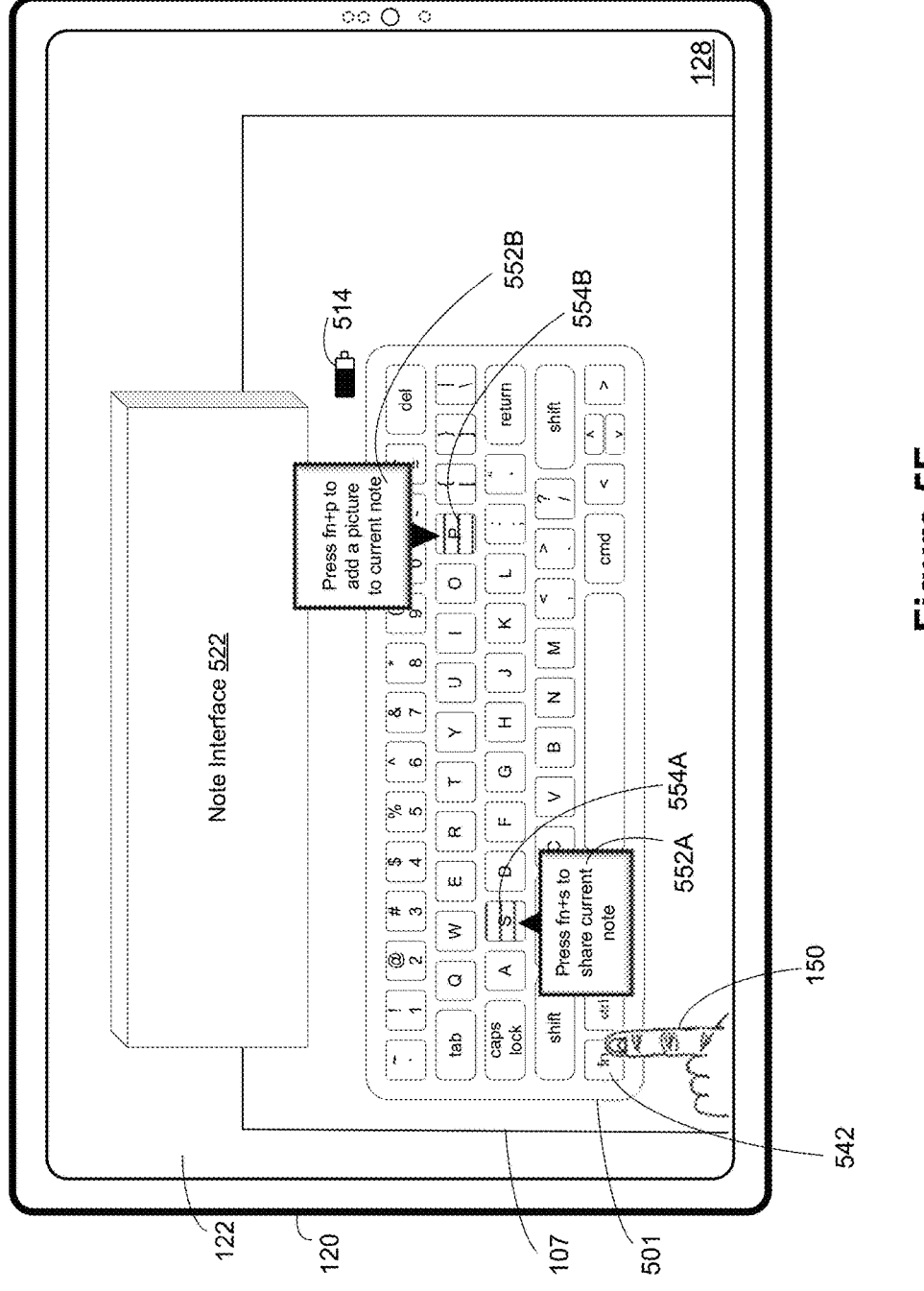
Figure 5G:
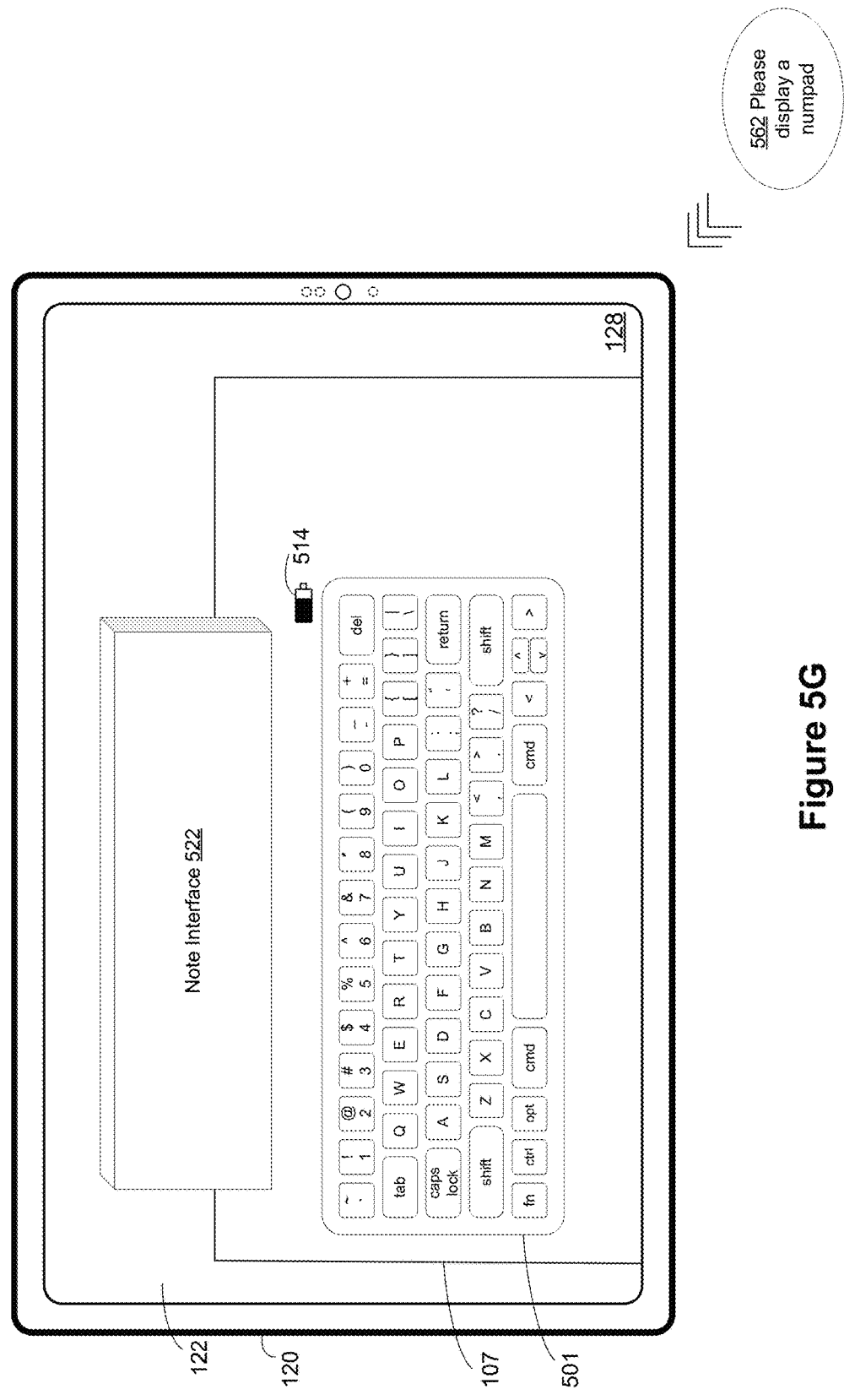
Figure 5H:
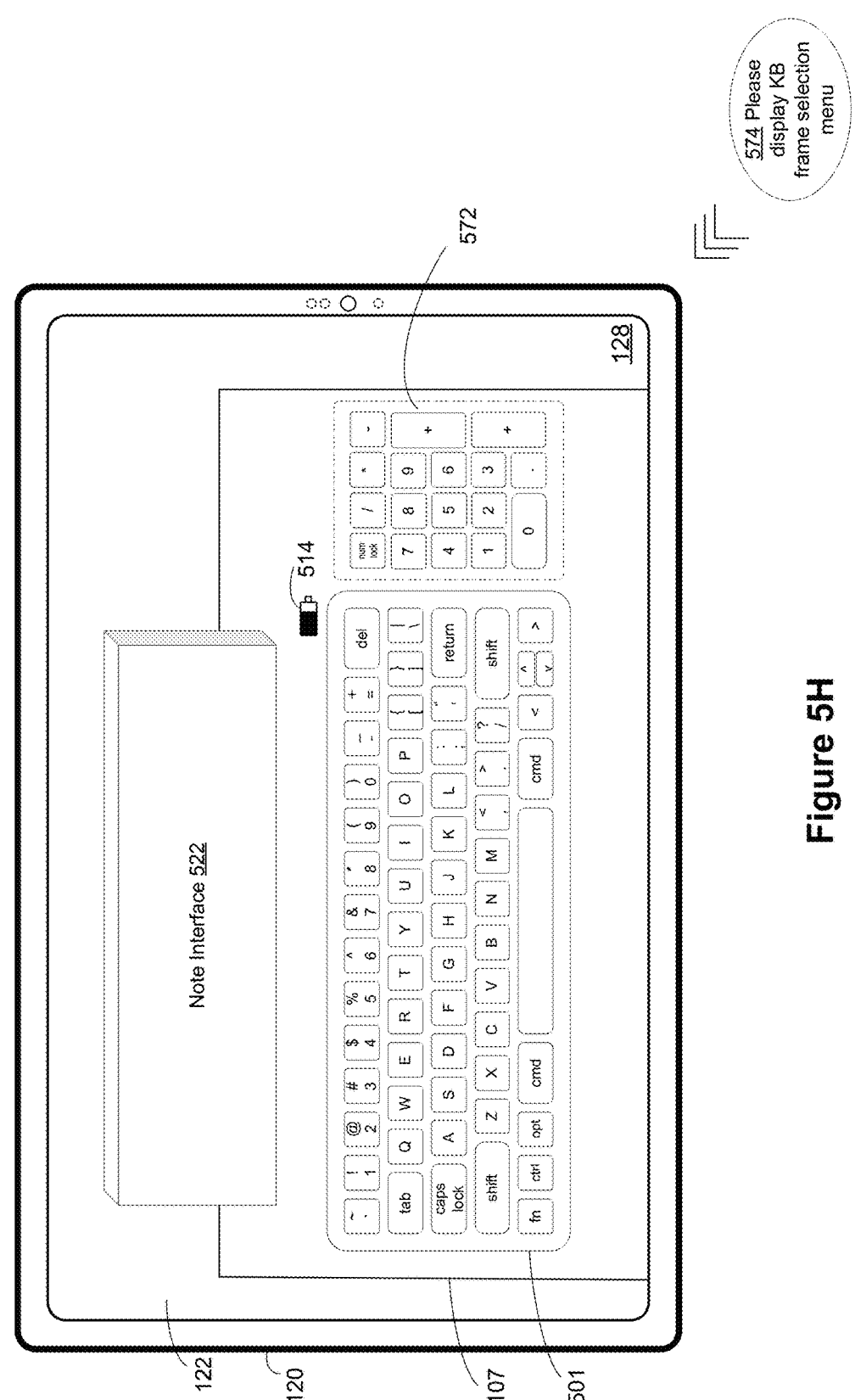
Figure 5I:
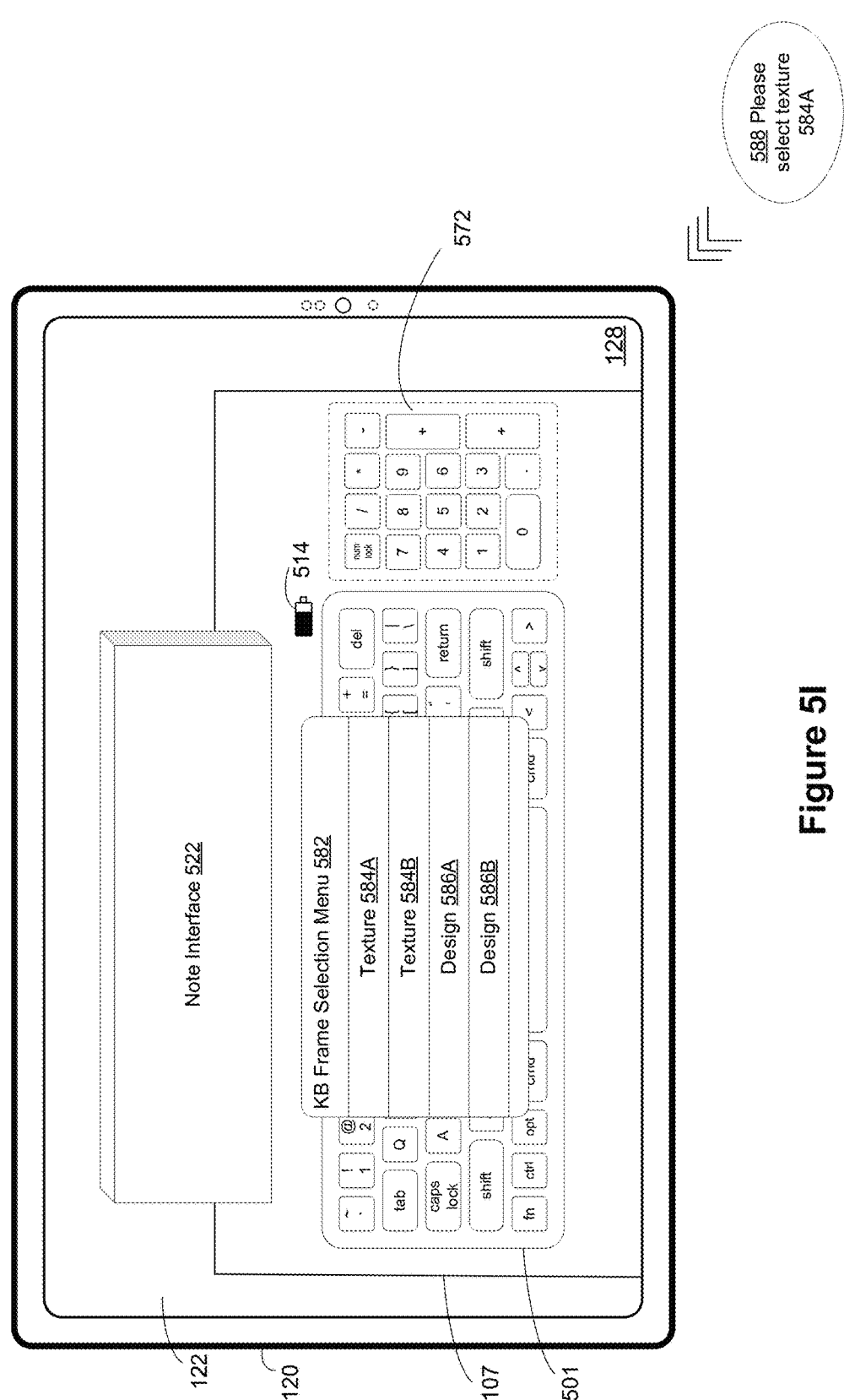
Figure 5J:
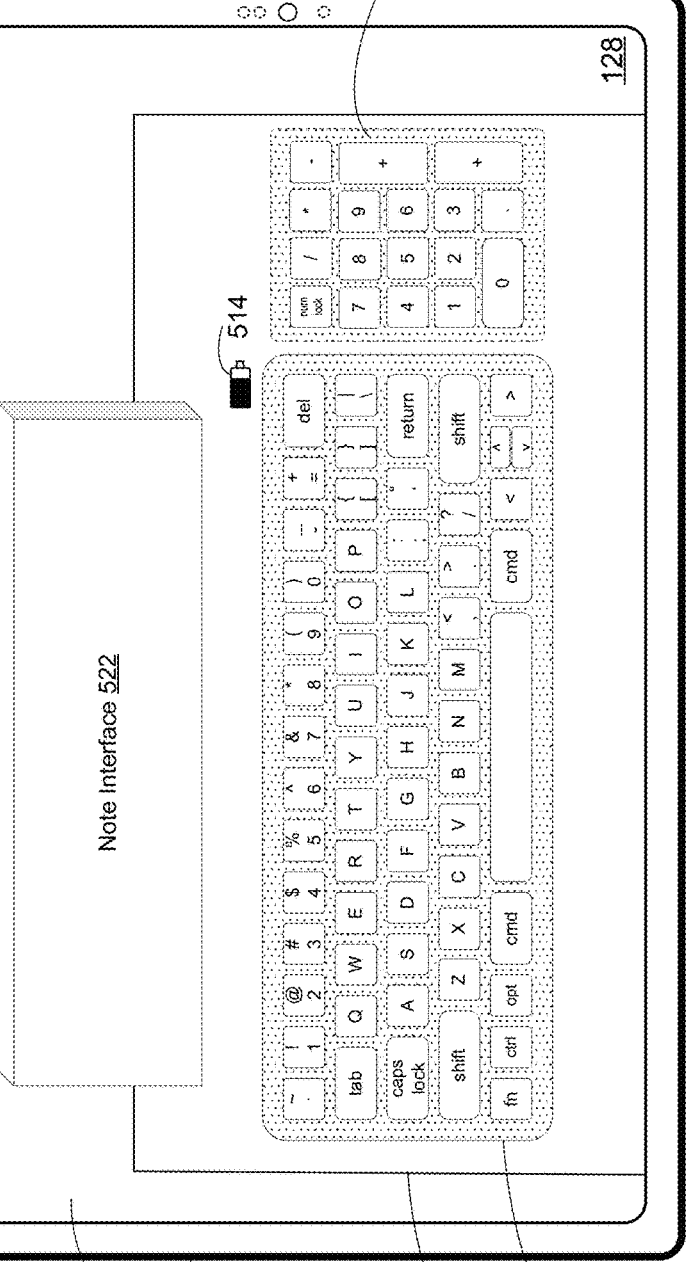
Figure 5K:
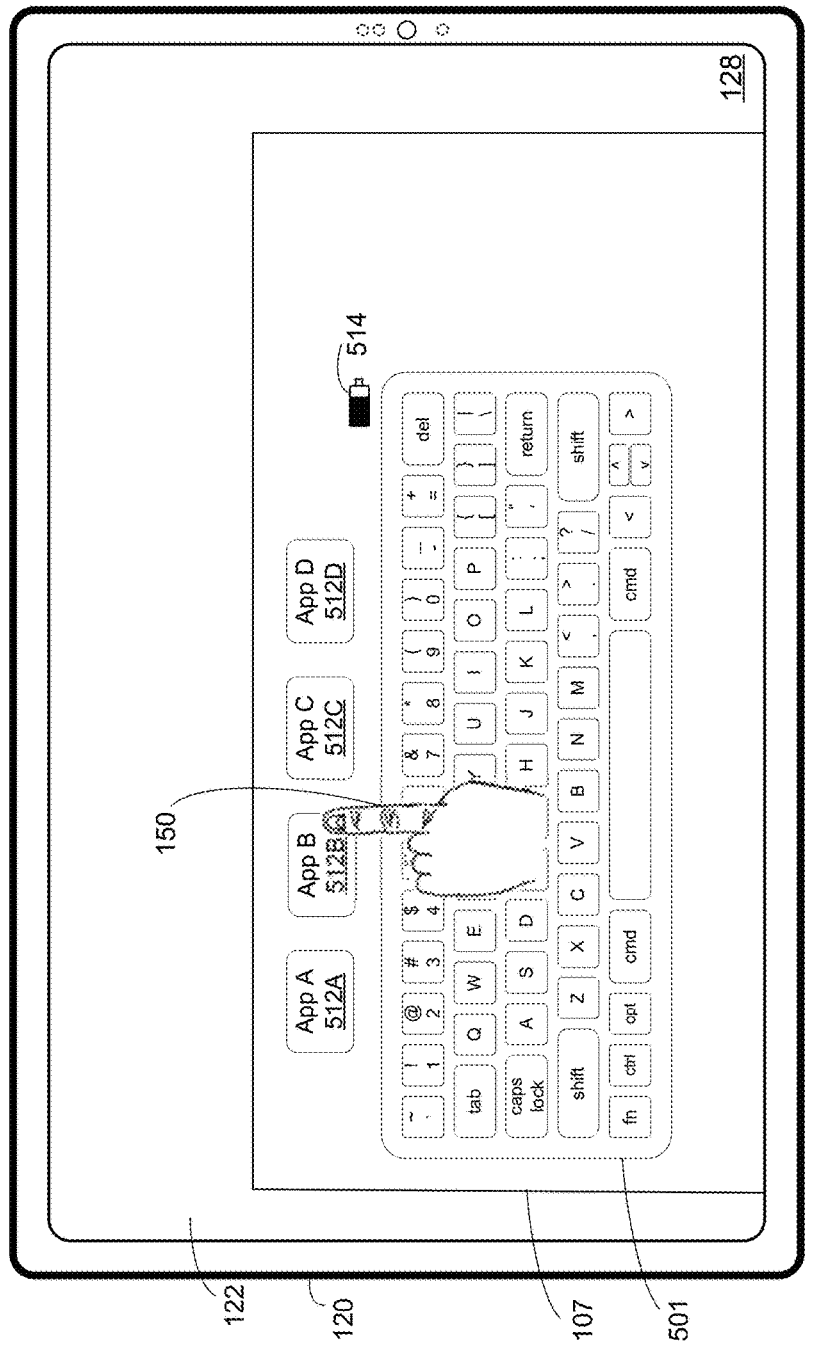
Figure 5L:
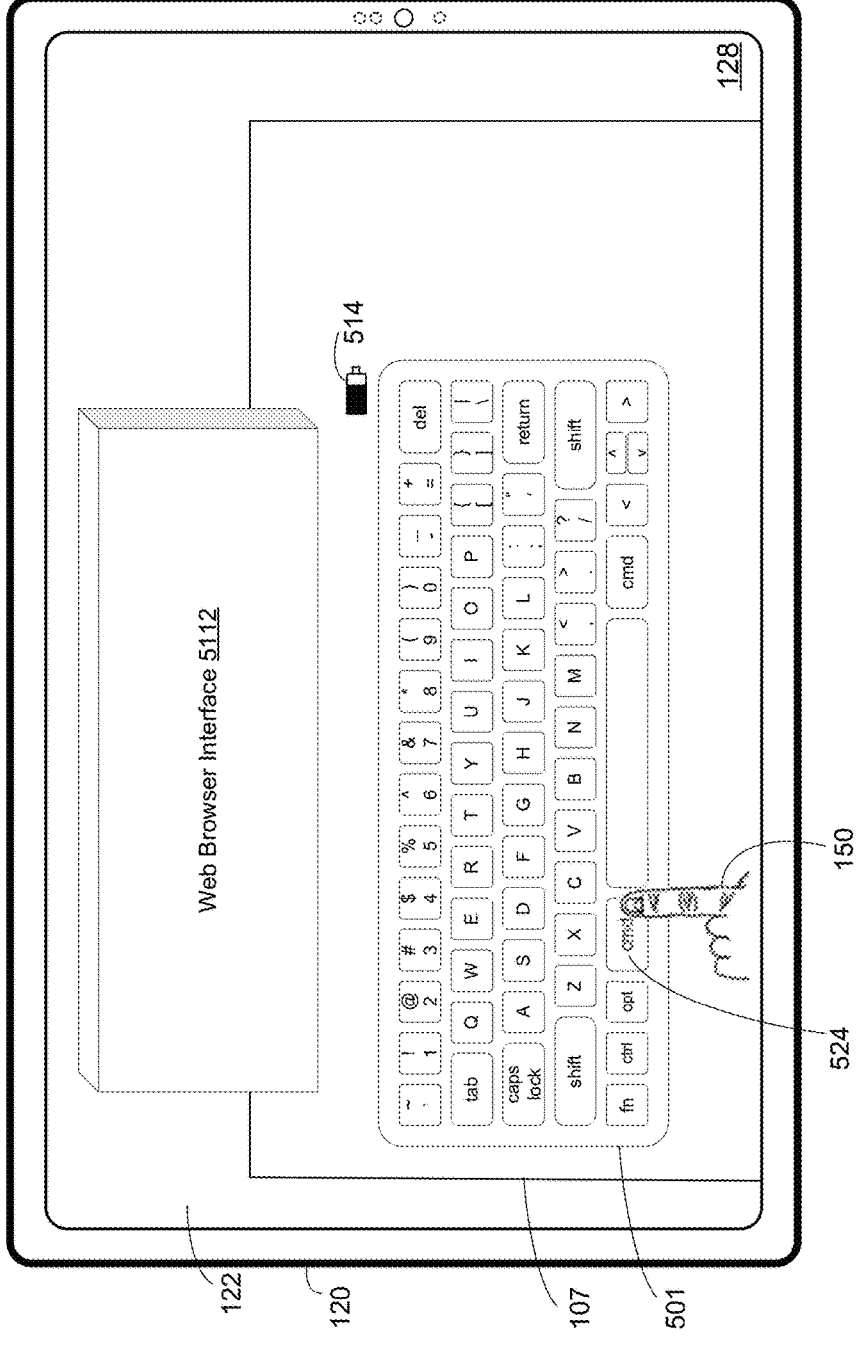
Figure 5M:
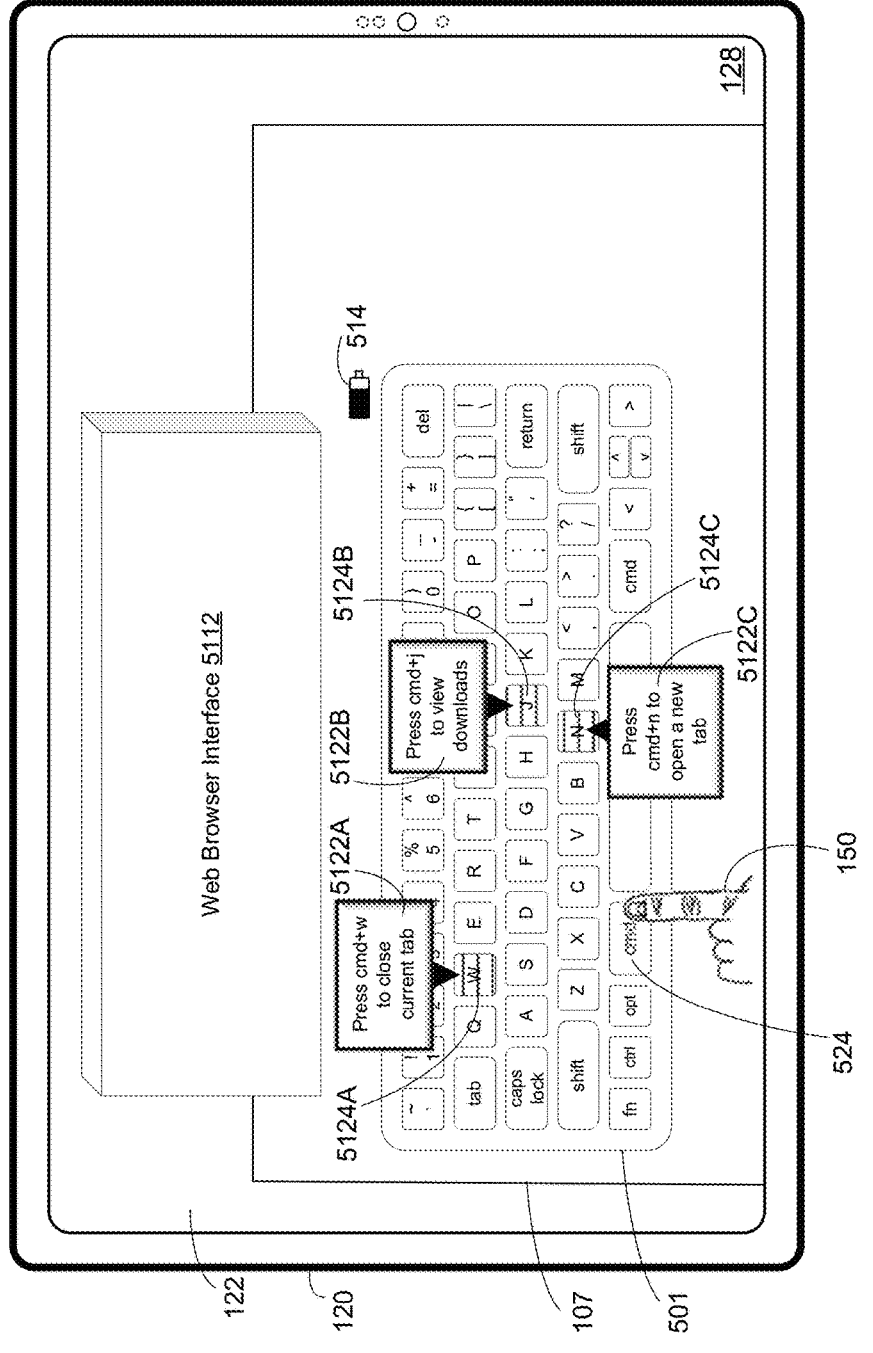
Figure 5N:
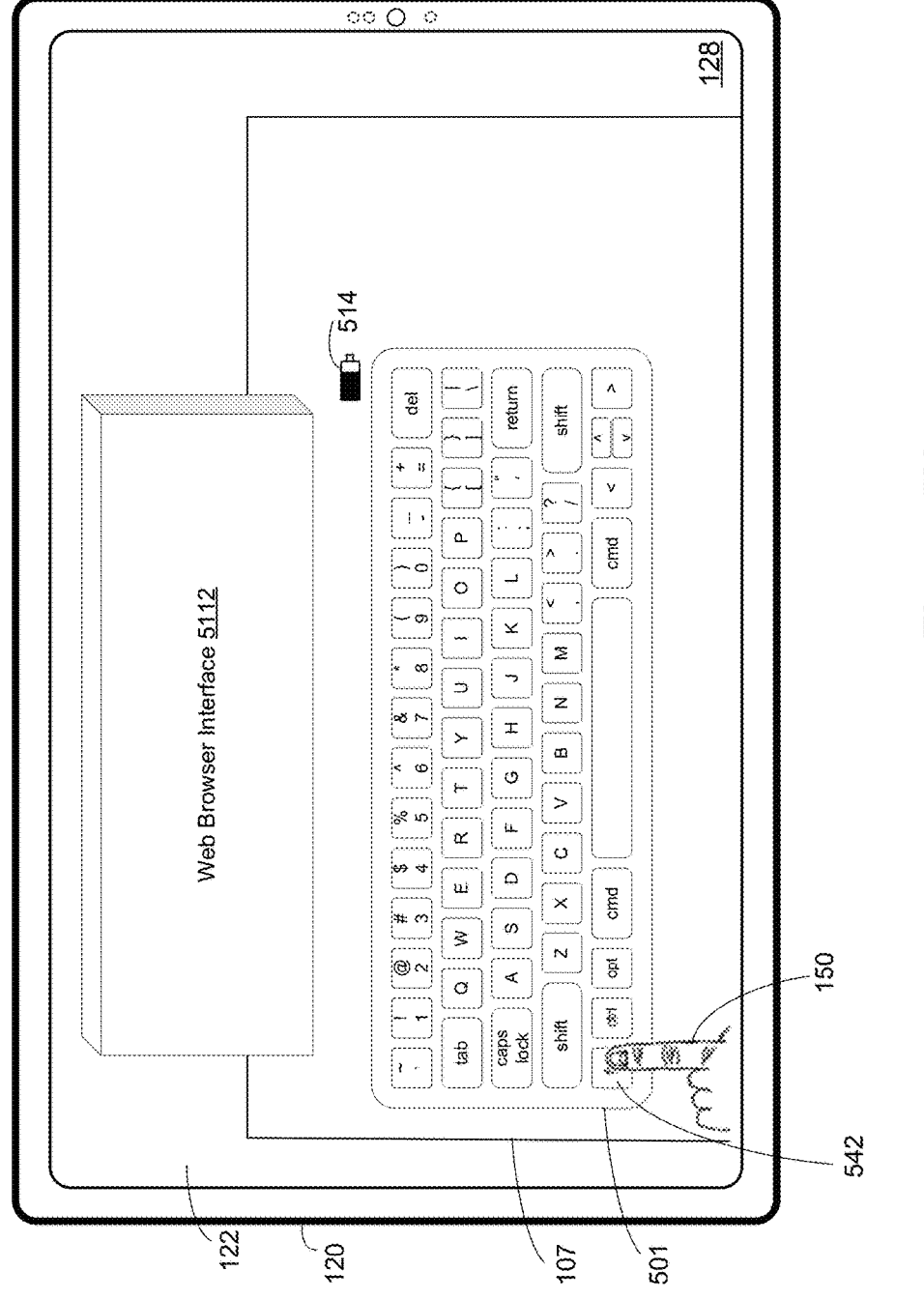
Figure 50:
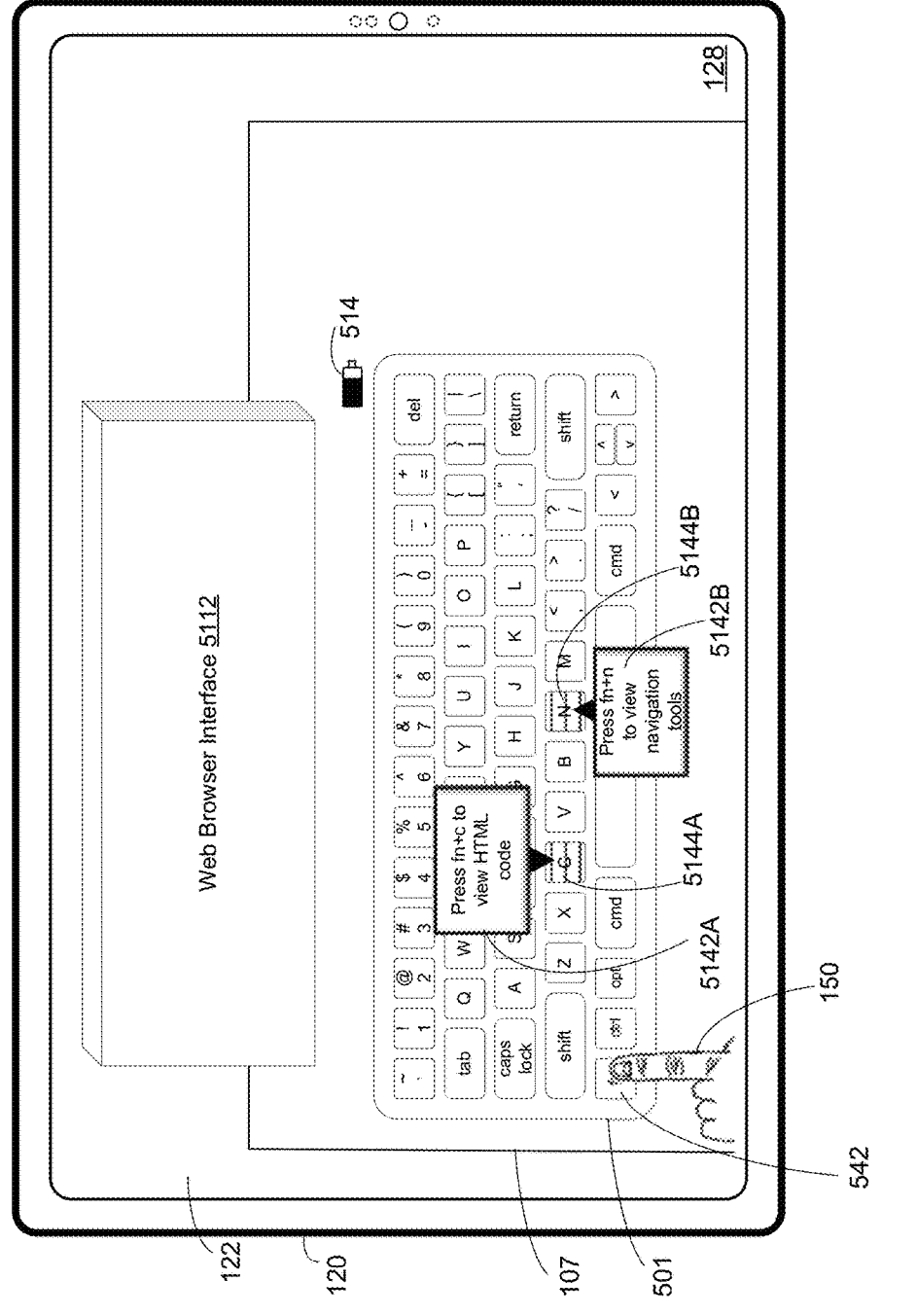
Figure 5P:
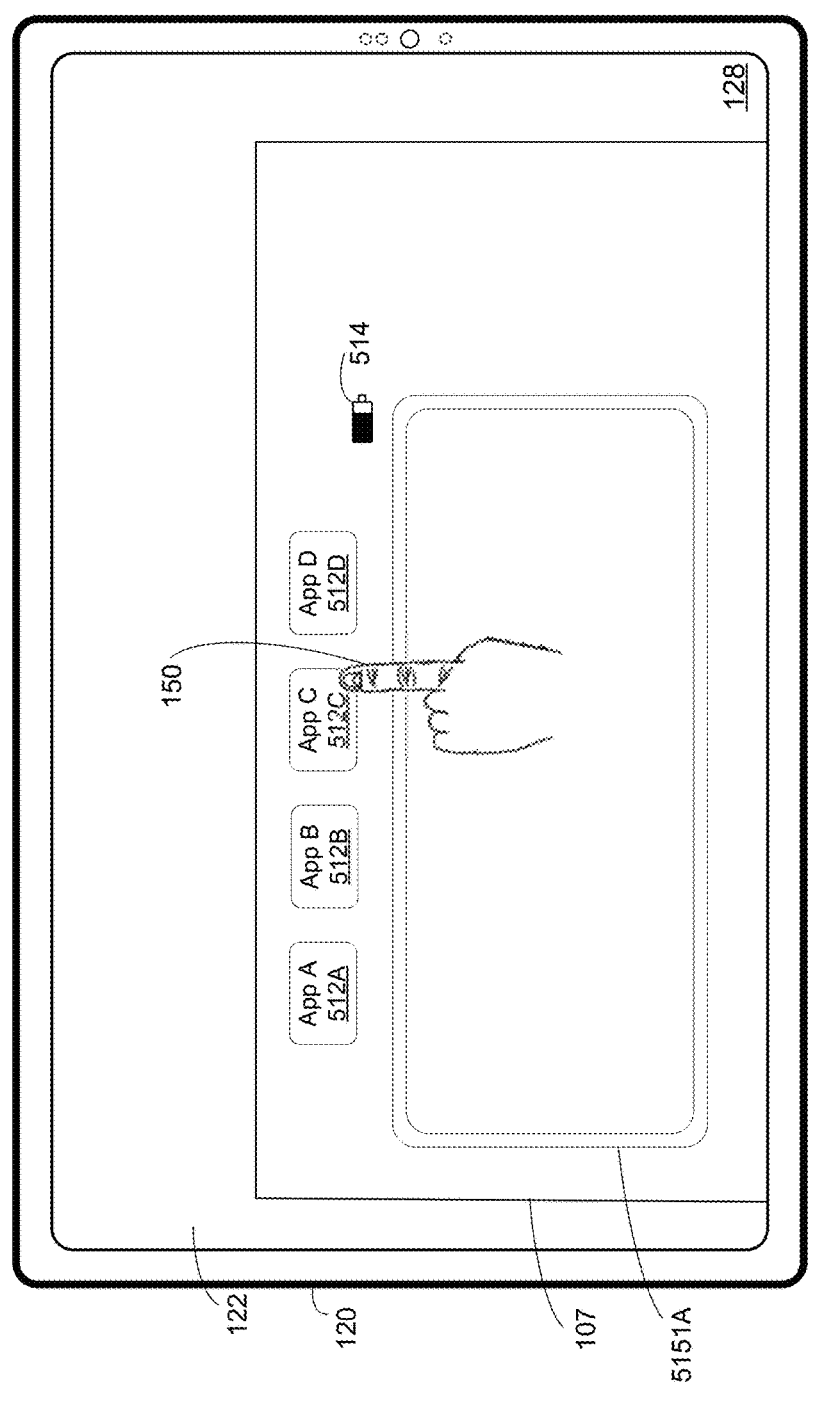
Figure 5Q:
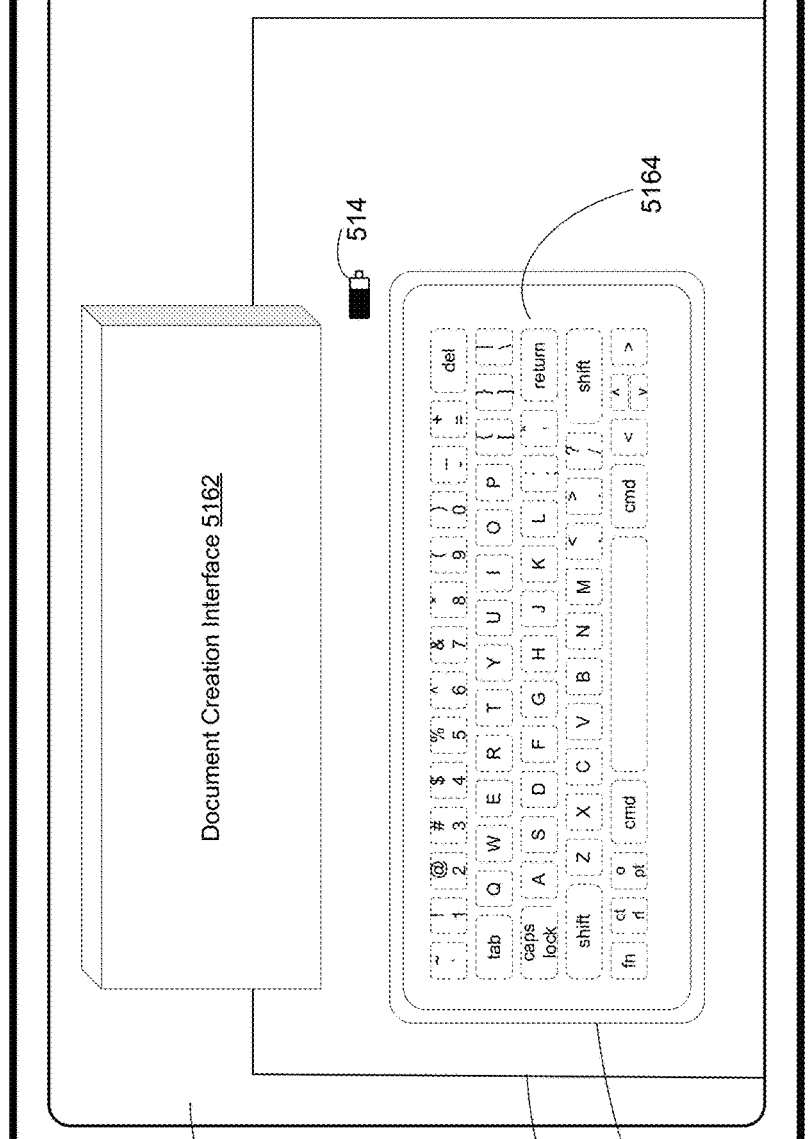
Figure 5R:
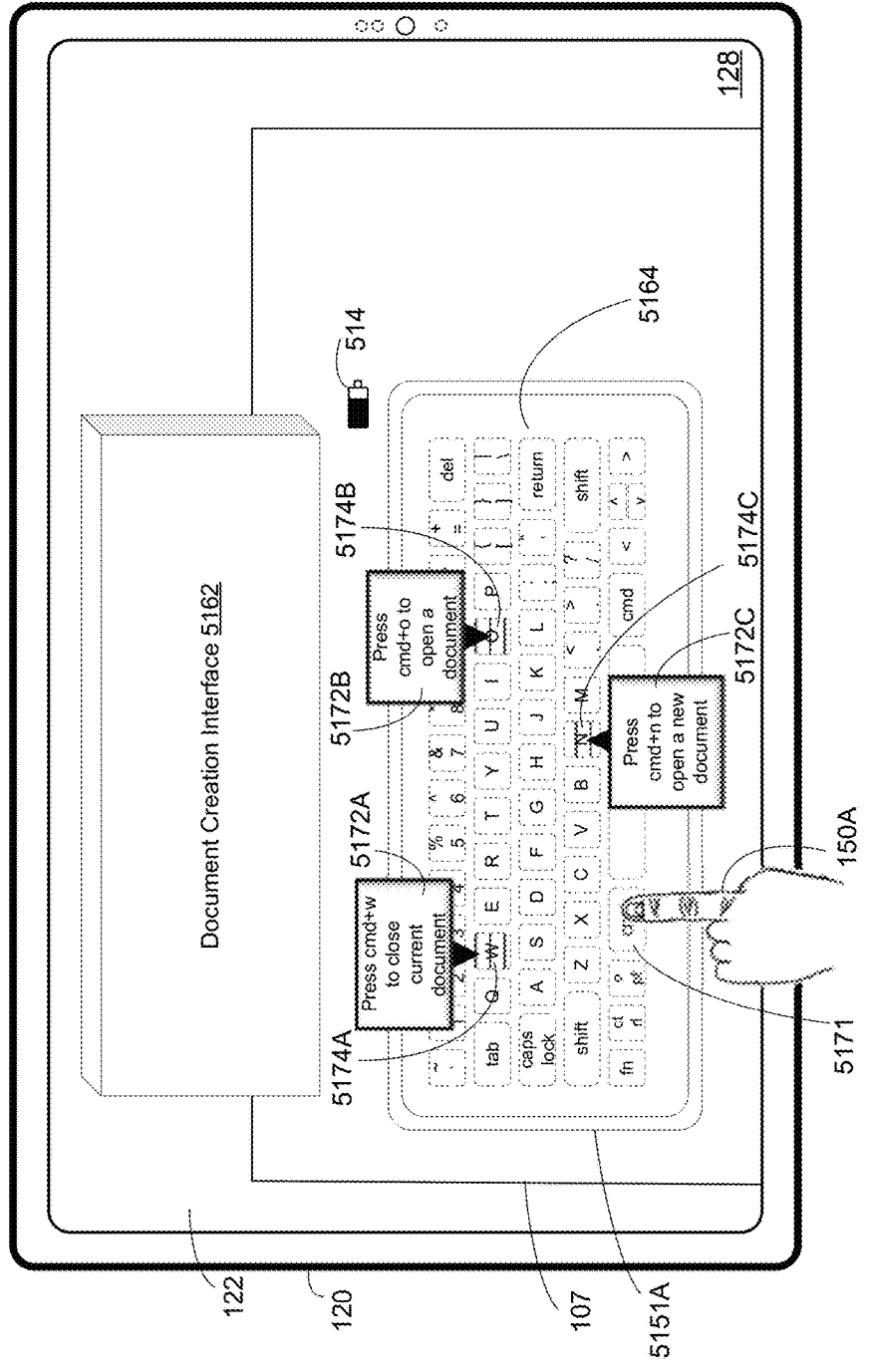
Figure 5S:
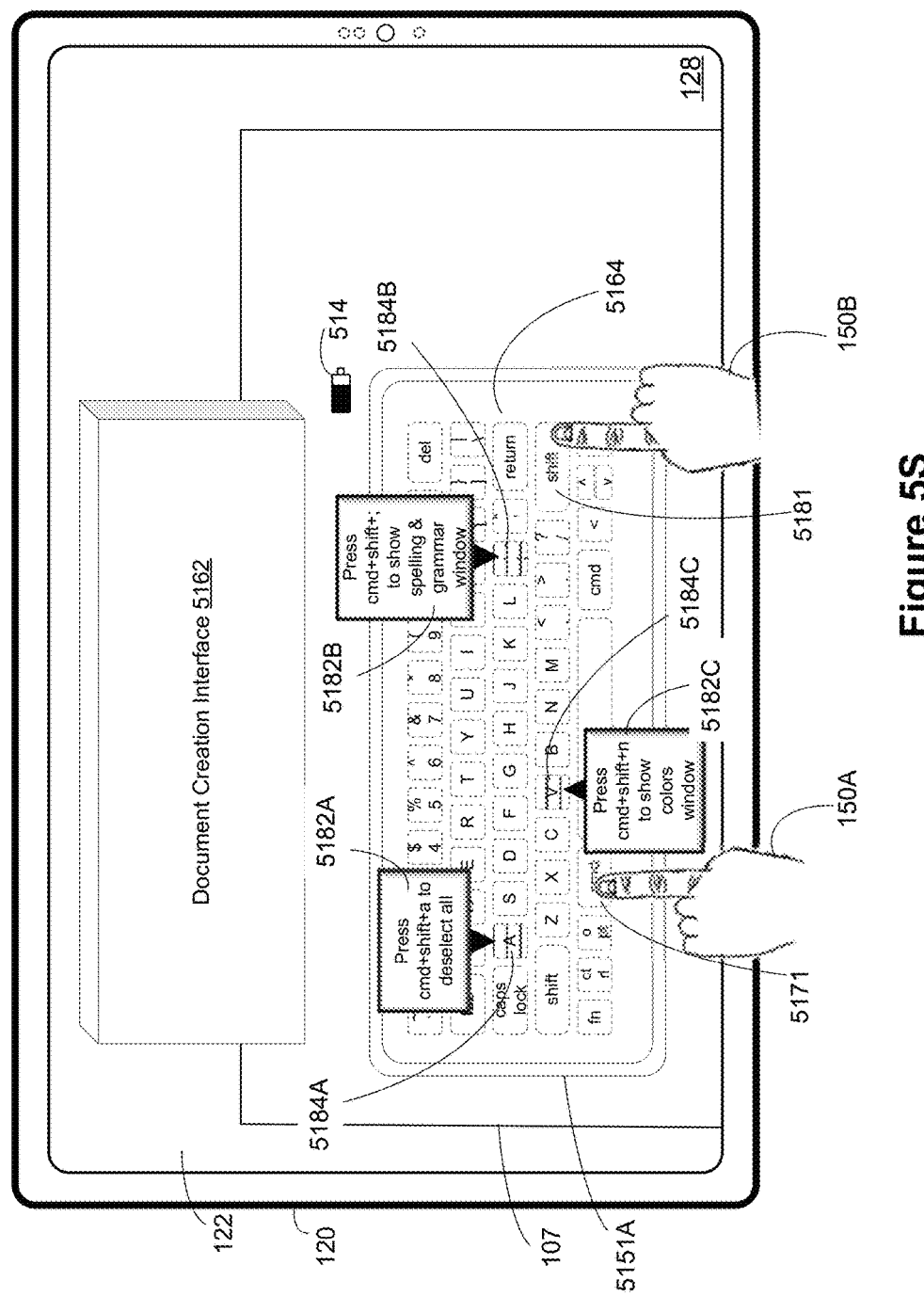
Figure 5T:
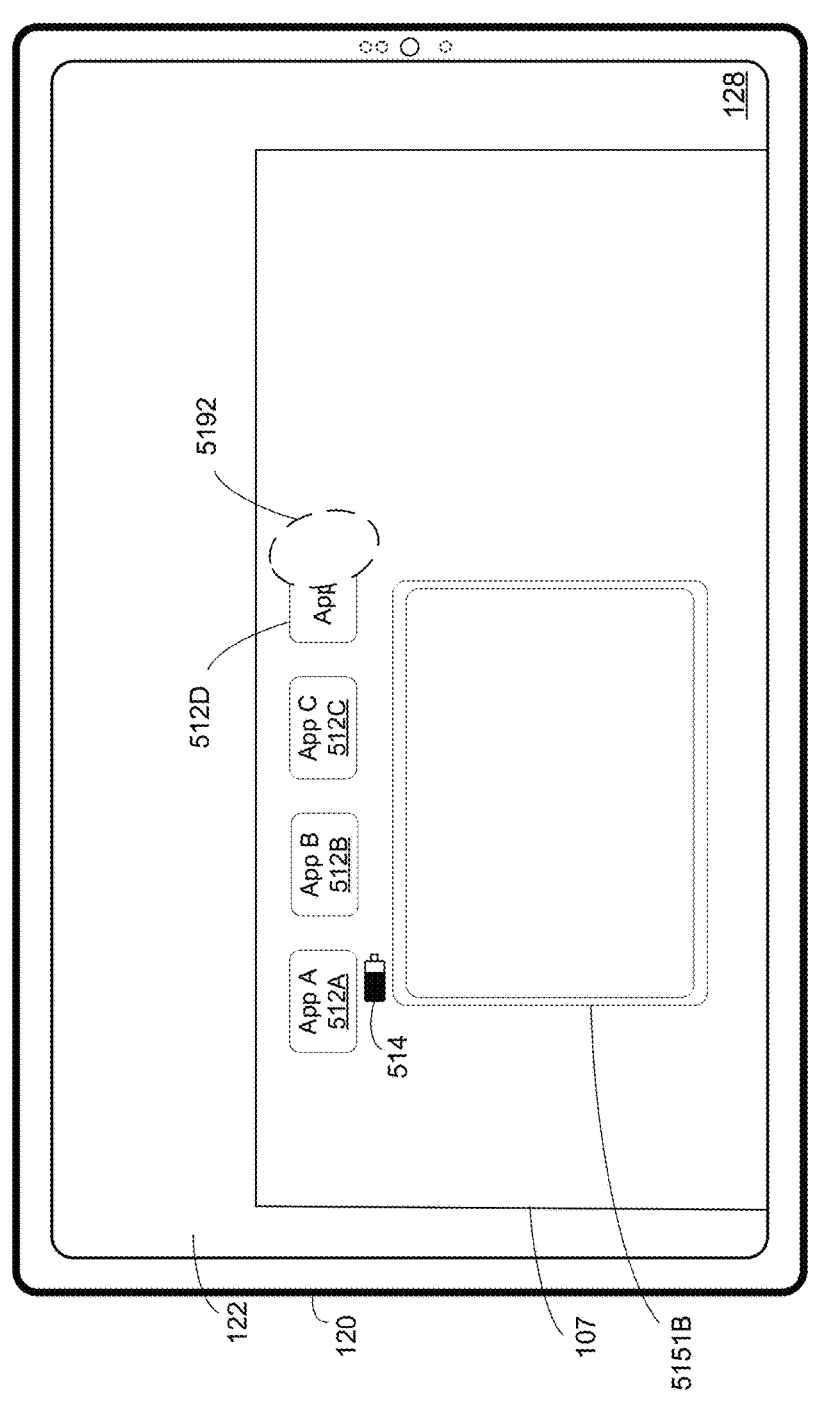
Figure 5U:
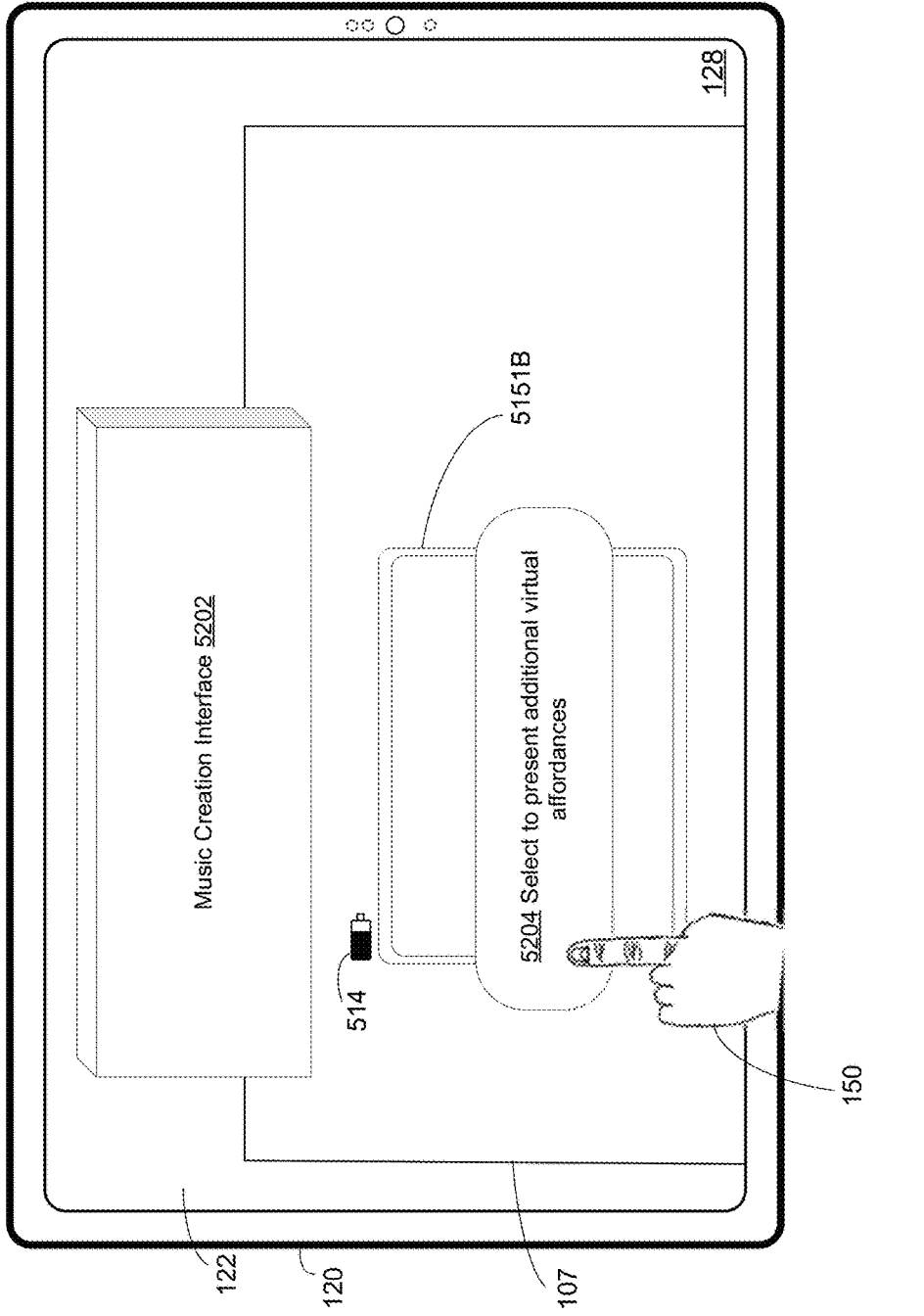
Figure 5V:
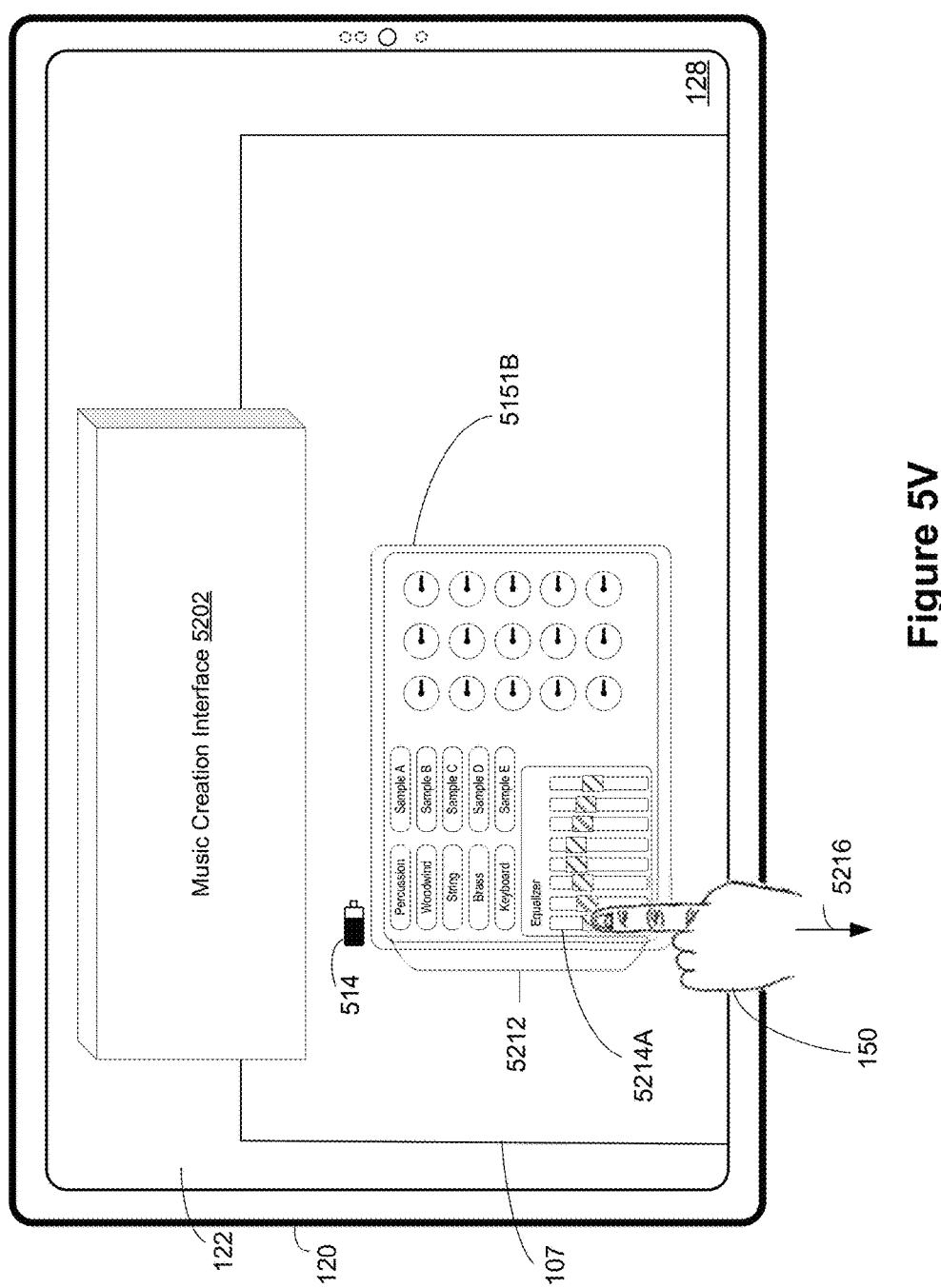
Figure 5W:
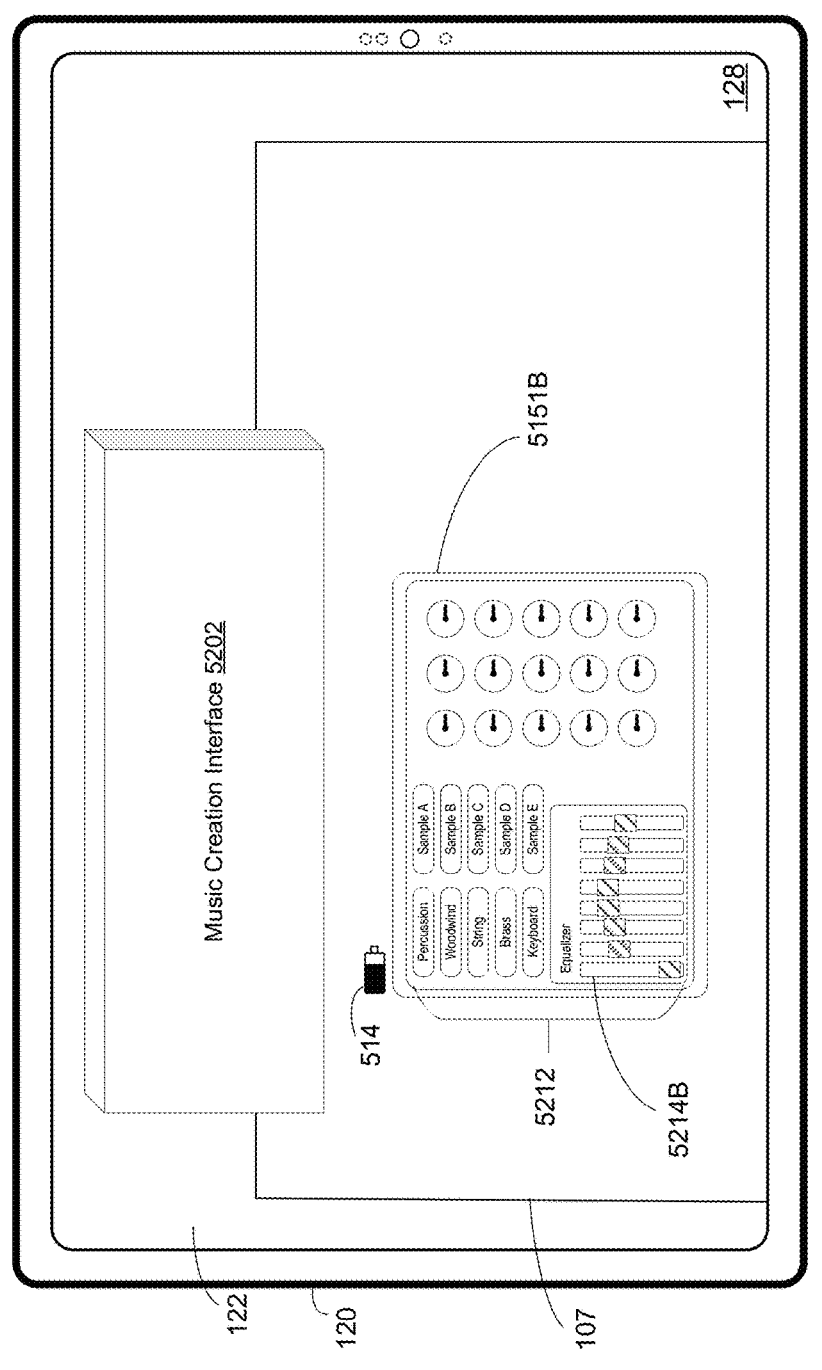

FIGS. 5A-5W illustrate a sequence of instances 510-5220 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 510-5220 are rendered and presented by a computing system such as the controller 110 shown in FIGS. 1 and 2; the electronic device 120 shown in FIGS. 1 and 3; and/or a suitable combination thereof. The user interfaces in FIGS. 5A-5W are used to illustrate some of the processes described below, including a portion of the processes described with reference to FIG. 6.

As shown in FIGS. 5A-5W, the content delivery scenario includes a physical environment 105 and an XR environment 128 displayed on the display 122 of the electronic device 120 (e.g., associated with the user 150). As shown in FIG. 1, the electronic device 120 presents the XR environment 128 to the user 150 while the user 150 is physically present within the physical environment 105 that includes a table 107, which is currently within the FOV 111 of an exterior-facing image sensor of the electronic device 120. As such, in some implementations, the user 150 holds the electronic device 120 in their left hand similar to the operating environment 100 in FIG. 1.

In other words, in some implementations, the electronic device 120 is configured to present XR content and to enable optical see-through or video pass-through of at least a portion of the physical environment 105 (e.g., the table 107) on the display 122. For example, the electronic device 120 corresponds to a mobile phone, tablet, laptop, near-eye system, wearable computing device, or the like.

As shown in FIG. 5A, during the instance 500 (e.g., associated with time To) of the content delivery scenario, a point of view 502 (POV) is associated with a cone of vision 504 relative to the physical environment 105. In this example, the cone of vision 504 associated with the POV 502 includes a peripheral device 501 located on a table 107 (e.g., a physical keyboard). As one example, the POV 502 corresponds to the FOV 111 of the exterior-facing image sensors of the electronic device 120 shown in FIGS. 1 and 3. For example, the peripheral device 501 corresponds to a keyboard, a mouse, a touch-sensitive surface (TSS) such as a touchpad or a touchscreen, a joystick, a game controller, or the like. In some implementations, the peripheral device 501 is communicatively coupled with one of the controller 110 shown in FIGS. 1 and 2, the electronic device 120 shown in FIGS. 1 and 3, and/or a suitable combination thereof via one or more wired or wireless communication channels (e.g., BLUETOOTH, ZIGBEE, IEEE 802.11x, IEEE 802.16x, IEEE 802.3x, etc.).

As shown in FIG. 5B, during the instance 510 (e.g., associated with time $T_1$) of the content delivery scenario, the electronic device 120 presents a battery indicator 514 that corresponds to a current charge value for the peripheral device 501 (e.g., a physical keyboard within the physical environment 105) and a plurality of selectable affordances 512A, 512B, 512C, and 512D associated with applications A, B, C, and D, respectively. In FIG. 5B, the electronic device 120 detects, via extremity/hand tracking, a user input with the left hand of the user 150 directed to the selectable affordance 512A associated with application A (e.g., a Notes application).

As shown in FIG. 5C, during the instance 520 (e.g., associated with time $T_2$) of the content delivery scenario, the electronic device 120 presents a note interface 522 (e.g., an instance of application A) in response to detecting the user input in FIG. 5B directed to the selectable affordance 512A associated with application A (e.g., the Notes application). According to some implementations, the electronic device 120 detects inputs directed to the note interface 522 via extremity/hand tracking inputs, touch inputs, voice inputs, eye tracking inputs, or the like.

According to some implementations, the electronic device 120 detects sketch inputs directed to the note interface 522 via extremity/hand tracking and presents corresponding sketch marks thereon. According to some implementations, the electronic device 120 detects keystrokes directed to the peripheral device 501 via computer vision (CV) and presents corresponding characters on the note interface 522. According to some implementations, the electronic device 120 detects keystrokes directed to the peripheral device 501 via input detection signals associated with the keystrokes obtained (e.g., received or retrieved) from the peripheral device 501 and presents corresponding characters on the note interface 522. One of ordinary skill in the art will appreciate that other input modalities may produce content presented on or otherwise modify the note interface 522 such as touch inputs directed to the display 122, voice inputs, or the like. For example, the note interface 522 corresponds to a 2D planar region or a 3D volumetric region within the XR environment 128.

In FIG. 5C, the electronic device 120 detects, via extremity/hand tracking, a user input directed to key 524 (e.g., the command or "cmd" key) of the peripheral device 501. As noted above, in various implementations, the electronic device 120 detects keystrokes directed to the peripheral device 501 via CV or input detection signals associated with the keystrokes obtained (e.g., received or retrieved) from the peripheral device 501 and presents corresponding characters on the note interface 522.

As shown in FIG. 5D, during the instance 530 (e.g., associated with time $T_3$) of the content delivery scenario, the electronic device 120 presents first XR content in response to detecting the user input directed to the key 524 in FIG. 5C. For example, the first XR content corresponds a first set of one or more virtual augmentations 532A, 532B, and 532C associated with a function of or a usage of the key 524 of the peripheral device 501 while the application A (e.g., the Notes application) is running in the foreground. In this example, the first set of one or more virtual augmentations 532A, 532B, and 532C corresponds to one or more key combination indicators associated with the key 524 while the application A (e.g., the Notes application) is running in the foreground.

As shown in FIG. 5D, the electronic device 120 presents a virtual augmentation 532A (e.g., a 2D or 3D pop-up indicator with the following text: "Press cmd+w to close current note") in concert with a key 534A (e.g., the "w" key) of the peripheral device 501 while continuing to detect the user input directed to key 524. As shown in FIG. 5D, the electronic device 120 also presents a virtual augmentation 532B (e.g., a 2D or 3D pop-up indicator with the following text: "Press cmd+s to save current note") in concert with a key 534B (e.g., the "s" key) of the peripheral device 501 while continuing to detect the user input directed to key 524. As shown in FIG. 5D, the electronic device 120 further presents a virtual augmentation 532C (e.g., a 2D or 3D pop-up indicator with the following text: "Press cmd+n for new note") in concert with a key 534C (e.g., the "n" key) of the peripheral device 501 while continuing to detect the user input directed to key 524. As shown in FIG. 5D, the electronic device 120 changes an appearance of the keys 534A, 534B, and 534C (e.g., changed from a white texture in FIG. 5C to a striped texture in FIG. 5D) while continuing to detect the user input directed to key 524.

In FIG. 5D, the first set of one or more virtual augmentations 532A, 532B, and 532C are at least partially overlaid on the keys 534A, 534B, and 534C, respectively, of the peripheral device 501. One of ordinary skill in the art will appreciate that the first set of one or more virtual augmentations 532A, 532B, and 532C are example pop-up key combination indicators that may be surfaced in different forms in various other implementations (e.g., banner notifications, overlaid on corresponding keys, etc.). One of ordinary skill in the art will appreciate that the first set of one or more virtual augmentations 532A, 532B, and 532C are example key combination indicators that may be changed or otherwise modified in various other implementations (e.g., the text, size, shape, color, texture, placement, etc. may be changed or otherwise modified).

As shown in FIG. 5E, during the instance 540 (e.g., associated with time $T_4$) of the content delivery scenario, the electronic device 120 presents the note interface 522 (e.g., an instance of application A) in response to detecting the user input in FIG. 5B directed to the selectable affordance 512A associated with application A (e.g., a Notes application). In FIG. 5E, the electronic device 120 detects, via extremity/hand tracking, a user input directed to key 542 (e.g., the function or "fn" key) of the peripheral device 501. As noted above, in various implementations, the electronic device 120 detects keystrokes directed to the peripheral device 501 via CV or input detection signals associated with keystrokes obtained (e.g., received or retrieved) from the peripheral device 501 and presents corresponding characters on the note interface 522.

As shown in FIG. 5F, during the instance 550 (e.g., associated with time Ts) of the content delivery scenario, the electronic device 120 presents second XR content in response to detecting the user input directed to the key 542 in FIG. 5E. For example, the second XR content corresponds a second set of one or more virtual augmentations 552A and 552B associated with a function of or a usage of the key 542 of the peripheral device 501 while the application A (e.g., the Notes application) is running in the foreground. In this example, the second set of one or more virtual augmentations 552A and 552B corresponds to one or more key combination indicators associated with the key 542 while the application A (e.g., the Notes application) is running in the foreground. According to some implementations, the second set of one or more virtual augmentations 552A and 552B in FIG. 5F are different from the first set of one or more virtual augmentations 532A, 532B, and 532C in FIG. 5D due to detection of user inputs directed to different portions of the peripheral device (e.g., the key 524 in FIGS. 5C and 5D as opposed to the key 542 in FIGS. 5E and 5F).

As shown in FIG. 5F, the electronic device 120 presents a virtual augmentation 552A (e.g., a 2D or 3D pop-up indicator with the following text: "Press fn+s to share current note") in concert with a key 554A (e.g., the "s" key) of the peripheral device 501 while continuing to detect the user input directed to key 542. As shown in FIG. 5F, the electronic device 120 also presents a virtual augmentation 552B (e.g., a 2D or 3D pop-up indicator with the following text: "Press fn+p to add a picture to current note") in concert with a key 554B (e.g., the "p" key) of the peripheral device 501 while continuing to detect the user input directed to key 542. As shown in FIG. 5F, the electronic device 120 changes an appearance of the keys 554A and 554B (e.g., changed from a white texture in FIG. 5E to a striped texture in FIG. 5F) while continuing to detect the user input directed to key 542.

In FIG. 5F, the second set of one or more virtual augmentations 552A and 552B are at least partially overlaid on the keys 554A and 554B, respectively, of the peripheral device 501. One of ordinary skill in the art will appreciate that the second set of one or more virtual augmentations

552A and 552B are example pop-up key combination indicators that may be surfaced in different forms in various other implementations (e.g., banner notifications, overlaid on corresponding keys, etc.). One of ordinary skill in the art will appreciate that the second set of one or more virtual augmentations 552A and 552B are example key combination indicators that may be changed or otherwise modified in various other implementations (e.g., the text, size, shape, color, texture, placement, etc. may be changed or otherwise modified).

As shown in FIG. 5G, during the instance 560 (e.g., associated with time $T_6$) of the content delivery scenario, the electronic device 120 presents the note interface 522 (e.g., an instance of application A) in response to detecting the user input in FIG. 5B directed to the selectable affordance 512A associated with application A (e.g., the Notes application). In FIG. 5G, the electronic device 120 detects, via one or more microphones, a voice input 562 from the user 150. For example, the voice input 562 corresponds to the following voice command: "Please display a numpad."

As shown in FIG. 5H, during the instance 570 (e.g., associated with time $T_7$) of the content delivery scenario, the electronic device 120 presents a virtual numpad 572 adjacent to the peripheral device 501 and overlaid on the table 107 in response to detecting the voice input 562 in FIG. 5G. In FIG. 5H, the electronic device 120 detects, via one or more microphones, a voice input 574 from the user 150. For example, the voice input 574 corresponds to the following voice command: "Please display KB (keyboard) frame selection menu."

In some implementations, the electronic device 120 or a component thereof (e.g., the object tracking engine 410 in FIGS. 2 and 4A) localizes the peripheral device 501 by obtaining spatial information associated with the peripheral device 501 such as its translational and rotational values/coordinates relative to the physical environment 105 or the world at large (e.g., via computer vision (CV) techniques or the like). In some implementations, the electronic device 120 presents the virtual numpad 572 within the XR environment 128 based at least in part on the spatial information associated with the peripheral device 501. As one example, the electronic device 120 presents the virtual numpad 572 within the XR environment 128 such that the virtual numpad 572 is adjacent to but does not collide with or occlude the peripheral device 501. As another example, the electronic device 120 presents the virtual numpad 572 at a same view angle as the peripheral device 501. In some implementations, the electronic device 120 determines a size for the virtual numpad 572 based at least in part on the spatial information associated with the peripheral device 501 and/or the physical environment 105. In some implementations, the electronic device 120 detects inputs directed to the virtual numpad 572 via various extremity/hand tracking techniques.

As shown in FIG. 5I, during the instance 580 (e.g., associated with time Ts) of the content delivery scenario, the electronic device 120 presents a KB (keyboard) frame selection menu 582 in response to detecting the voice input 574 in FIG. 5H. As shown in FIG. 5I, the KB frame selection menu 582 includes a plurality of selectable keyboard frame options such as a first texture 584A, a second texture 584B, a first design 586A, and a second design 586B. For example, the plurality of selectable keyboard frame options may be selected via extremity/hand tracking inputs, touch inputs, voice inputs, eye tracking inputs, or the like. One of ordinary skill in the art will appreciate that the plurality of selectable keyboard frame options shown in FIG. 5I are mere examples that may be changed or otherwise modified in various other implementations. In FIG. 5H, the electronic device 120 detects, via one or more microphones, a voice input 588 from the user 150. For example, the voice input 588 corresponds to the following voice command: "Please select texture 584A."

As shown in FIG. 5J, during the instance 590 (e.g., associated with time $T_9$) of the content delivery scenario, the electronic device 120 presents the first texture 584A overlaid on the peripheral device 501 and the virtual numpad 572 in response to detecting the voice input 588 in FIG. 5I. As shown in FIG. 5J, the electronic device 120 changes an appearance of the frame or outline of the peripheral device 501 and the virtual numpad 572 (e.g., changed from a white texture in FIG. 5I to a dotted texture in FIG. 5J).

As shown in FIG. 5K, during the instance 5100 (e.g., associated with time $T_{10}$) of the content delivery scenario, the electronic device 120 presents the battery indicator 514 that corresponds to the current charge value for the peripheral device 501 and the plurality of selectable affordances 512A, 512B, 512C, and 512D associated with the applications A, B, C, and D, respectively. In FIG. 5K, the electronic device 120 detects, via extremity/hand tracking, a user input with the left hand of the user 150 directed to the selectable affordance 512B associated with application B (e.g., a Web Browser application).

As shown in FIG. 5L, during the instance 5110 (e.g., associated with time $T_{11}$) of the content delivery scenario, the electronic device 120 presents a web browser interface 5112 (e.g., an instance of application B) in response to detecting the user input in FIG. 5K directed to the selectable affordance 512B associated with application B (e.g., the Web Browser application). According to some implementations, the electronic device 120 detects inputs directed to the web browser interface 5112 via extremity/hand tracking inputs, touch inputs, voice inputs, eye tracking inputs, or the like. In FIG. 5L, the electronic device 120 detects, via extremity/hand tracking, a user input directed to key 524 (e.g., the command or "cmd" key) of the peripheral device 501.

As noted above, in various implementations, the electronic device 120 detects keystrokes directed to the peripheral device 501 via CV and presents corresponding characters within the web browser interface 5112. In various implementations, the electronic device 120 detects keystrokes directed to the peripheral device 501 via input detection signals associated with the keystrokes obtained (e.g., received or retrieved) from the peripheral device 501 and presents corresponding characters within the web browser interface 5112. One of ordinary skill in the art will appreciate that other input modalities may produce content presented on or otherwise modify the web browser interface 5112 such as touch inputs directed to the display 122, voice inputs, or the like. For example, the web browser interface 5112 corresponds to a 2D planar region or a 3D volumetric region within the XR environment 128.

As shown in FIG. 5M, during the instance 5120 (e.g., associated with time TO of the content delivery scenario, the electronic device 120 presents first XR content in response to detecting the user input directed to the key 524 in FIG. 5L. For example, the first XR content corresponds a first set of one or more virtual augmentations 5122A, 5122B, and 5122C associated with a function of or a usage of the key 524 of the peripheral device 501 while the application B (e.g., the Web Browser application) is running in the foreground. In this example, the first set of one or more virtual augmentations 5122A, 5122B, and 5122C corresponds to one or more key combination indicators associated with the key 524 while the application B (e.g., the Web Browser application) is running in the foreground.

As shown in FIG. 5M, the electronic device 120 presents a virtual augmentation 5122A (e.g., a 2D or 3D pop-up indicator with the following text: "Press cmd+w to close current tab") in concert with a key 5124A (e.g., the "w" key) of the peripheral device 501 while continuing to detect the user input directed to key 524. As shown in FIG. 5M, the electronic device 120 also presents a virtual augmentation 5122B (e.g., a 2D or 3D pop-up indicator with the following text: "Press cmd+j to view downloads") in concert with a key 5124B (e.g., the "j" key) of the peripheral device 501 while continuing to detect the user input directed to key 524. As shown in FIG. 5M, the electronic device 120 further presents a virtual augmentation 5122C (e.g., a 2D or 3D pop-up indicator with the following text: "Press cmd+n to open a new tab") in concert with a key 534C (e.g., the "n" key) of the peripheral device 501 while continuing to detect the user input directed to key 524. As shown in FIG. 5M, the electronic device 120 changes an appearance of the keys 5124A, 5124B, and 5124C (e.g., changed from a white texture in FIG. 5L to a striped texture in FIG. 5M) while continuing to detect the user input directed to key 524.

In FIG. 5M, the first set of one or more virtual augmentations 5122A, 5122B, and 5122C are at least partially overlaid on the keys 5124A, 5124B, and 5124C, respectively, of the peripheral device 501. One of ordinary skill in the art will appreciate that the first set of one or more virtual augmentations 5122A, 5122B, and 5122C are example pop-up key combination indicators that may be surfaced in different forms in various other implementations (e.g., banner notifications, overlaid on corresponding keys, etc.). One of ordinary skill in the art will appreciate that the first set of one or more virtual augmentations 5124A, 5124B, and 5124C are example key combination indicators that may be changed or otherwise modified in various other implementations (e.g., the text, size, shape, color, texture, placement, etc. may be changed or otherwise modified).

As shown in FIG. 5N, during the instance 5130 (e.g., associated with time $T_{13}$) of the content delivery scenario, the electronic device 120 presents a web browser interface 5112 (e.g., an instance of application B) in response to detecting the user input in FIG. 5K directed to the selectable affordance 512B associated with application B (e.g., the Web Browser application). In FIG. 5N, the electronic device 120 detects, via extremity/hand tracking, a user input directed to key 542 (e.g., the function or "fn" key) of the peripheral device 501. As noted above, in various implementations, the electronic device 120 detects keystrokes directed to the peripheral device 501 via CV or input detection signals associated with keystrokes obtained (e.g., received or retrieved) from the peripheral device 501 and presents corresponding characters within the web browser interface 5112.

As shown in FIG. 5O, during the instance 5140 (e.g., associated with time $T_{14}$) of the content delivery scenario, the electronic device 120 presents second XR content in response to detecting the user input directed to the key 542 in FIG. 5N. For example, the second XR content corresponds a second set of one or more virtual augmentations 5142A and 5142B associated with a function of or a usage of the key 542 of the peripheral device 501 while the application B (e.g., the Web Browser application) is running in the foreground. In this example, the second set of one or more virtual augmentations 5142A and 5142B corresponds to one or more key combination indicators associated with the key 542 while the application B (e.g., the Web Browser application) is running in the foreground. According to some implementations, the second set of one or more virtual augmentations 5142A and 5142B in FIG. 5O are different from the first set of one or more virtual augmentations 5122A, 512B, and 5122C in FIG. 5M due to detection of user inputs directed to different portions of the peripheral device (e.g., the key 524 in FIGS. 5L and 5M as opposed to the key 542 in FIGS. 5N and 5O).

As shown in FIG. 5O, the electronic device 120 presents a virtual augmentation 5142A (e.g., a 2D or 3D pop-up indicator with the following text: "Press fn+c to view HTML code") in concert with a key 5144A (e.g., the "c" key) of the peripheral device 501 while continuing to detect the user input directed to key 542. As shown in FIG. 5O, the electronic device 120 also presents a virtual augmentation 5142B (e.g., a 2D or 3D pop-up indicator with the following text: "Press fn+n to view navigation tools") in concert with a key 5144B (e.g., the "n" key) of the peripheral device 501 while continuing to detect the user input directed to key 542. As shown in FIG. 5O, the electronic device 120 changes an appearance of the keys 5144A and 5144B (e.g., changed from a white texture in FIG. 5N to a striped texture in FIG. 5O) while continuing to detect the user input directed to key 542.

In FIG. 5O, the second set of one or more virtual augmentations 5142A and 5142B are at least partially overlaid on the keys 5144A and 5144B, respectively, of the peripheral device 501. One of ordinary skill in the art will appreciate that the second set of one or more virtual augmentations 5142A and 5142B are example pop-up key combination indicators that may be surfaced in different forms in various other implementations (e.g., banner notifications, overlaid on corresponding keys, etc.). One of ordinary skill in the art will appreciate that the second set of one or more virtual augmentations 5142A and 5142B are example key combination indicators that may be changed or otherwise modified in various other implementations (e.g., the text, size, shape, color, texture, placement, etc. may be changed or otherwise modified).

As shown in FIG. 5P, during the instance 5150 (e.g., associated with time $T_{15}$) of the content delivery scenario, the electronic device 120 presents the battery indicator 514 that corresponds to the current charge value for a peripheral device 5151A (e.g., a physical TSS, such as a trackpad, within the physical environment 105) and the plurality of selectable affordances 512A, 512B, 512C, and 512D associated with applications A, B, C, and D, respectively. In FIG. 5P, the electronic device 120 detects, via extremity/hand tracking, a user input with the left hand of the user 150 directed to the selectable affordance 512C associated with application C (e.g., a Document Creation application). In some implementations, the peripheral device 5151A is communicatively coupled with one of the controller 110 shown in FIGS. 1 and 2, the electronic device 120 shown in FIGS. 1 and 3, and/or a suitable combination thereof via one or more wired or wireless communication channels (e.g., BLUETOOTH, ZIGBEE, IEEE 802.11x, IEEE 802.16x, IEEE 802.3x, etc.).

As shown in FIG. 5Q, during the instance 5160 (e.g., associated with time $T_{16}$) of the content delivery scenario, the electronic device 120 presents a document creation interface 5162 (e.g., an instance of application C) in response to detecting the user input in FIG. 5P directed to the selectable affordance 512C associated with application C (e.g., the Document Creation application). According to some implementations, the electronic device 120 detects inputs directed to the document creation interface 5162 via extremity/hand tracking inputs, touch inputs, voice inputs, eye tracking inputs, or the like. In some implementations, the electronic device 120 detects touch inputs directed to the peripheral device 5151A via CV or input detection signals associated with the touch inputs obtained (e.g., received or retrieved) from the peripheral device 5151A and presents corresponding characters on the document creation interface 5162. For example, the document creation interface 5162 corresponds to a 2D planar region or a 3D volumetric region within the XR environment 128.

As shown in FIG. 5Q, during the instance 5160 (e.g., associated with time $T_{16}$) of the content delivery scenario, the electronic device 120 also presents a virtual keyboard 5164 on the peripheral device 5151A in response to detecting the user input in FIG. 5P directed to the selectable affordance 512C associated with application C (e.g., the Document Creation application). In some implementations, the electronic device 120 or a component thereof (e.g., the object tracking engine 410 in FIGS. 2 and 4A) localizes the peripheral device 5151A by obtaining spatial information associated with the peripheral device 5151A such as its translational and rotational values/coordinates relative to the physical environment 105 or the world at large (e.g., via CV techniques or the like). In some implementations, the electronic device 120 presents the virtual keyboard 5164 within the XR environment 128 based at least in part on the spatial information associated with the peripheral device 5151A. As one example, the electronic device 120 presents the virtual keyboard 5164 within the XR environment 128 such that the virtual keyboard 5164 is overlaid on the peripheral device 5151A. As another example, the electronic device 120 presents the virtual keyboard 5164 at a same view angle as the peripheral device 5151A. In some implementations, the electronic device 120 determines a size for the virtual keyboard 5164 based at least in part on the spatial information associated with the peripheral device 5151A and/or the physical environment 105. In some implementations, the electronic device 120 detects inputs directed to the virtual keyboard 5164 via various extremity/hand tracking techniques or signals from the peripheral device 5151A.

As shown in FIG. 5R, during the instance 5170 (e.g., associated with time TO of the content delivery scenario, the electronic device 120 presents first XR content in response to detecting a user input directed to a virtual key 5171 (e.g., the virtual "command" key) of the virtual keyboard 5164 with a user's left hand 150A. For example, the first XR content corresponds a first set of one or more virtual augmentations 5172A, 5172B, and 5172C associated with a function of or a usage of the virtual key 5171 of the virtual keyboard 5164 while the application C (e.g., the Document Creation application) is running in the foreground. In this example, the first set of one or more virtual augmentations 5172A, 5172B, and 5172C corresponds to one or more key combination indicators associated with the virtual key 5171 while the application C (e.g., the Document Creation application) running in the foreground.

As shown in FIG. 5R, the electronic device 120 presents a virtual augmentation 5172A (e.g., a 2D or 3D pop-up indicator with the following text: "Press cmd+w to close current document") in concert with a virtual key 5174A (e.g., the "w" key) of the virtual keyboard 5164 while continuing to detect the user input directed to the virtual key 5171. As shown in FIG. 5R, the electronic device 120 also presents a virtual augmentation 5172B (e.g., a 2D or 3D pop-up indicator with the following text: "Press cmd+o to open a document") in concert with a virtual key 5174B (e.g., the "o" key) of the virtual keyboard 5164 while continuing to detect the user input directed to the virtual key 5171. As shown in FIG. 5R, the electronic device 120 further presents a virtual augmentation 5172C (e.g., a 2D or 3D pop-up indicator with the following text: "Press cmd+n to open a new document") in concert with a virtual key 5174C (e.g., the "n" key) of the virtual keyboard 5164 while continuing to detect the user input directed to the virtual key 5171. As shown in FIG. 5M, the electronic device 120 changes an appearance of the virtual keys 5174A, 5174B, and 5174C (e.g., changed from a white texture in FIG. 5Q to a striped texture in FIG. 5R) while continuing to detect the user input directed to the virtual key 5171.

In FIG. 5R, the first set of one or more virtual augmentations 5172A, 5172B, and 5172C are at least partially overlaid on the keys 5174A, 5174B, and 5174C, respectively, of the virtual keyboard 5164. One of ordinary skill in the art will appreciate that the first set of one or more virtual augmentations 5172A, 5172B, and 5172C are example pop-up key combination indicators that may be surfaced in different forms in various other implementations (e.g., banner notifications, overlaid on corresponding keys, etc.). One of ordinary skill in the art will appreciate that the first set of one or more virtual augmentations 5172A, 5172B, and 5172C are example key combination indicators that may be changed or otherwise modified in various other implementations (e.g., the text, size, shape, color, texture, placement, etc. may be changed or otherwise modified).

As shown in FIG. 5S, during the instance 5180 (e.g., associated with time $T_{18}$) of the content delivery scenario, the electronic device 120 presents second XR content in response to detecting a user input directed to a virtual key 5181 (e.g., the virtual "shift" key) of the virtual keyboard 5164 with a user's right hand 150B while continuing to detect the user input directed to the virtual key 5181 of the virtual keyboard 5164 with the user's left hand 150A. For example, the second XR content corresponds a second set of one or more virtual augmentations 5182A, 5182B, and 5182C associated with a function of or a usage of the virtual keys 5171 and 5181 of the virtual keyboard 5164 while the application C (e.g., the Document Creation application) is running in the foreground. In this example, the second set of one or more virtual augmentations 5182A, 5182B, and 5182C corresponds to one or more key combination indicators associated with the virtual keys 5171 and 5181 while the application C (e.g., the Document Creation application) running in the foreground.

As shown in FIG. 5S, the electronic device 120 presents a virtual augmentation 5182A (e.g., a 2D or 3D pop-up indicator with the following text: "Press cmd+shift+a to deselect all") in concert with a virtual key 5184A (e.g., the "a" key) of the virtual keyboard 5164 while continuing to detect the user inputs directed to the virtual keys 5171 and 5181. As shown in FIG. 5S, the electronic device 120 also presents a virtual augmentation 5182B (e.g., a 2D or 3D pop-up indicator with the following text: "Press cmd+shift+; to show the spelling & grammar window") in concert with a virtual key 5184B (e.g., the ";" key) of the virtual keyboard 5164 while continuing to detect the user inputs directed to the virtual keys 5171 and 5181. As shown in FIG. 5S, the electronic device 120 further presents a virtual augmentation 5182C (e.g., a 2D or 3D pop-up indicator with the following text: "Press cmd+shift+v to show the colors window") in concert with a virtual key 5184C (e.g., the "v" key) of the virtual keyboard 5164 while continuing to detect the user inputs directed to the virtual keys 5171 and 5181. As shown in FIG. 5M, the electronic device 120 changes an appearance of the virtual keys 5184A, 5184B, and 5184C (e.g., changed from a white texture in FIG. 5Q to a striped texture in FIG. 5S) while continuing to detect the user inputs directed to the virtual keys 5171 and 5181.

In FIG. 5S, the second set of one or more virtual augmentations 5182A, 5182B, and 5182C are at least partially overlaid on the keys 5184A, 5184B, and 5184C, respectively, of the virtual keyboard 5164. One of ordinary skill in the art will appreciate that the second set of one or more virtual augmentations 5182A, 5182B, and 5182C are example pop-up key combination indicators that may be surfaced in different forms in various other implementations (e.g., banner notifications, overlaid on corresponding keys, etc.). One of ordinary skill in the art will appreciate that the second set of one or more virtual augmentations 5182A, 5182B, and 5182C are example key combination indicators that may be changed or otherwise modified in various other implementations (e.g., the text, size, shape, color, texture, placement, etc. may be changed or otherwise modified).

As shown in FIG. 5T, during the instance 5190 (e.g., associated with time $T_{19}$) of the content delivery scenario, the electronic device 120 presents the battery indicator 514 that corresponds to the current charge value for a peripheral device 5151B (e.g., a physical TSS, such as a trackpad, within the physical environment 105) and the plurality of selectable affordances 512A, 512B, 512C, and 512D associated with applications A, B, C, and D, respectively. In FIG. 5T, the electronic device 120 detects a touch input 5192, via the display 122, directed to the selectable affordance 512D associated with application D (e.g., a Music Creation application). In some implementations, the peripheral device 5151B is communicatively coupled with one of the controller 110 shown in FIGS. 1 and 2, the electronic device 120 shown in FIGS. 1 and 3, and/or a suitable combination thereof via one or more wired or wireless communication channels (e.g., BLUETOOTH, ZIGBEE, IEEE 802.11x, IEEE 802.16x, IEEE 802.3x, etc.).

As shown in FIG. 5U, during the instance 5200 (e.g., associated with time $T_{20}$) of the content delivery scenario, the electronic device 120 presents a music creation interface 5202 (e.g., an instance of application D) in response to detecting the touch input 5192 in FIG. 5T directed to the selectable affordance 512D associated with application D (e.g., the Music Creation application). According to some implementations, the electronic device 120 detects inputs directed to the music creation interface 5202 via extremity/hand tracking inputs, touch inputs, voice inputs, eye tracking inputs, or the like. According to some implementations, the electronic device 120 detects touch inputs directed to the peripheral device 5151B via CV or input detection signals associated with the touch inputs obtained (e.g., received or retrieved) from the peripheral device 5151B and presents corresponding characters on the music creation interface 5202. For example, the music creation interface 5202 corresponds to a 2D planar region or a 3D volumetric region within the XR environment 128.

As shown in FIG. 5U, during the instance 5200 of the content delivery scenario, the electronic device 120 also presents an affordance 5204 within the XR environment 128 in response to detecting the touch input 5192 in FIG. 5T directed to the selectable affordance 512D associated with application D (e.g., the Music Creation application). For example, in response to detecting selection of the affordance 5204 (e.g., optionally including the following text: "Select to present additional virtual affordances") with a touch input, an extremity/hand tracking input, a voice input, an eye tracking input, or the like, the electronic device 120 presents virtual augmentations (e.g., a plurality of controls) on the peripheral device 5152B and/or nearby the peripheral device 5151B that are associated with application D (e.g., the Music Creation application). In FIG. 5U, the electronic device 120 detects, via extremity/hand tracking, a user input with the left hand of the user 150 directed to the selectable affordance 5204.

As shown in FIG. 5V, during the instance 5210 (e.g., associated with time $T_{21}$)) of the content delivery scenario, the electronic device 120 presents a plurality of virtual controls 5212 associated with application D (e.g., the Music Creation application) on the peripheral device 5151B in response to detecting the user input in FIG. 5U directed to the selectable affordance 5204. For example, the plurality of virtual controls 5212 includes an equalizer with controllable sliders (e.g., with a low frequency slider in a first state 5214A), a plurality of different selectable instrument families or instrument types, a plurality of different selectable samples, a plurality of controllable dials, and/or the like. One of ordinary skill in the art will appreciate that the plurality of virtual controls 5204 are merely examples that may be changed or otherwise modified in various other implementations. As shown in FIG. 5V, the electronic device 120 also detects, via extremity/hand tracking, a downward dragging input 5216 with the left hand of the user 150 directed to the low frequency slider in the first state 5214A.

In some implementations, the electronic device 120 or a component thereof (e.g., the object tracking engine 410 in FIGS. 2 and 4A) localizes the peripheral device 5151B by obtaining spatial information associated with the peripheral device 5151B such as its translational and rotational values/coordinates relative to the physical environment 105 or the world at large (e.g., via CV techniques or the like). In some implementations, the electronic device 120 presents the plurality of virtual controls 5212 within the XR environment 128 based at least in part on the spatial information associated with the peripheral device 5151B and/or the physical environment 105. As one example, the electronic device 120 presents the plurality of virtual controls 5212 within the XR environment 128 such that the plurality of virtual controls 5212 are overlaid on the peripheral device 5151B. As another example, the electronic device 120 presents the plurality of virtual controls 5212 at a same view angle as the peripheral device 5151B. In some implementations, the electronic device 120 determines a size for the plurality of virtual controls 5212 based at least in part on the spatial information associated with the peripheral device 5151B and/or the physical environment 105. In some implementations, the electronic device 120 detects inputs directed to the plurality of virtual controls 5212 via various extremity/hand tracking techniques or signals from the peripheral device 5151B.

As shown in FIG. 5W, during the instance 5220 (e.g., associated with time $T_{22}$) of the content delivery scenario, the electronic device 120 presents the low frequency slider in a second state 5214B in response to detecting the downward dragging input 5216 in FIG. 5V.

FIG. 6 is a flowchart representation of a method 600 of presenting virtual augmentations associated with a function of or a usage of a portion of the peripheral device in accordance with some implementations. In various implementations, the method 600 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method

600 is performed by processing logic, including hardware, firmware, software, or a combination thereof. In some implementations, the method 600 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from one or more exterior-facing image sensors, an object tracking engine, a finger/hand/extremity tracking engine, an eye tracking engine, a touch-sensitive surface, one or more microphones, and/or the like.

Often users may not know of the existence of hot key combinations or accelerators for the operating system or while in a specific application. The user may have to research or sit through a tutorial to attain knowledge of said hot key combinations or accelerators. Thus, the innovation described herein provides key combination indicators and accelerator hints associated with a peripheral device. To that end, virtual augmentations are presented on a peripheral device (e.g., a keyboard or trackpad) to indicate functionality of the peripheral device.

As represented by block 602, the method 600 includes detecting a peripheral device within a physical environment. In some implementations, the computing system detects the peripheral device by way of computer vision (e.g., object recognition, semantic segmentation, etc.), a BLUETOOTH connection, a beacon signal, a Wi-Fi connection, and/or the like. With reference to FIG. 4A, for example, the computing system or a component thereof (e.g., the object tracking engine 410) is configured to localize the peripheral device within the physical environment 105 and track the peripheral device as it moves within the physical environment 105. In some implementations, the computing system is communicatively coupled to the peripheral device via one or more wired or wireless communication channels (e.g., BLUETOOTH, ZIGBEE, IEEE 802.11x, IEEE 802.16x, IEEE 802.3x, etc.). In some implementations, the computing system is not communicatively coupled to the peripheral device.

In some implementations, the peripheral device corresponds to one of a keyboard, a trackpad, or other touch-sensitive surface. As one example, the virtual augmentations correspond to hot key combination indicators. As another example, the virtual augmentations correspond to virtual keys or virtual other controls. In FIG. 5B, for example, the computing system detects the peripheral device 501 (e.g., a physical keyboard) within the physical environment 105 based on CV and/or a communication channel thereto. In FIG. 5P, for example, the computing system detects the peripheral device 5151A (e.g., a physical TSS such as a trackpad or the like) within the physical environment 105 based on CV and/or a communication channel thereto. In FIG. 5T, for example, the computing system detects the peripheral device 5151B (e.g., a physical TSS such as a trackpad or the like) within the physical environment 105 based on CV and/or a communication channel thereto.

As represented by block 604, the method 600 includes detecting a first user input directed to the peripheral device. In some implementations, the first user input is detected by way of computer vision (CV), extremity/hand tracking, eye gaze tracking, input detection at the display 122, input detection at the peripheral device, and/or the like.

As one example, with reference to FIG. 4A, the computing system or a component thereof (e.g., the communication interface 406) obtains signals 407 from a peripheral device communicatively coupled thereto via one or more wired or wireless communication channels (e.g., BLUETOOTH, ZIGBEE, IEEE 802.11x, IEEE 802.16x, IEEE 802.3x, etc.). For example, the signals 407 includes input detection signals associated with touch inputs, keystrokes, etc. detected by the peripheral device. As another example, the computing system or a component thereof (e.g., the body/head pose tracking engine 414) detects user inputs, via extremity/hand tracking, directed to the peripheral device using CV techniques.

In some implementations, prior to detecting the first user input, the method 600 includes detecting a previous user input associated with activating virtual augmentations associated with the peripheral device, wherein the first XR content is presented in accordance with the determination that the first user input is directed to the first portion of the peripheral device and in accordance with the determination that the virtual augmentations associated with the peripheral device are activated. As such, in one example, a user manually activates virtual augmentations via a radio button within a settings menu or the like.

In response to detecting the first user input, as represented by block 606, the method 600 includes presenting, via the display device, first extended reality (XR) content in concert with the first portion of the peripheral device, wherein the first XR content includes a first set of one or more virtual augmentations associated with a function of or a usage of the first portion of the peripheral device in accordance with a determination that the first user input is directed to a first portion of the peripheral device. According to some implementations, the first portion of the peripheral device corresponds to a region of a TSS, a physical key, a virtual key, a UI element, an affordance, a radio button, a physical slider, a virtual slider, a virtual knob/dial, a physical knob/dial, or the like. For example, the computing system presents the first XR content adjacent to the first portion of the peripheral device (e.g., a first key pressed on a keyboard). For example, the computing system presents the first XR content at least partially overlaid on the first portion of the peripheral device (e.g., the first key pressed on the keyboard).

As one example, FIGS. 5C and 5D illustrate a sequence in which the computing system presents a first set of one or more virtual augmentations 532A, 532B, and 532C associated with a function of or a usage of a key 524 of the peripheral device 501 in response to detecting a user input directed to the key 524 of the peripheral device 501 while application A (e.g., the Notes application) is running in the foreground. In this example, the first set of one or more virtual augmentations 532A, 532B, and 532C are at least partially overlaid on the keys 534A, 534B, and 534C, respectively, of the peripheral device 501. One of ordinary skill in the art will appreciate that the first set of one or more virtual augmentations 532A, 532B, and 532C are example pop-up key combination indicators that may be surfaced in different forms in various other implementations (e.g., banner notifications, overlaid on corresponding keys, etc.). One of ordinary skill in the art will appreciate that the first set of one or more virtual augmentations 532A, 532B, and 532C are example key combination indicators that may be changed or otherwise modified in various other implementations (e.g., the text, size, shape, color, texture, placement, etc. may be changed or otherwise modified).

As another example, FIGS. 5L and 5M illustrate a sequence in which the computing system presents a first set of one or more virtual augmentations 5122A, 5122B, and 5122C associated with a function of or a usage of a key 524 of the peripheral device 501 in response to detecting a user input directed to the key 524 of the peripheral device 501 while the application B (e.g., the Web Browser application) is running in the foreground.

In response to detecting the first user input, as represented by block 608, the method 600 includes presenting, via the display device, second XR content in concert with the second portion of the peripheral device, wherein the second XR content includes a second set of one or more virtual augmentations associated with a function of or a usage of the second portion of the peripheral device in accordance with a determination that the first user input is directed to a second portion of the peripheral device different from the first portion of the peripheral device. According to some implementations, the second portion of the peripheral device corresponds to a region of a TSS, a physical key, a virtual key, a UI element, an affordance, a radio button, a physical slider, a virtual slider, a virtual knob/dial, a physical knob/dial, or the like. As one example, the second XR content is presented adjacent to the second portion of the peripheral device. As another example, the second XR content is at least partially overlaid on the second portion of the peripheral device.

In some implementations, the first and second portions of the peripheral device correspond to different physical keys of a keyboard. In some implementations, the first and second portions of the peripheral device correspond to different regions of a trackpad or a TSS. In some implementations, the first and second sets of virtual augmentations include mutually exclusive virtual augmentations. In some implementations, the first and second sets of virtual augmentations include at least one common virtual augmentation.

In some implementations, the computing system or a component thereof (e.g., the object tracking engine 410 in FIGS. 2 and 4A) also localizes the peripheral device by obtaining spatial information associated with the peripheral device such as its translational and rotational values/coordinates relative to the physical environment or the world at large (e.g., via CV techniques). In some implementations, the first and second XR content are presented within an XR environment based at least in part on the spatial information associated with the peripheral device and/or the first and second portions thereof.

As one example, FIGS. 5E and 5F illustrate a sequence in which the computing system presents a second set of one or more virtual augmentations 552A and 552B associated with a function of or a usage of a key 542 of the peripheral device 501 in response to detecting a user input directed to the key 542 of the peripheral device 501 while application A (e.g., the Notes application) is running in the foreground. In this example, the second set of one or more virtual augmentations 552A and 552B are at least partially overlaid on the keys 554A and 554B, respectively, of the peripheral device 501. According to some implementations, the second set of one or more virtual augmentations 552A and 552B in FIG. 5F are different from the first set of one or more virtual augmentations 532A, 532B, and 532C in FIG. 5D due to detection of user inputs directed to different portions of the peripheral device (e.g., the key 524 in FIGS. 5C and 5D as opposed to the key 542 in FIGS. 5E and 5F).

As another example, FIGS. 5N and 5O illustrate a sequence in which the computing system presents second set of one or more virtual augmentations 5142A and 5142B associated with a function of or a usage of the key 542 of the peripheral device 501 in response to detecting a user input directed to the key 542 of the peripheral device 501 while the application B (e.g., the Web Browser application) is running in the foreground. According to some implementations, the second set of one or more virtual augmentations 5142A and 5142B in FIG. 5O are different from the first set of one or more virtual augmentations 5122A, 5122B, 5122C in FIG. 5M due to detection of user inputs directed to different portions of the peripheral device (e.g., the key 524 in FIGS. 5L and 5M as opposed to the key 542 in FIGS. 5N and 5O).

With reference to FIG. 4C, the computing system or a component thereof (e.g., the content updater 436) updates the XR environment 128 (and the XR content, VA(s), and/or the like therein) to include the first or second XR content. With further reference to FIG. 4C, the computing system or a component thereof (e.g., the pose determiner 452) determines a current camera pose of the electronic device 120 and/or the user 150 relative to the XR environment 128 and/or the physical environment 105. According to some implementations, the pose determiner 452 updates the current camera pose in response to detecting translational and/or rotational movement of the electronic device 120 and/or the user 150. With continued reference to FIG. 4C, the computing system or a component thereof (e.g., the renderer 454) renders the XR content, VA(s), and/or the like according to the current camera pose relative thereto.

With continued reference to FIG. 4C, the computing system or a component thereof (e.g., the compositor 464) composites the rendered XR content, VA(s), and/or the like with the processed image stream of the physical environment 105 from the image processing architecture 462 to produce rendered image frames of the XR environment. In various implementations, the presenter 470 presents the rendered image frames of the XR environment to the user 150 (e.g., via the one or more displays 312 of the electronic device 120). One of ordinary skill in the art will appreciate that the optional image processing architecture 462 and the optional compositor 464 may not be applicable for fully virtual environments (or optical see-through scenarios).

In some implementations, the display device corresponds to a transparent lens assembly, and wherein the first and second XR content is projected onto the transparent lens assembly. In some implementations, the display device corresponds to a near-eye system, and wherein presenting the first and second XR content includes compositing the first and second XR content with one or more images of a physical environment captured by an exterior-facing image sensor.

In some implementations, as represented by block 612, the method 600 includes selecting the first and second XR content based on a current foreground application. For example, the XR content is different when a notes application is running in the foreground as opposed to when a music generation application is running in the foreground.

As one example, the computing system presents the first set of one or more virtual augmentations 532A, 532B, and 532C that correspond to one or more key combination indicators associated with the key 524 while the application A (e.g., the Notes application) is running in the foreground in FIG. 5D. In comparison, in another example, the computing system presents the first set of one or more virtual augmentations 5122A, 5122B, and 5122C corresponds to one or more key combination indicators associated with the key 524 while the application B (e.g., the Web Browser application) is running in the foreground in FIG. 5M.

In some implementations, as represented by block 614, the method 600 includes selecting the first and second XR content based on at least one of a user profile, user preferences, usage history, or a last used application. For example, the XR content is different based on user characteristics such as usage history, preferences, etc.

In some implementations, as represented by block 616, the first set of one or more virtual augmentations correspond to a first set of key combination indicators associated with the first portion of the peripheral device, and wherein the second set of one or more virtual augmentations correspond to a second set of key combination indicators associated with the second portion of the peripheral device. For example, a respective key combination indicator corresponds to a hot key indicator that includes text describing a functionality associated with pressing the key/portion of the peripheral device such as "ctrl+n for a new note" while in a notes application, "ctrl+s to save current note" while in the notes application, or "ctrl+n for a new folder" while in a file navigation application.

With reference to the sequence in FIGS. 5C and 5D, as one example, the first set of one or more virtual augmentations 532A, 532B, and 532C corresponds to one or more key combination indicators associated with the key 524 while the application A (e.g., the Notes application) is running in the foreground. With reference to the sequence in FIGS. 5E and 5F, as another example, the second set of one or more virtual augmentations 552A and 552B corresponds to one or more key combination indicators associated with the key 542 while the application A (e.g., the Notes application) is running in the foreground.

With reference to the sequence in FIGS. 5L and 5M, as yet another example, the first set of one or more virtual augmentations 5122A, 5122B, and 5122C corresponds to one or more key combination indicators associated with the key 524 while the application B (e.g., the Web Browser application) is running in the foreground With reference to the sequence in FIGS. 5N and 5O, as yet another example, the second set of one or more virtual augmentations 5142A and 5142B corresponds to one or more key combination indicators associated with the key 542 while the application B (e.g., the Web Browser application) is running in the foreground.

In some implementations, the key combination indicators are based on a last used application, most recently and/or frequently used functions of the current application by the user or crowd-sourced group of users, a query from the user (e.g., a voice input), and/or the like. In some implementations, the computing device concurrently displays a plurality of hot key indicators associated with the first or second portion of the peripheral device.

In some implementations, in response to detecting the first user input, the computing device changes an appearance of the first or second portions of the peripheral device such as applying a spotlight to the first or second portions, applying a glow to the first or second portions, changing a brightness of the first or second portions, changing a contrast of the first or second portions, changing a color of the first or second portions, changing a texture of the first or second portions, and/or the like. As one example, in FIG. 5D, the electronic device 120 changes an appearance of the keys 534A, 534B, and 534C (e.g., changed from a white texture in FIG. 5C to a striped texture in FIG. 5D) while continuing to detect the user input directed to key 524. As another example, In some implementations, the first and second sets of one or more virtual augmentations are presented adjacent to the peripheral device In some implementations, the first and second sets of one or more virtual augmentations are overlaid on the peripheral device. For example, the virtual augmentations are overlaid on individual keys of the peripheral device. As one example, in FIG. 5F, the second set of one or more virtual augmentations 552A and 552B are at least partially overlaid on the keys 554A and 554B, respectively, of the peripheral device 501. As another example, in FIG. 5H, the computing system presents the virtual numpad 572 adjacent to the peripheral device 501. As yet another example, in FIG. 5Q, the computing system presents the virtual keyboard 5164 overlaid on the peripheral device 5151A. As yet another example, in FIG. 5V, the computing system presents the plurality of virtual controls 5212 overlaid on the peripheral device 5151B.

In some implementations, the method 600 further includes: detecting a second user input directed to a combination of the first portion of the peripheral device and a third portion of the peripheral device; and in response to detecting the second user input, performing an operation associated with the combination of the first portion of the peripheral device and the third portion of the peripheral device. In some implementations, the operation corresponds to displaying corresponding text within a user interface (UI) or an XR environment. In some implementations, the operation corresponds to manipulating existing content within a user interface (UI) or an XR environment.

For example, the second user input corresponds to a key press combination such as ctrl+n, ctrl+s, fn+a, etc. As one example, with reference to FIG. 5D, in response to detecting a second user input directed to a combination of the key 524 (e.g., the "cmd" key) and the key 534A (e.g., the "w" key), the computing system causes performance of an operation associated with the key combination (e.g crud+w) such as closing the note interface 522 as indicated by the virtual augmentation 532A.

In some implementations, the method 600 further includes: detecting a second user input directed to a third portion of the peripheral device different from the first and second portions of the peripheral device; and in response to detecting the second user input, modifying the first or second XR content by displaying, via the display device, third XR content in concert with the third portion of the peripheral device, wherein the third XR content includes one or more virtual augmentations associated with a function of or a usage of the third portion of the peripheral device. In some implementations, the computing system dynamically updates the virtual augmentations upon detecting cessation of the user input depressing the initial key/portion and/or upon detecting a subsequent user input depressing another key/portion on the peripheral device.

In some implementations, the method 600 further includes modifying the first or second XR content as a camera pose associated with the computing system changes relative to the physical environment. For example, the computing system modifies the first or second XR content as the perspective/view angle changes or the perspective/view distances changes relative to the peripheral device or the physical environment. In some implementations, the camera pose corresponds to a viewpoint of the user 150, for example, when the user 150 is holding, wearing, or otherwise utilizing the electronic device 120.

In some implementations, the method 600 further includes: detecting a voice input that corresponds to presenting virtual augmentations; and, in response to detecting the voice input: in accordance with a determination that a gaze direction is directed to the first portion of the peripheral device, displaying, via the display device, the first XR content in concert with the first portion of the peripheral device, wherein the first XR content includes one or more virtual augmentations associated with a function of or a usage of the first portion of the peripheral device; and in accordance with a determination that the gaze direction is directed to the second portion of the peripheral device, displaying, via the display device, the second XR content in concert with the second portion of the peripheral device, wherein the second XR content includes one or more virtual augmentations associated with a function of or a usage of the second portion of the peripheral device. As one example, while detecting that the user is gazing down at a portion of the peripheral device and providing a voice command to the computing system (e.g., a virtual assistant) to highlight certain hotkeys, the computing system presents the virtual augmentations in a hands-free manner.

In some implementations, the method 600 further includes: presenting, via the display device, an affordance based on contextual information that causes additional affordances, controls, or input overlays to be presented; detecting a second user input directed to the affordance; and in response to detecting the second user input directed to the affordance, presenting, via the display device, additional affordances, controls, or input overlays based on the contextual information. For example, the contextual information corresponds to a current foreground application or the like. In some implementations, the computing system presents a shortcut for presenting additional affordances, controls, or input overlays associated with the current foreground application such as a numpad, sliders, dials, etc. for accelerating the user experience associated with the current foreground application.

As one example, FIGS. 5U and 5V illustrate a sequence in which the computing system presents a plurality of virtual controls 5212 associated with application D (e.g., the Music Creation application) on the peripheral device 5151B in response to detecting the user input in FIG. 5U directed to the selectable affordance 5204. For example, the plurality of virtual controls 5212 includes an equalizer with controllable sliders, a plurality of different selectable instrument families or instrument types, a plurality of different selectable samples, a plurality of controllable dials, and/or the like. One of ordinary skill in the art will appreciate that the plurality of virtual controls 5212 are merely examples that may be changed or otherwise modified in various other implementations.

In some implementations, the method 600 further includes: presenting, via the display device, additional affordances or input overlays based on contextual information; detecting a second user input directed to one of the additional affordances or input overlays; and in response to detecting the second user input directed to one of the additional affordances or input overlays, modifying previously presented content based on the second user input directed to one of the additional affordances or input overlays. For example, the contextual information corresponds to a current foreground application or the like. In some implementations, the computing system automatically presents a control panel or the like associated with the current foreground application such as an equalizer for a music generation application that affects music produced therein. As one example, FIGS. 5P and 5Q illustrate a sequence in which the computing system presents a virtual keyboard 5164 on the peripheral device 5151A in response to detecting the user input in FIG. 5P directed to the selectable affordance 512C associated with application C (e.g., the Document Creation application).

In some implementations, the method 600 further includes: detecting a third user input directed to selecting a custom frame for the peripheral device; and in response to detecting the third user input, presenting, via the display device, the custom frame or an associated outline augmentation on the peripheral device. In some implementations, the custom frame is selected from a menu of frames for the peripheral device. In some implementations, the computing system dynamically updates the custom frame based on changes within the physical environment such as ambient brightness, contrast, user modification inputs, etc.

As one example, FIGS. 5H-5J illustrate a sequence in which a user selects a custom frame for the peripheral device 501. Continuing with this example, the computing system presents a KB (keyboard) frame selection menu 582 in FIG. 5I in response to detecting the voice input 574 in FIG. 5H. With further reference to this example, the computing system also presents the first texture 584A overlaid on the peripheral device 501 and the virtual numpad 572 in FIG. 5J in response to detecting the voice input 588 in FIG. 5I. As shown in FIG. 5J, the electronic device 120 changes an appearance of the frame or outline of the peripheral device 501 and the virtual numpad 572 (e.g., changed from a white texture in FIG. 5I to a dotted texture in FIG. 5J).

FIGS. 7A-7M illustrate examples of user interfaces including a pairing affordance that is world-locked to a peripheral device, to enable pairing with the peripheral device in accordance with some implementations. While certain specific features are illustrated, those skilled in the art will appreciate from the present disclosure that various other features have not been illustrated for the sake of brevity, and so as not to obscure more pertinent aspects of the implementations disclosed herein. The user interfaces in FIGS. 7A-7M are used to illustrate some of the processes described below, including a portion of the processes described with reference to FIGS. 9A and 9B.

Figure 7A:
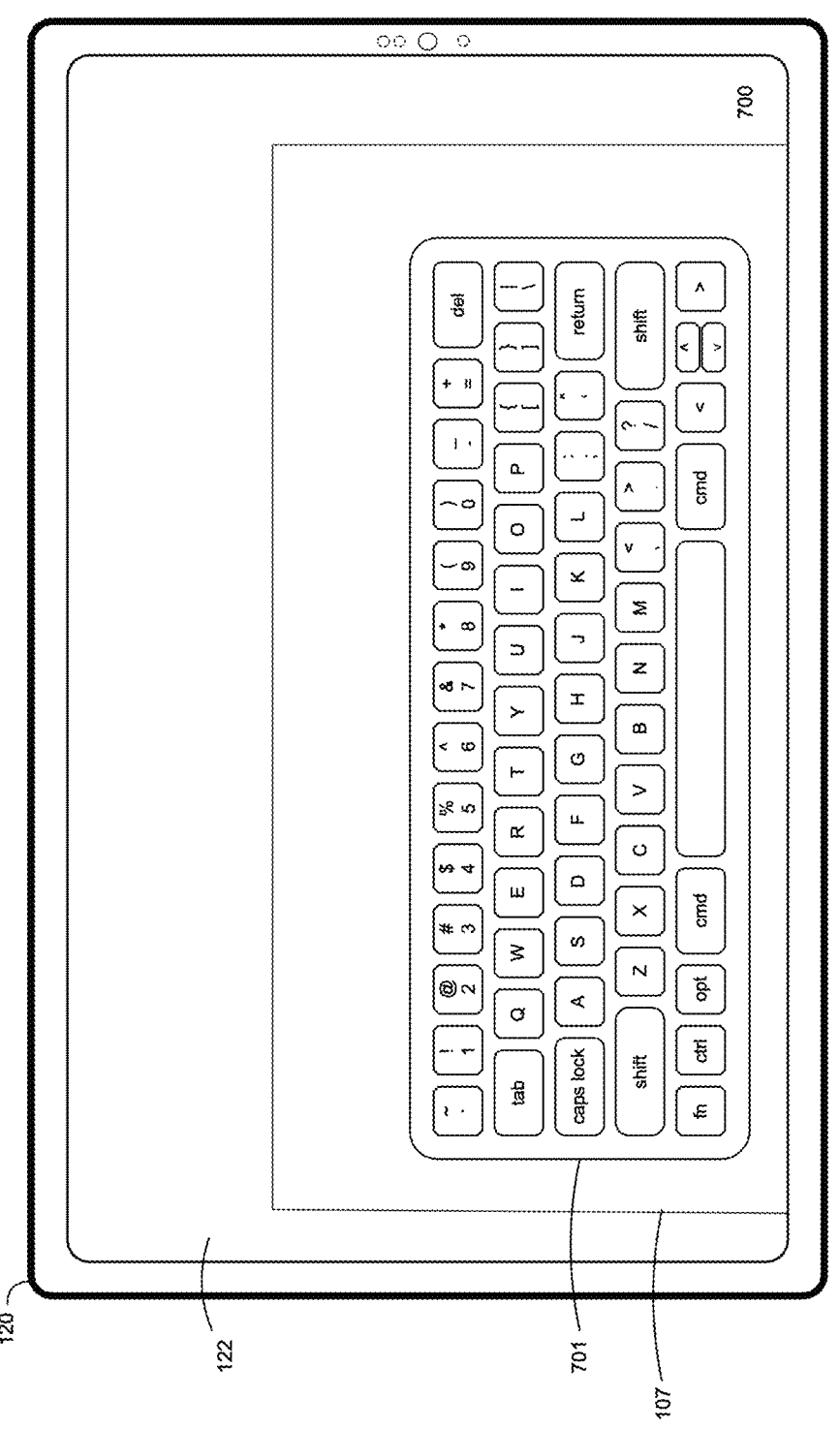
FIGS. 7A-7M illustrate examples of user interfaces including a pairing affordance that is world-locked to a peripheral device, to enable pairing with the peripheral device in accordance with some implementations.

As illustrated in FIG. 7A, the electronic device 120 displays, on the display 122, a three-dimensional (3D) environment 700. In some implementations, the 3D environment corresponds to an XR environment, such as the XR environment 128. The 3D environment 700 includes a peripheral device 701 sitting on the table 107. To that end, in some implementations, the electronic device 120 includes an image sensor that captures a physical environment including the peripheral device 701 and the table 107, and the electronic device 120 composites image data from the image sensor with computer-generated content (e.g., a pairing affordance) in order to facilitate display of the 3D environment 700. Although the peripheral device 701 corresponds to a keyboard device 701, one of ordinary skill in the art will appreciate that, in some implementations, the peripheral device 701 corresponds to a different device type. For example, the peripheral device 701 may correspond to one of a head-mountable device (HMD), a mobile device (e.g., a smartphone or tablet), a wearable device, a stylus, a smart home device, etc.

The electronic device 120 is communicable with (e.g., pairable with) the keyboard device 701. To that end, in some implementations, the electronic device 120 includes a communication interface provided to communicate with the keyboard device 701, such as a Wi-Fi interface, Bluetooth interface, near field communication (NFC) interface, etc.

Figure 7B:
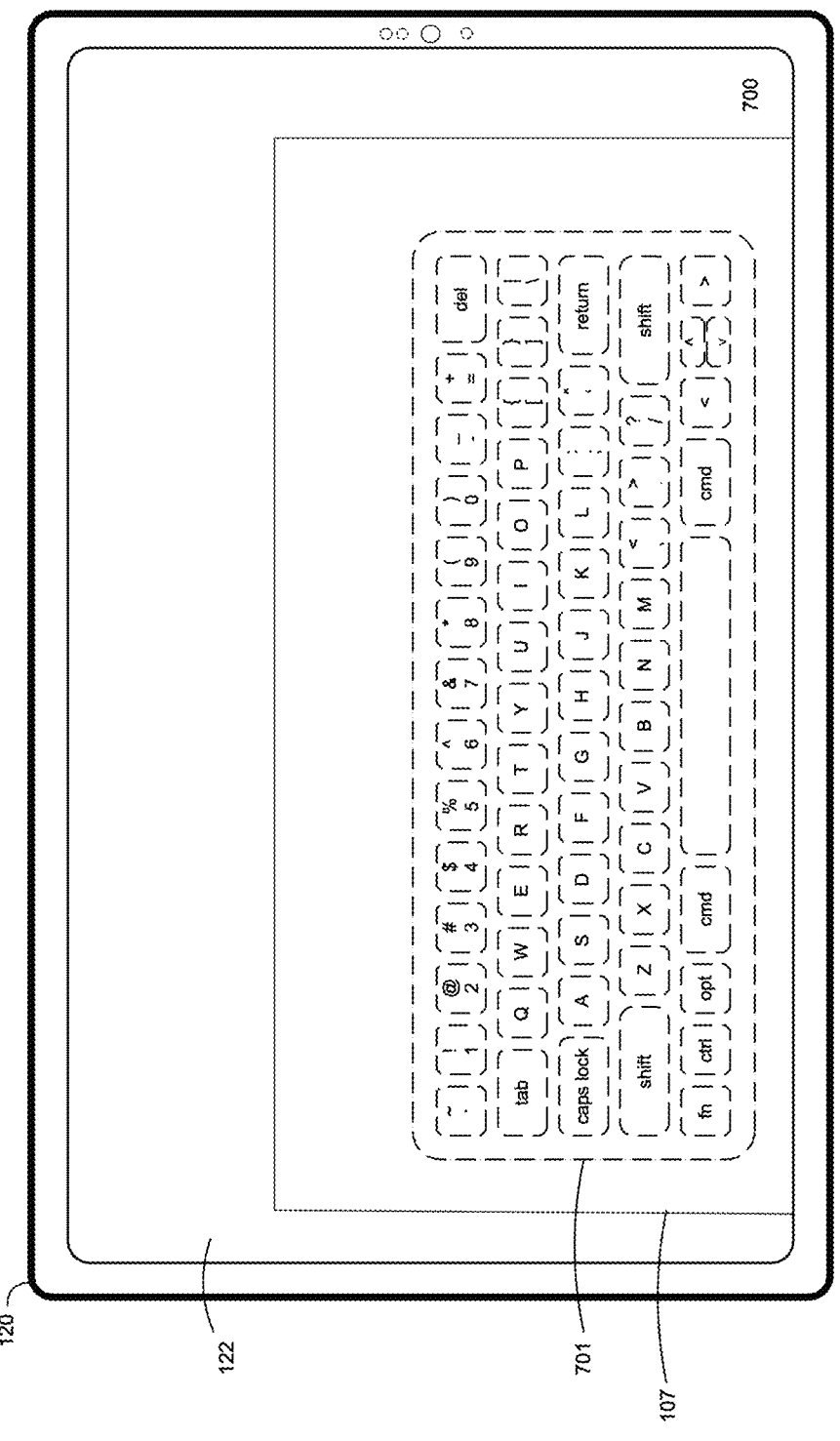

As illustrated in FIG. 7B, the electronic device 120 detects the keyboard device 701 within the 3D environment 700 via a computer vision technique. In some implementations, the electronic device 120 includes the object tracking engine 410 described with reference to FIGS. 4A and 4B, and the object tracking engine 410 detects the keyboard device 701. For example, the computer vision technique includes per-pixel object identification of the keyboard device 701 within image data, optionally with the aid of a neural network. As one example, the computer vision technique includes semantic segmentation that generates a semantic value of "keyboard," or generates multiple semantic values (e.g., "keyboard," "qwerty keyboard," "keyboard model number xxx," etc.). In some implementations, the electronic device 120 indicates detection of the keyboard device 701 by displaying a corresponding indicator, such as displaying a flashing overlay surrounding the keyboard device 701.

Figure 7C:
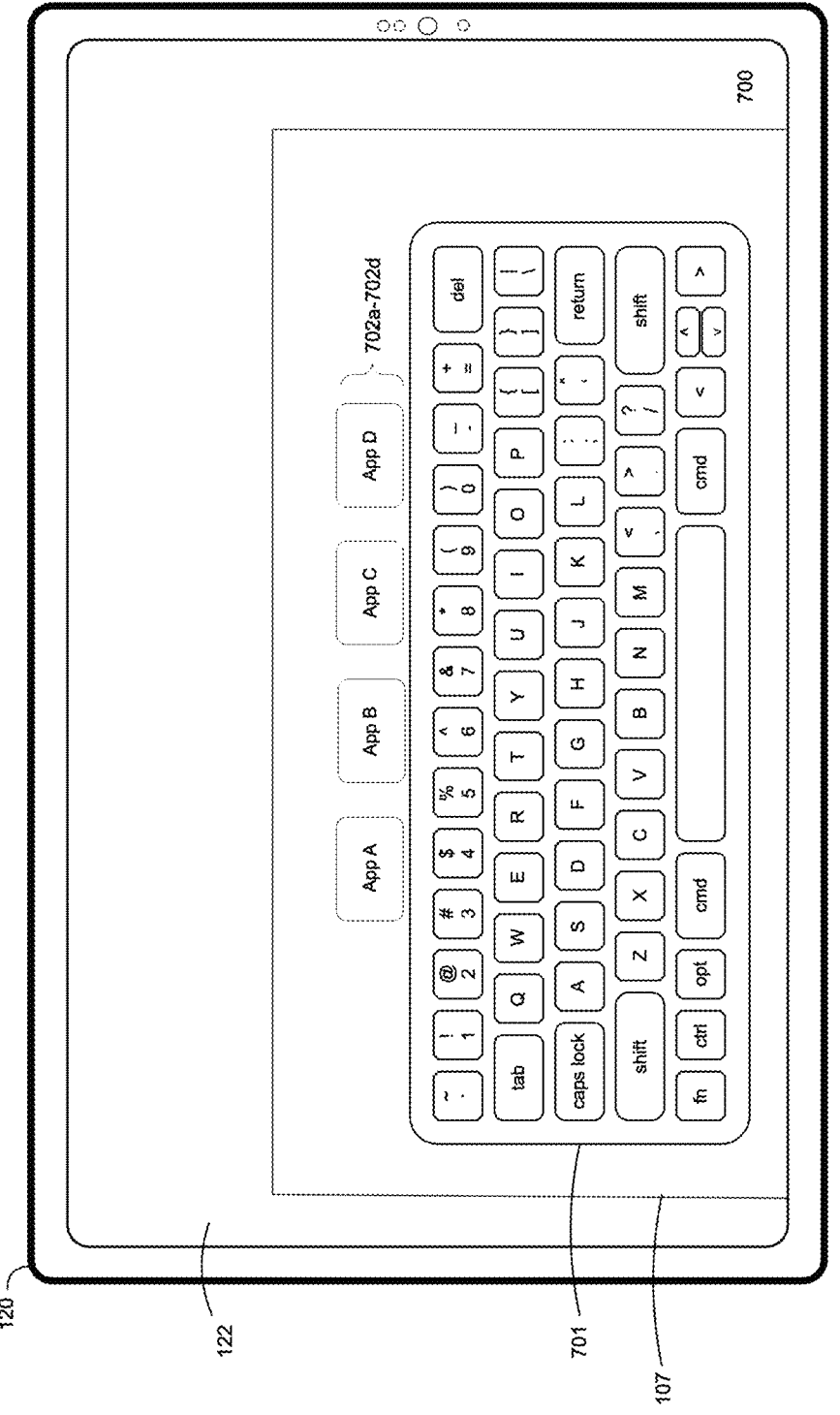
Figure 7D:
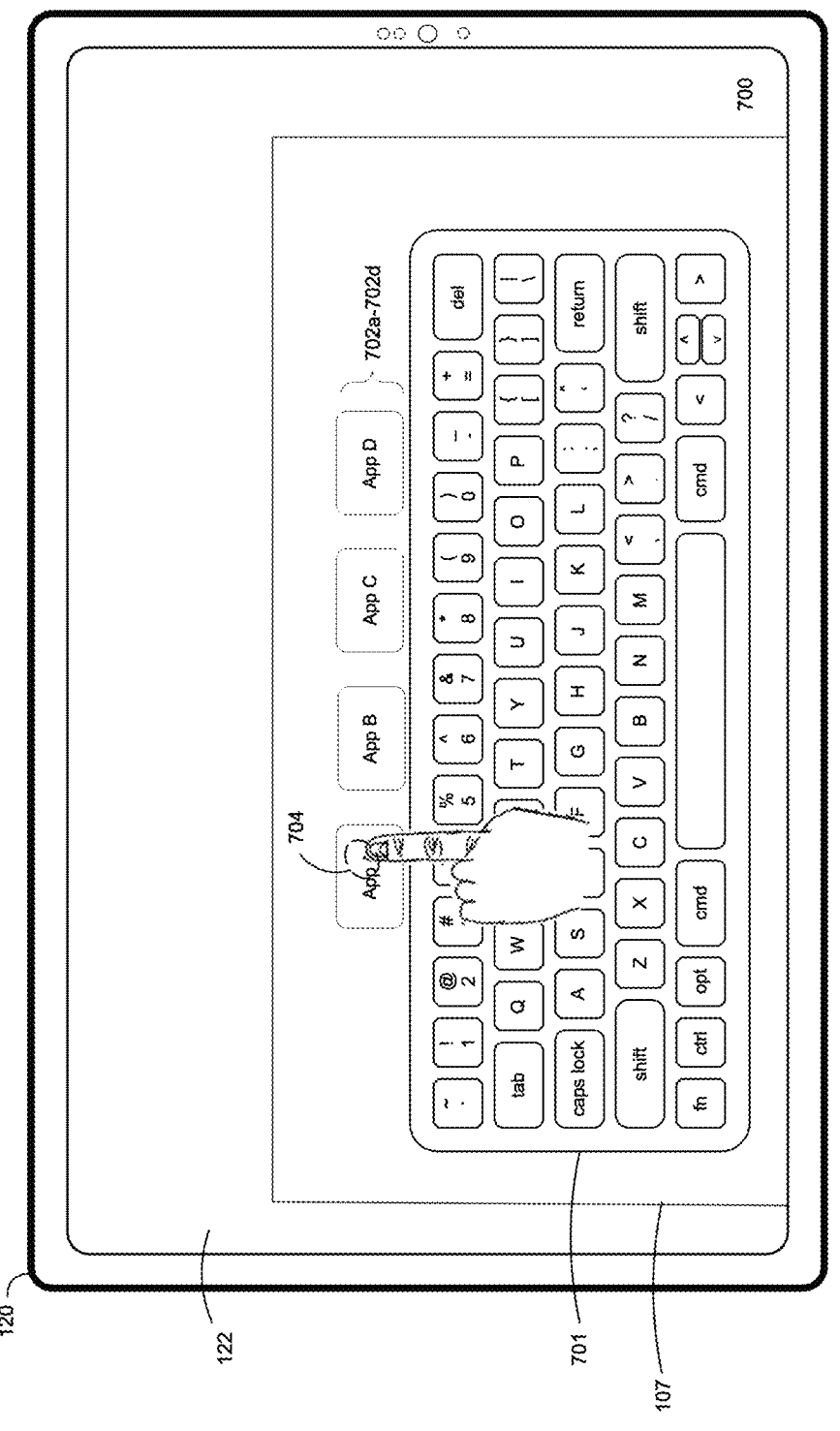
Figure 7E:
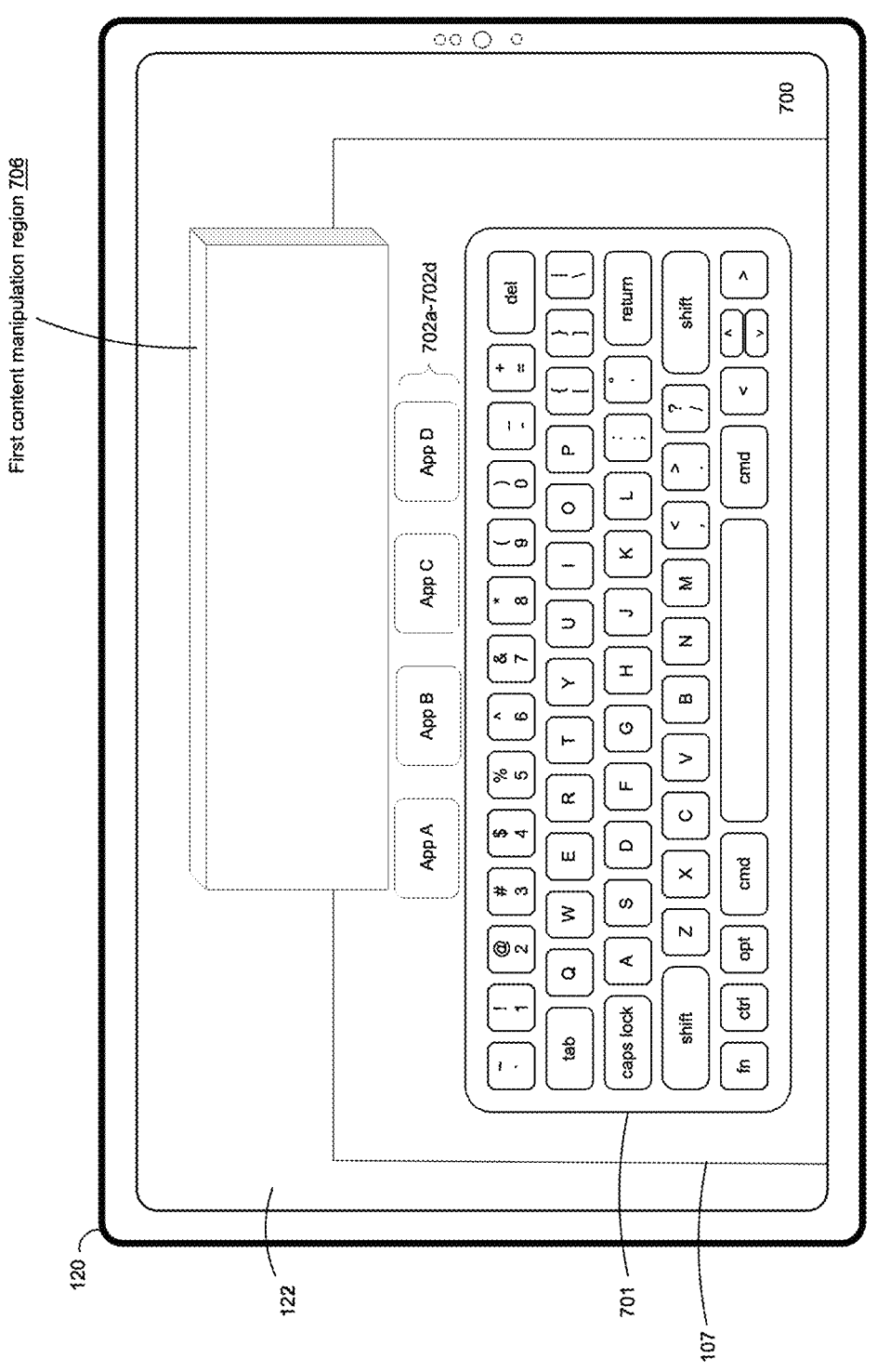

As illustrated in FIG. 7C, in some implementations, the electronic device 120 displays one or more application affordances 702a-702d. Each of the application affordances 702a-702d is associated with a corresponding application, such as a web browser application, a word processing application, a drawing application, etc. One of ordinary skill in the art will appreciate that the number and appearance of the application affordance(s) 702a-702d may vary according to different implementations. In some implementations, the application affordance(s) 702a-702d are world-locked to the keyboard device 701, such as is illustrated in FIGS. 7H and 7I.

In some implementations, the electronic device 120 displays the application affordance(s) 702a-702d in response to pairing with the peripheral device 701. An example of the pairing process is described with reference to FIGS. 7F-7K. For example, in some implementations, the electronic device 120 initially displays the application affordance(s) 702a-702 in FIG. 7K (rather than in FIG. 7C), based on detecting a third user input 716 that is directed to a pairing affordance 710 in FIG. 7J.

In response to detecting, via one or more input devices, selection of a particular application affordance, the electronic device 120 starts (e.g., executes) a corresponding application, and may display a corresponding content manipulation region. For example, as illustrated in FIG. 7D, the electronic device 120 detects a first user input 704 that is directed to the first application affordance 702a, and accordingly displays a first content manipulation region 706 in FIG. 7E. As one example, the first application affordance 702a is associated with a word processing application, and the first content manipulation region 706 provides a user interface for the word processing application. In some implementations, the first content manipulation region 706 is world-locked to the keyboard device 701, such as is illustrated in FIGS. 7H and 7I.

The first user input 704 corresponds to a finger of a hand of a user selecting the first application affordance 702a. In some implementations, the electronic device 120 includes an extremity tracker that detects the finger via a computer-vision technique. For example, the extremity tracker identifies the finger within pass-through image data from an image sensor, wherein the pass-through image is displayed on the display 122. In some implementations, the electronic device 120 selects the first application affordance 702a based on determining that the finger is near (e.g., less than a threshold distance from) the first application affordance 702a. One of ordinary skill in the art will appreciate that selection of a particular application affordance may be based on a user input from various input device(s), such as a gaze input from an eye tracker, touch data from a stylus, and/or the like.

Figure 7F:
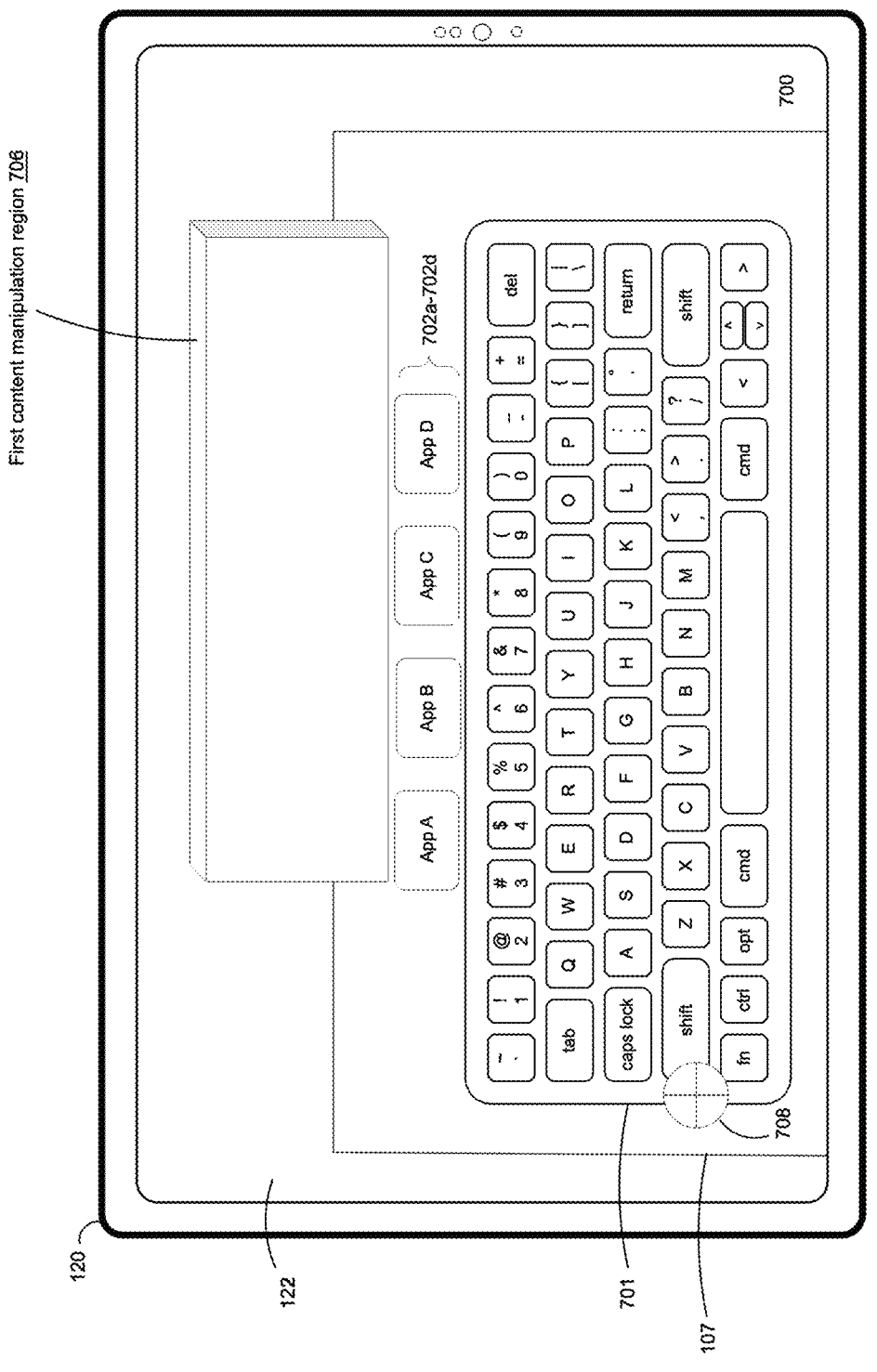

As illustrated in FIG. 7F, the electronic device 120 receives, via one or more input devices, a second user input 708 that is directed to the peripheral device 701 within the 3D environment. For example, the one or more input devices includes an eye tracker that generates eye tracking data associated with an eye of a user. Continuing with this example, the eye tracking data indicates a gaze that is directed to the peripheral device 701. In some implementations, the eye tracker corresponds to the eye tracking engine 412 described with reference to FIGS. 4A and 4B. As another example, the one or more input devices includes an extremity tracker that generates extremity tracking data associated with an extremity (e.g., a finger) of a user. Continuing with this example, the extremity tracking data indicates that the extremity is directed to the peripheral device 701.

Figure 7G:
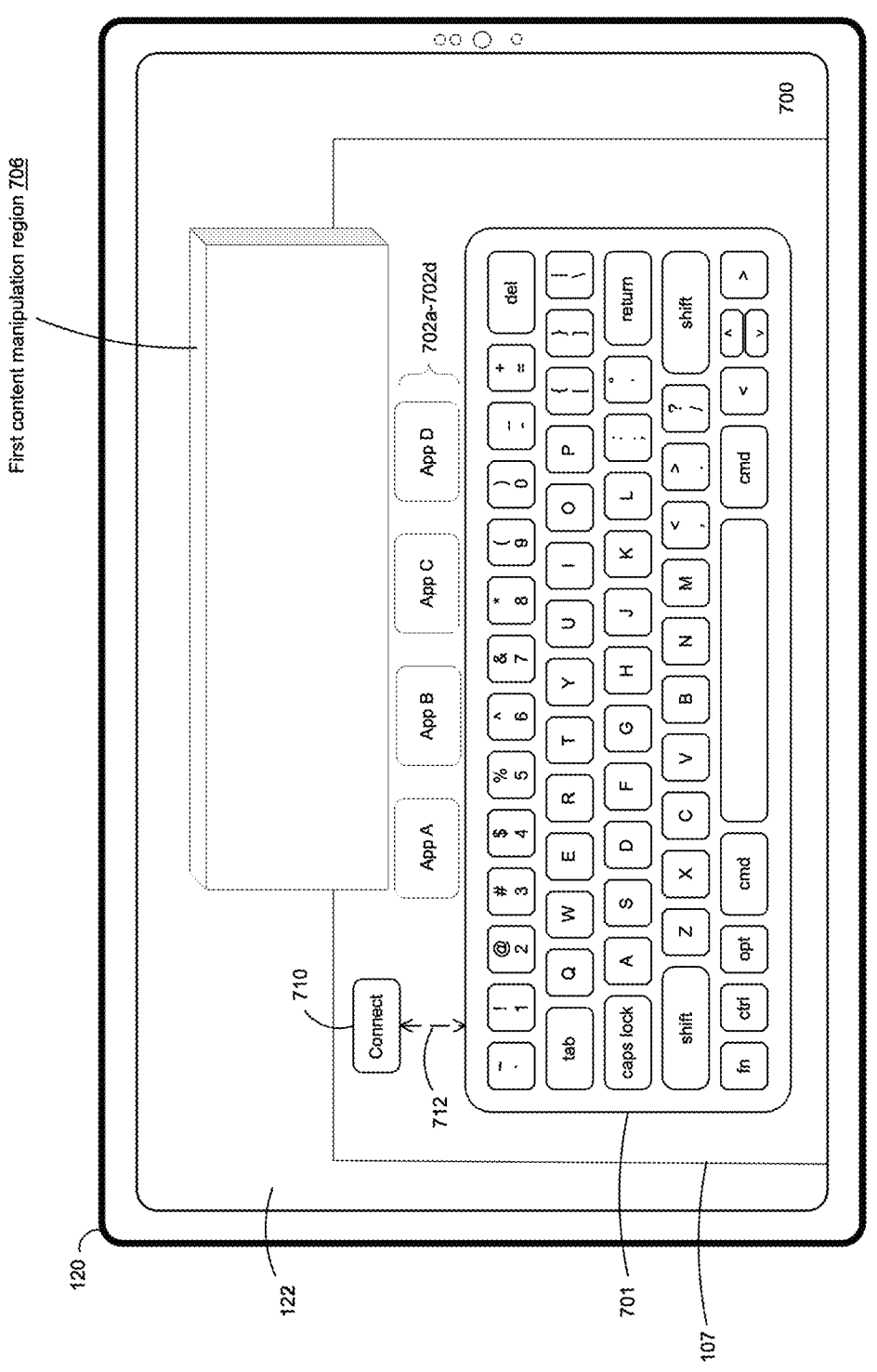
Figure 7H:
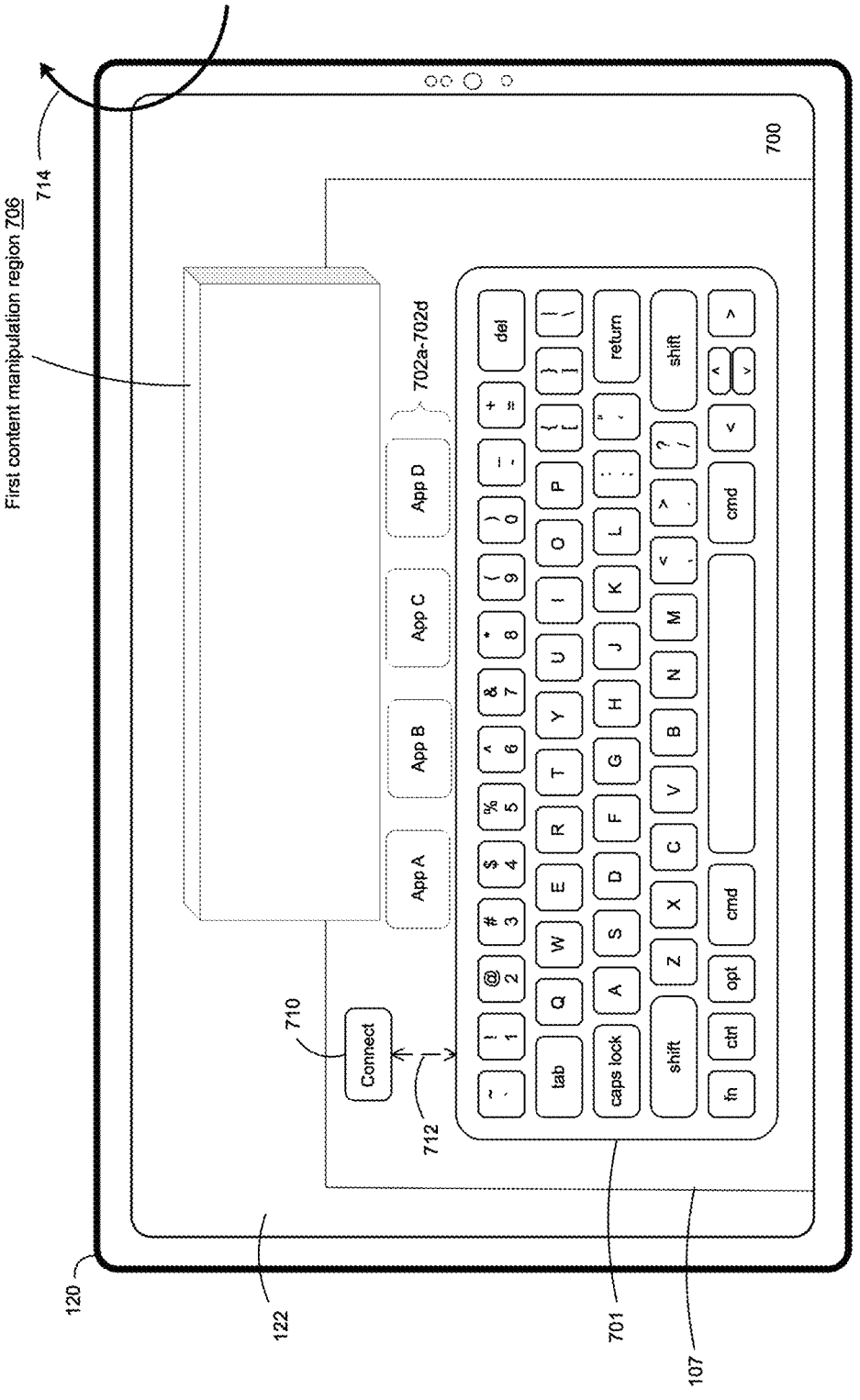
Figure 7I:
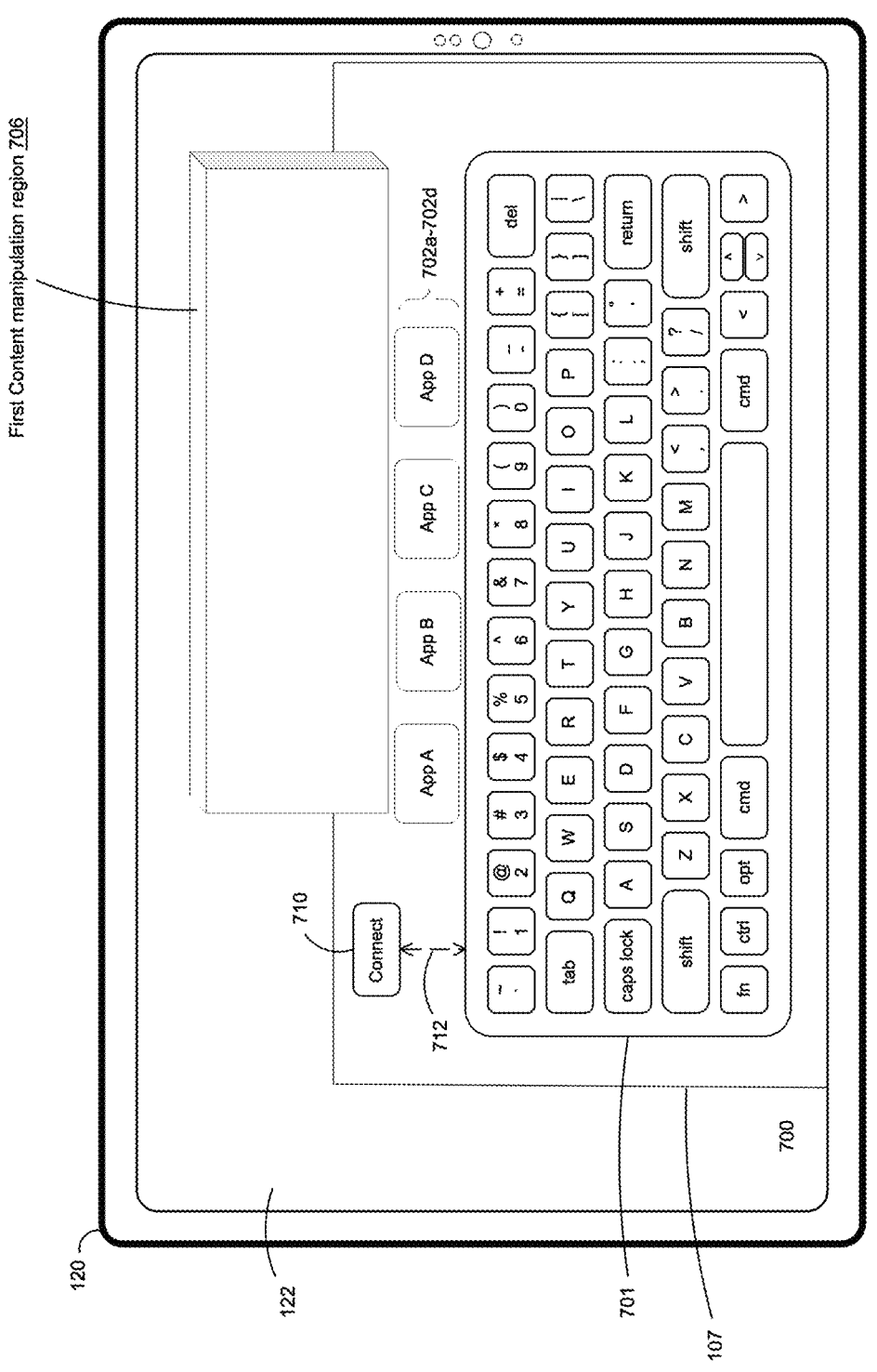

In response to receiving the second user input 708, the electronic device 120 displays, on the display 122, a pairing affordance 710 that is world-locked to the keyboard device 701 within the 3D environment 700, as illustrated in FIG. 7G. The pairing affordance 710 enables pairing of the electronic device 120 with the keyboard device 701. In some implementations, the pairing affordance 710 is world-locked to a region or a specific point of the keyboard device 701. For example, as illustrated in FIG. 7G, the pairing affordance 710 is world-locked at a fixed distance 712 from a point on the top edge of the keyboard device 701. One of ordinary skill in the art will appreciate that the pairing affordance 710 may be world-locked to any region or point of a peripheral device.

FIGS. 7H and 7I illustrate an example of the world-locked characteristic associated with the pairing affordance 710, based on a detected change of a viewpoint of a user of the electronic device 120. As illustrated in FIG. 7H, the electronic device 120 is tilted, as indicated by a tilt indicator 714. Based on the tilt, the electronic device 120 detects a change of a viewpoint of a user of the electronic device 120. For example, the electronic device 120 includes an inertial measurement unit (IMU) that generates IMU data indicative of the tilt, and the electronic device 120 detects the change of the viewpoint based on the IMU data. As another example, the electronic device 120 includes an image sensor (e.g., a camera) that generates image data, and the electronic device 120 detects a change of the image data (e.g., differences between a first image frame and a second image frame) in order to detect the change of the viewpoint.

As illustrated in FIG. 7I, based on the tilt the electronic device 120, the table 107 and the keyboard device 701 move rightwards across the display 122. Based on detecting the change of the viewpoint of the user, the electronic device 120 moves the pairing affordance 710 from a first position on the display 122 to a second position on the display 122 in order to maintain the pairing affordance 710 world-locked to the keyboard device 701. For example, in FIG. 7H the pairing affordance 710 is located at a first position on the display 122, whereas in the FIG. 7I the electronic device 120 moves the pairing affordance 710 rightwards to a second position on the display 122. Because the keyboard device 701 moves rightwards across the display 122 based on the tilt, correspondingly moving the pairing affordance 710 rightwards maintains the pairing affordance 710 as world-locked to the keyboard device 701 during and after completion of the tilt.

Figure 7J:
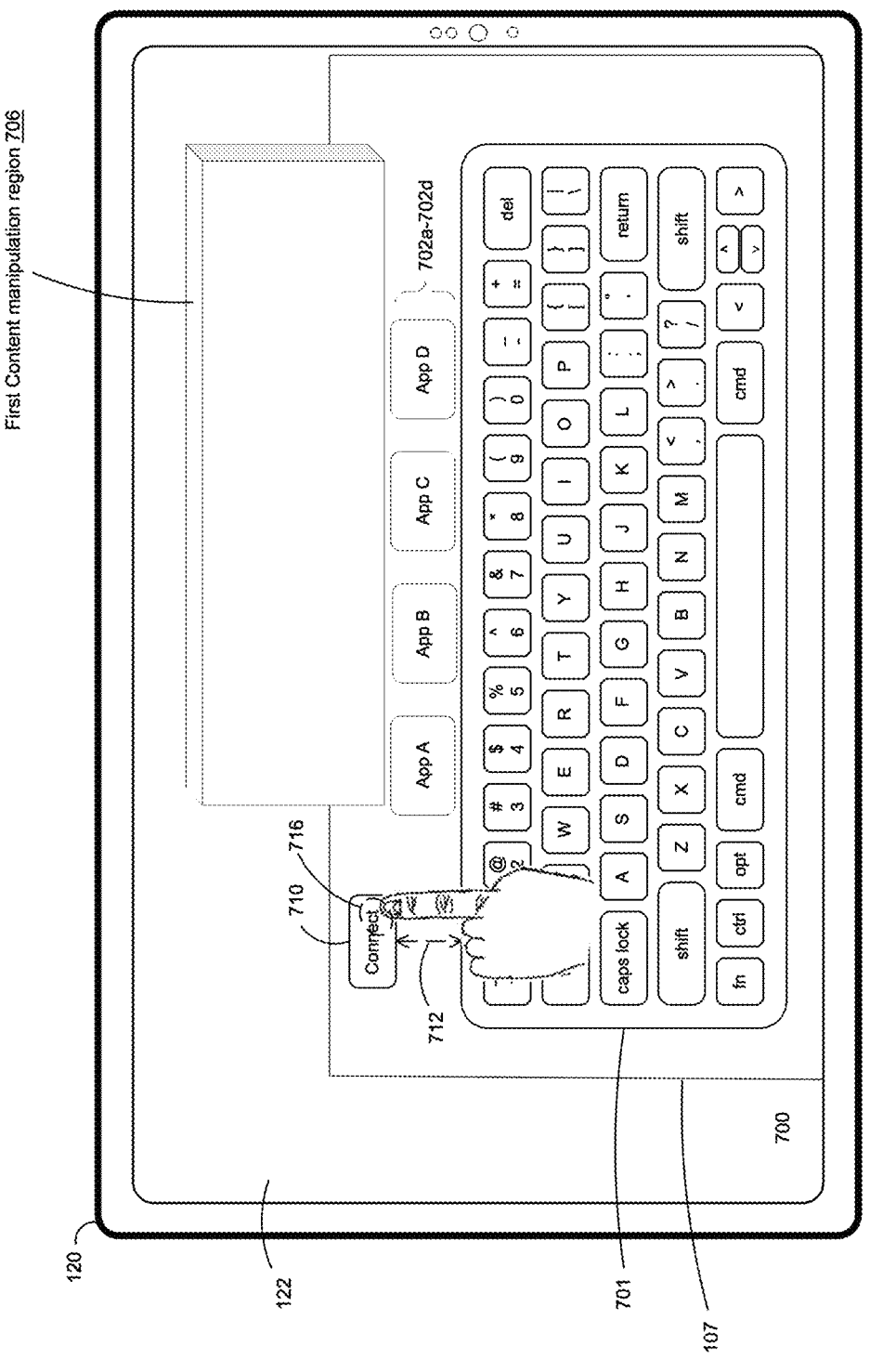

As illustrated in FIG. 7J, the electronic device 120 detects a third user input 716 that is directed to (e.g., within) the pairing affordance 710. The third user input 716 corresponds to a finger of a hand of a user and may be detected via a computer vision technique. Another example of the third user input 716 is a gaze of a user being directed to the pairing affordance 710. Yet another of the third user input 716 is a gesture that is directed to the pairing affordance 710, such as a pinch gesture that terminates within the pairing affordance 710.

Figure 7K:
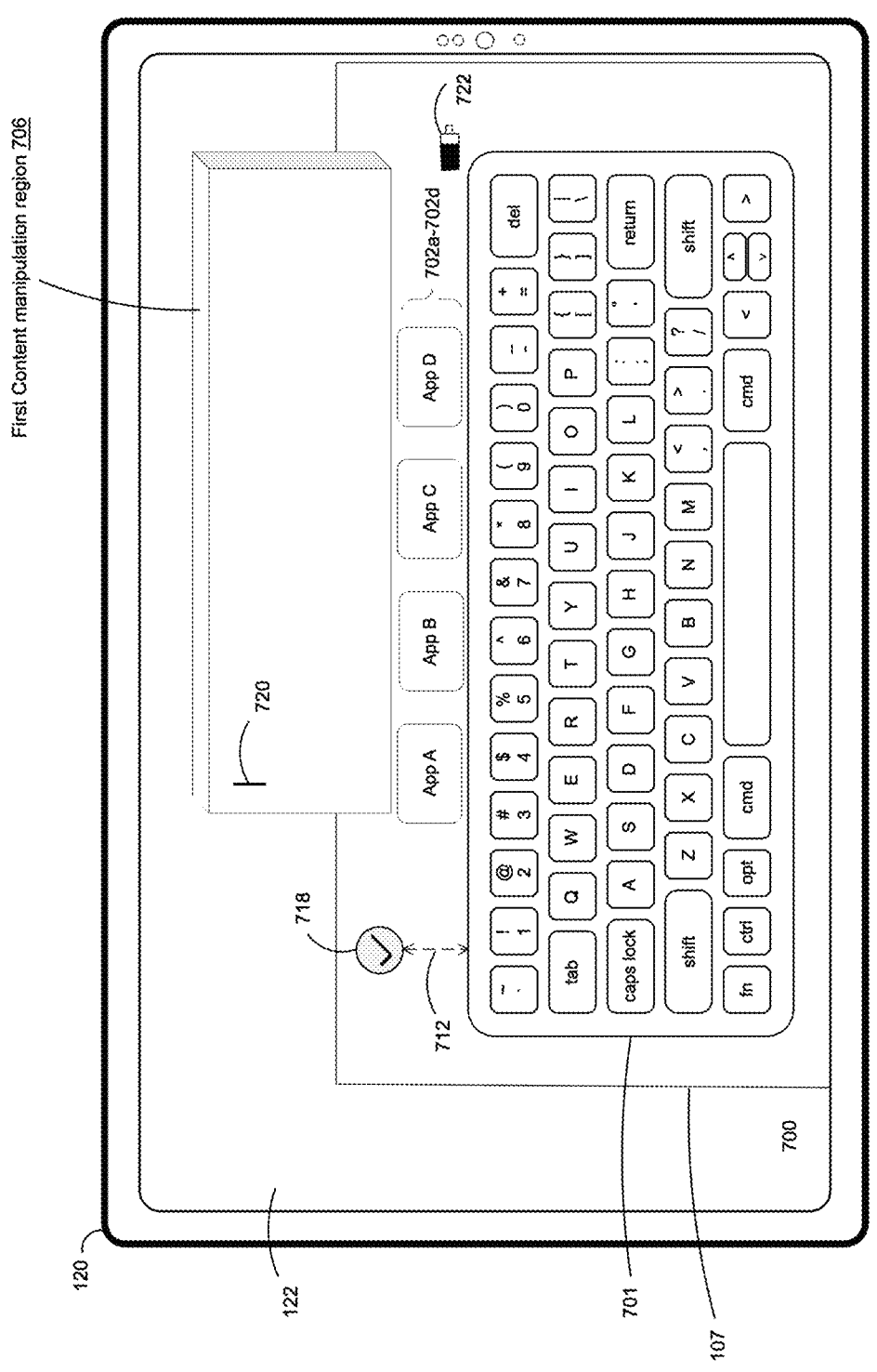

In response to detecting the third user input 716 in FIG. 7J, the electronic device 120 pairs the electronic device 120 with the keyboard device 701 in FIG. 7K. While the electronic device 120 is paired with the electronic device 120, the electronic device 120 and the keyboard device 701 may communicate with each other via the communication interface.

In some implementations, in further response to detecting the third user input 716, the electronic device 120 ceases to display the pairing affordance 710 and displays a paired indicator 718 indicating that the electronic device 120 is currently paired with the keyboard device 701. For example, as illustrated in FIGS. 7J and 7K, the paired indicator 718 replaces the pairing affordance 710 such that the paired indicator 718 is also world-locked to the keyboard device 701.

In some implementations, in further response to detecting the third user input 716, the electronic device 120 may update a content manipulation region in order to indicate the pairing. For example, as illustrated in FIG. 7K, the electronic device 120 displays, within the first content manipulation region 706, a cursor 720. The cursor 720 indicates that the keys of the keyboard device 701 are currently enabled to perform a content manipulation operation, because the keyboard device 701 is currently paired with the electronic device 120.

In some implementations, in further response to detecting the third user input 716, the electronic device 120 displays one or more status indicators that are associated with the keyboard device 701. For example, as illustrated in FIG. 7K, the electronic device 120 displays a battery level indicator 722 that indicates a current battery level of the keyboard device 701. The electronic device 120 may receive battery level information from the keyboard device 701 via the communication interface. In some implementations, the status indicator is world-locked to the keyboard device 701.

Figure 7L:
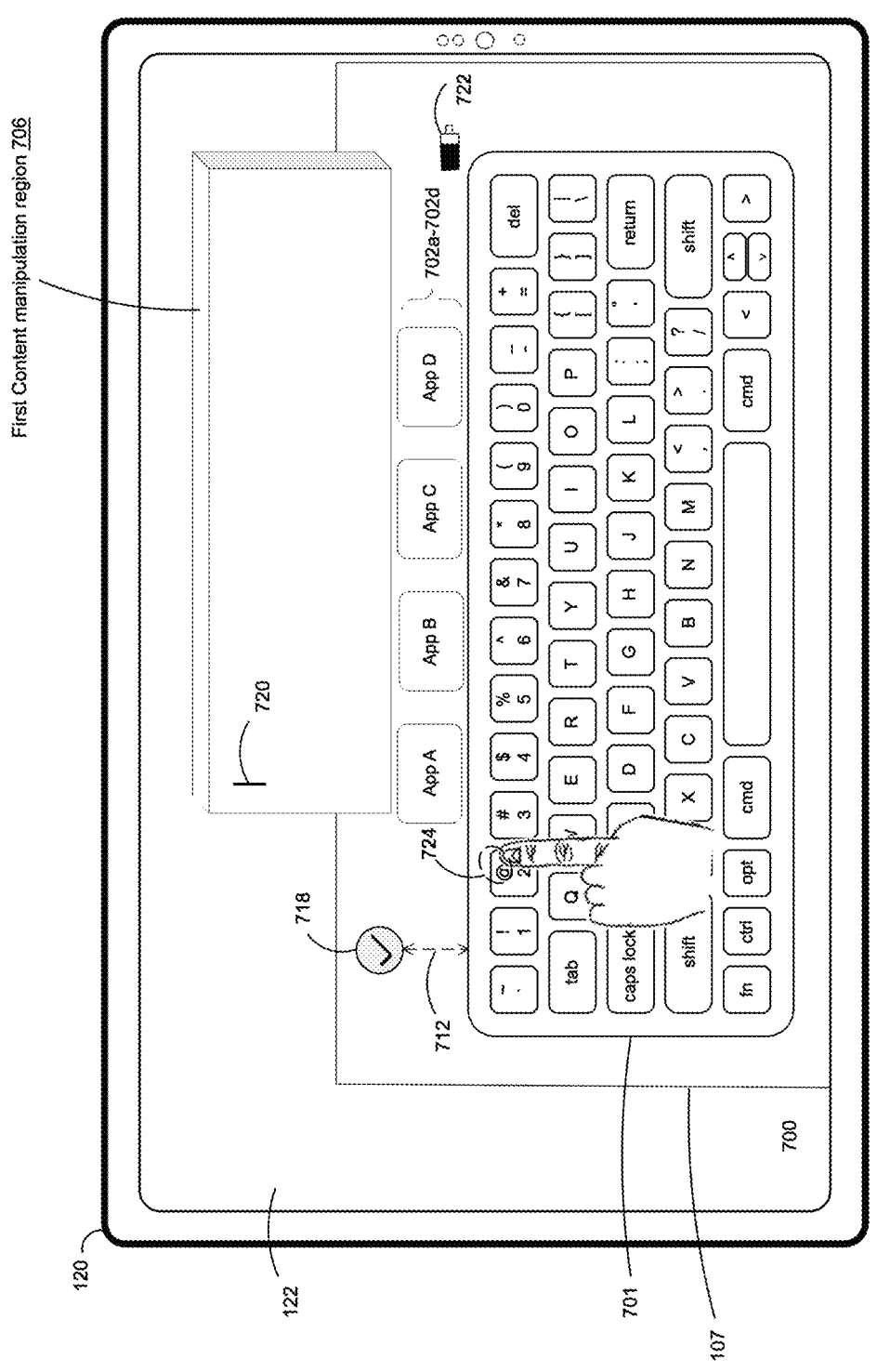
Figure 7M:
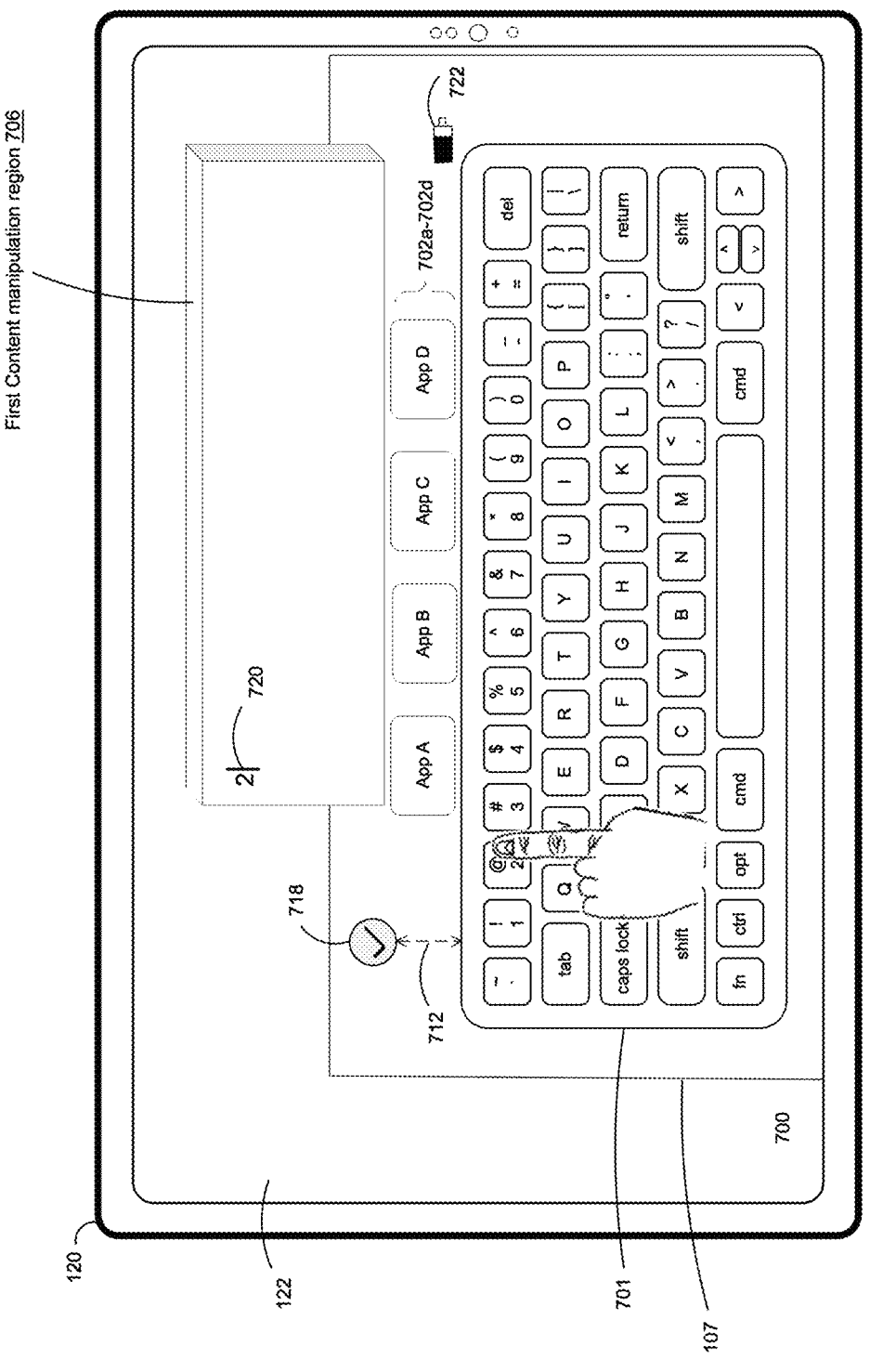

According to various implementations, while the electronic device 120 is paired with the keyboard device 701, the electronic device 120 receives sensor data from the keyboard device 701 via the communication interface. For example, as illustrated in FIG. 7L, the electronic device 120 receives sensor data indicating a keypress 724 of the '2' key of the keyboard device 701. In response to receiving the sensor data, the electronic device 120 displays a '2' within the first content manipulation region 706, and accordingly moves the cursor 720 rightwards, as illustrated in FIG. 7M. One of ordinary skill in the art will appreciate that sensor data may vary based on the type of paired peripheral device, such as finger manipulation data from a stylus, push-button data from a handheld controller, and/or the like. For example, in response to receiving sensor data from a stylus indicating a double tap performed on the stylus, the electronic device 120 pastes copied content within a content manipulation region.

FIGS. 8A-8M illustrate examples of user interfaces including multiple pairing affordances to enable pairing with corresponding peripheral devices in accordance with some implementations. While certain specific features are illustrated, those skilled in the art will appreciate from the present disclosure that various other features have not been illustrated for the sake of brevity, and so as not to obscure more pertinent aspects of the implementations disclosed herein. The user interfaces in FIGS. 8A-8M are used to illustrate some of the processes described below, including a portion of the processes described with reference to FIGS. 9A and 9B.

Figure 8A:
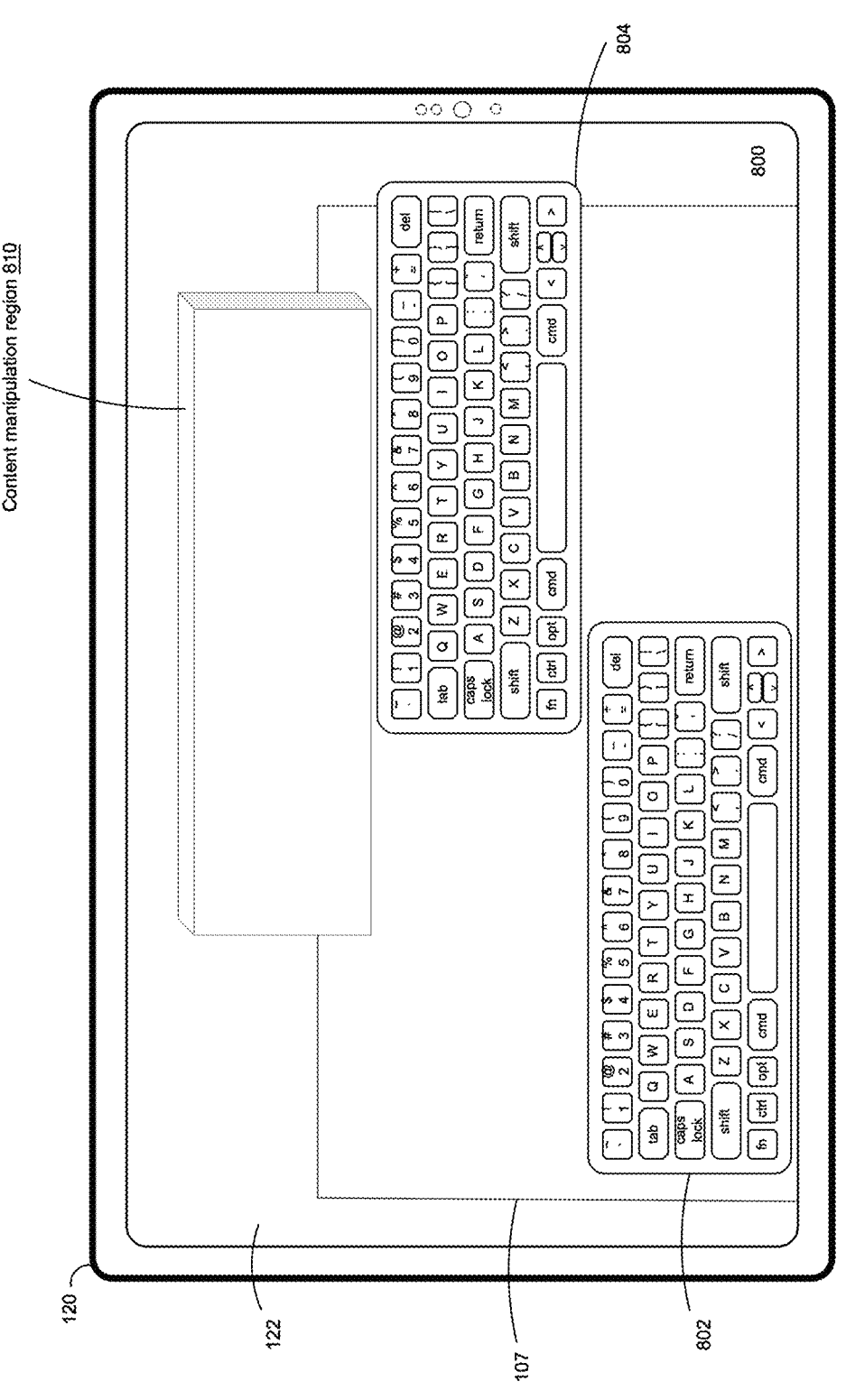
FIGS. 8A-8M illustrate examples of user interfaces including multiple pairing affordances to enable pairing with corresponding peripheral devices in accordance with some implementations.

As illustrated in FIG. 8A, the electronic device 120 displays a 3D environment 800 on the display 122. The 3D environment 800 includes a first peripheral device 802 sitting on the table 107, and a second peripheral device 804 sitting on the table 107. The first peripheral device 802 corresponds to a first keyboard device (sometimes referred to as "first keyboard device 802"), and the second peripheral device 804 corresponds to a second keyboard device (sometimes referred to as "second keyboard device 804"). One of ordinary skill in the art will appreciate that, in some implementations, one or both of the first peripheral device 802 and the second peripheral device 804 correspond to different peripheral device types (e.g., stylus, HMD, etc.).

The electronic device 120 detects, via a computer vision technique, the first keyboard device 802 and the second keyboard device 804. For example, the electronic device 120 utilizes the computer vision technique described with reference to the detection of the keyboard device 701 illustrated in FIG. 7B. To that end, in some implementations, the electronic device 120 includes the object tracking engine 410, which identifies the first keyboard device 802 and the second keyboard device 804 within image data from a camera.

As further illustrated in FIG. 8A, the electronic device 120 displays, on the display 122, a content manipulation region 810. The content manipulation region 810 is associated with a particular application. In some implementations, display of the content manipulation region 810 is based on an input directed to a corresponding application affordance, such as described with reference to the invocation of the first content manipulation region 706 illustrated in FIGS. 7D and 7E. As will be described below, a keypress input directed to the first keyboard device 802 or to the second keyboard device 804 causes performance of a corresponding content manipulation within the content manipulation region 810.

Figure 8B:
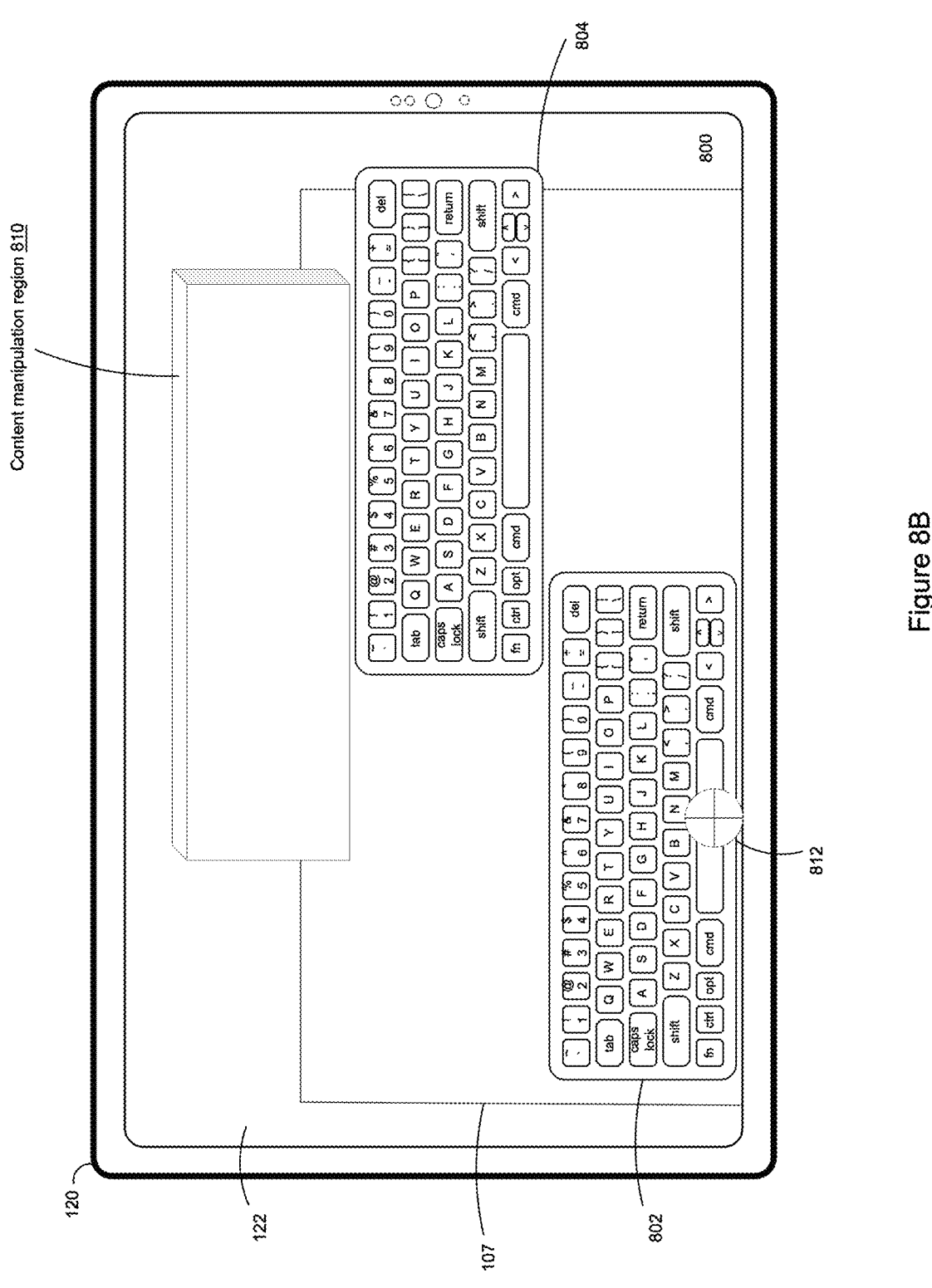

As illustrated in FIG. 8B, the electronic device 120 receives, via one or more input devices, a first user input 812 that is directed to the first keyboard device 802 within the 3D environment 800. For example, the first user input 812 corresponds to a gaze of a user that is directed to the first keyboard device 802, wherein the gaze is output from an eye tracker (e.g., the eye tracking engine 412 of FIG. 4A). As another example, the first user input 812 corresponds to an extremity of a user that is directed to the first keyboard device 802. To that end, the electronic device 120 may include an extremity tracker that performs computer vision in order to identify the extremity within image data.

Figure 8C:
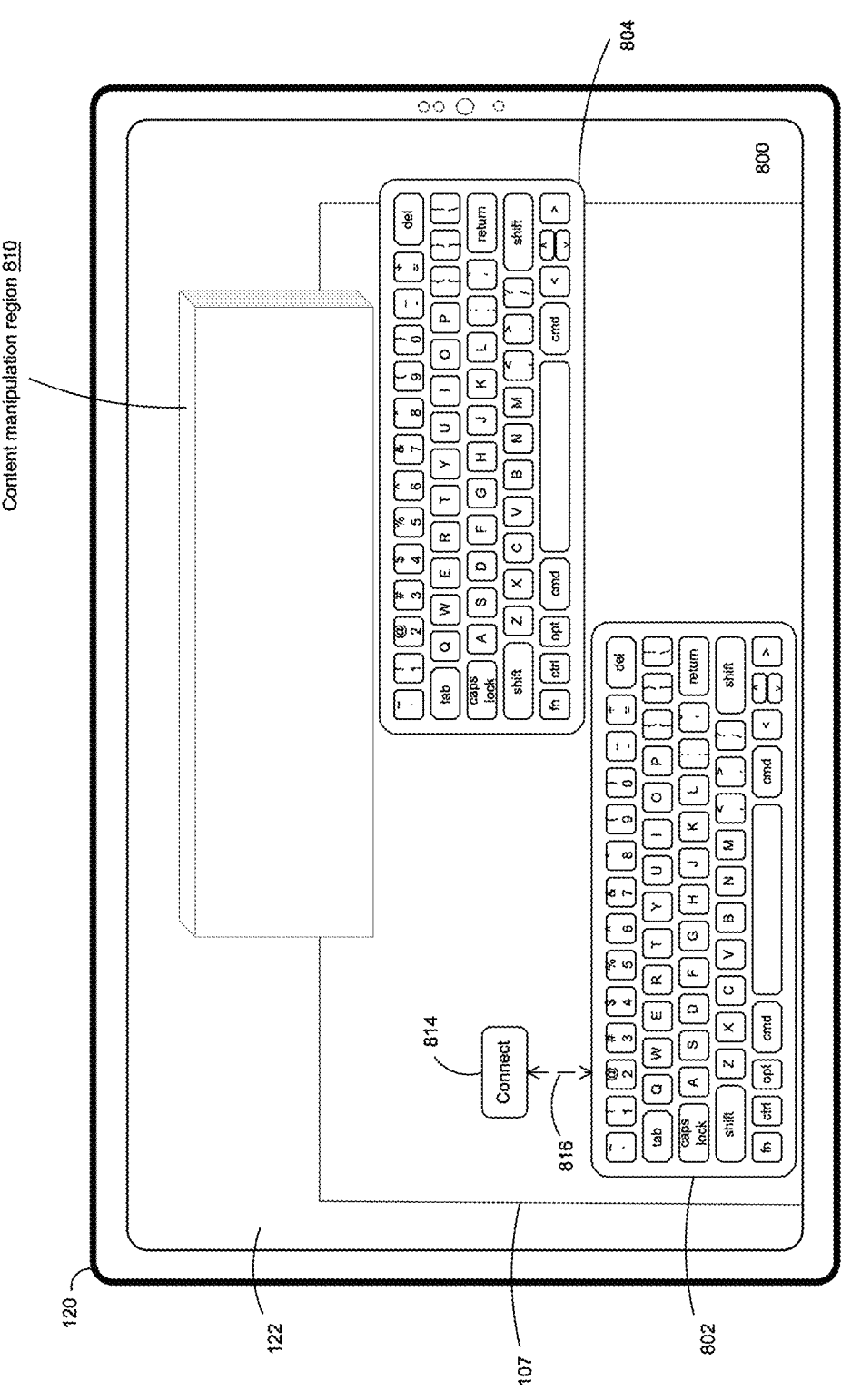

In response to receiving the first user input 812 in FIG. 8B, the electronic device 120 displays, on the display 122, a first pairing affordance 814 in FIG. 8C. The first pairing affordance 814 is world-locked to the first keyboard device 802. In some implementations, the first pairing affordance 814 is world-locked to a region or a specific point of the first keyboard device 802. For example, as illustrated in FIG. 8C, the first pairing affordance 814 is world-locked at a first fixed distance 816 from a point on the top edge of the first keyboard device 802. In order to maintain the first pairing affordance 814 as world-locked to the first keyboard device 802, the electronic device 120 moves the first pairing affordance 814 to an updated position on the display 122 based on detecting a change of a viewpoint of a user of the electronic device 120. For example, detecting the change of the viewpoint of the user includes detecting a positional change (e.g., tilt, rotate, move translationally) of the electronic device 120. Detecting the positional change may be based on IMU data and/or based on a change within camera data.

Figure 8D:
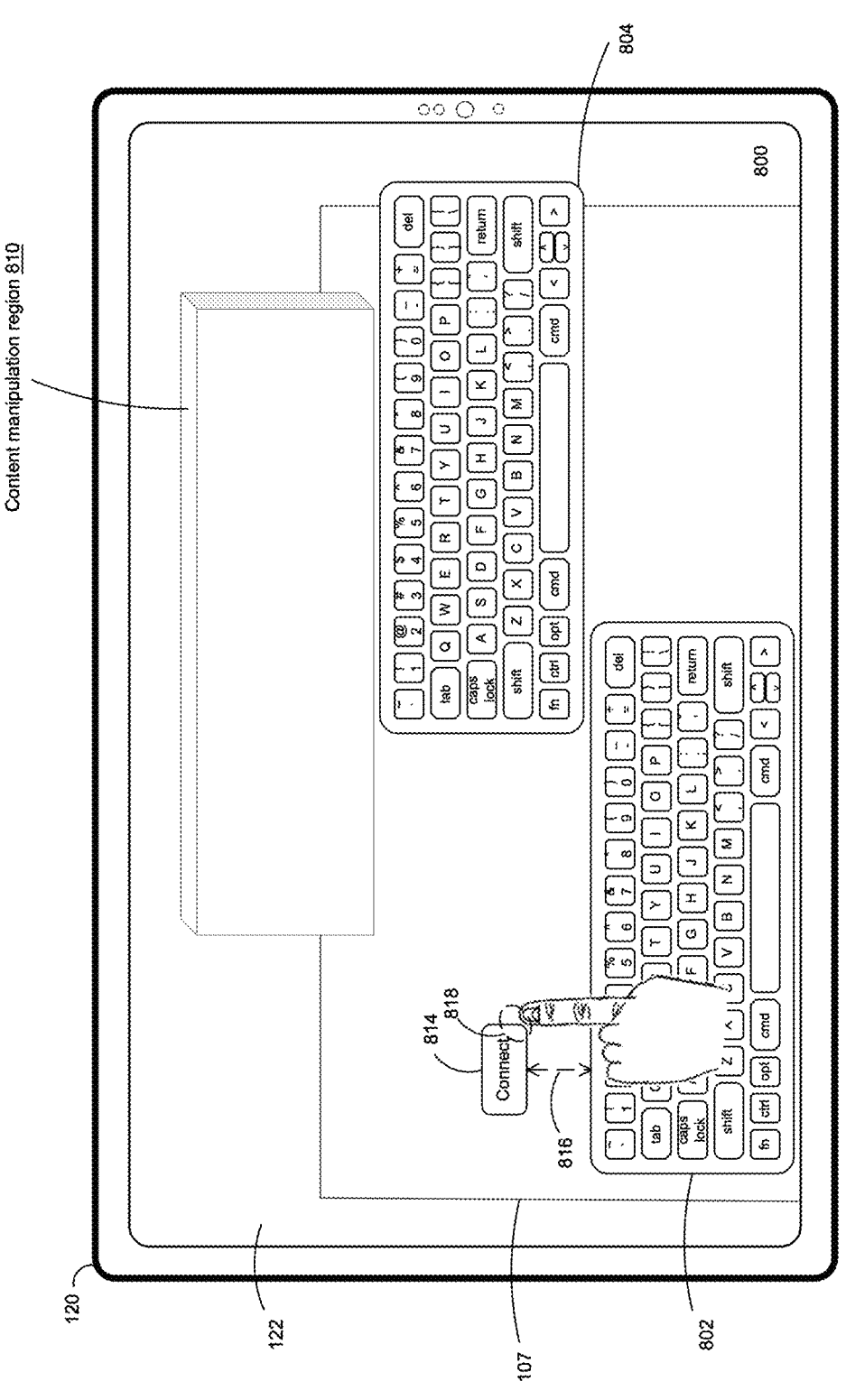
Figure 8E:
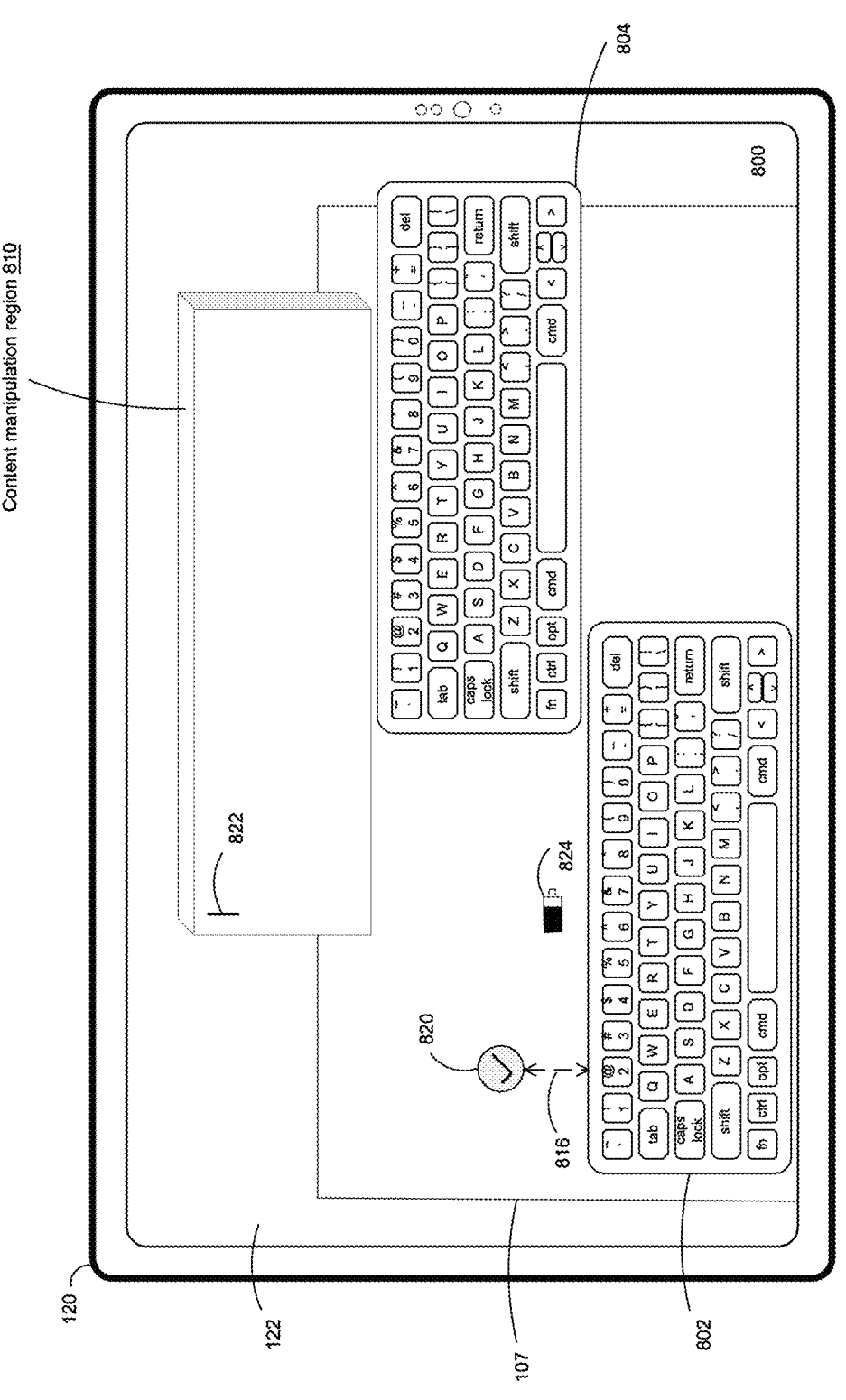

As illustrated in FIG. 8D, the electronic device 120 receives, via one or more input devices, a second user input 818 that is directed to the first pairing affordance 814. As illustrated in FIG. 8D, the second user input 818 corresponds to a finger of a user, which may be detected via a computer vision technique. However, one of ordinary skill in the art will appreciate that, in some implementations, the second user input 818 may correspond to a different input type that is directed to the first pairing affordance 814, such as a gaze input, physical object proximity input, etc. In response to receiving the second user input 818 in FIG. 8D, the electronic device 120 pairs the electronic device 120 with the first keyboard device 802, as illustrated in FIG. 8E.

In some implementations, based on receiving the second user input 818, the electronic device 120 displays a first status indicator 824 indicating a status (e.g., current battery level) associated with the first keyboard device 802. The first status indicator 824 may be near and optionally world-locked to the first keyboard device 802, to indicate that the status is associated with the first keyboard device 802, and not associated with the second keyboard device 804.

Additionally, in some implementations, based on receiving the second user input 818, the electronic device 120 ceases to display the first pairing affordance 814, and displays a first paired indicator 820 indicating that the electronic device 120 is currently paired with the first keyboard device 802. For example, the first paired indicator 820 is near the first keyboard device 802 to indicate to a user that the electronic device 120 is paired with the first keyboard device 802, and not with the second keyboard device 804. In some implementations, the electronic device 120 replaces the first pairing affordance 814 with the first paired indicator 820, such as via an animation.

Moreover, in some implementations, based on receiving the second user input 818, the electronic device 120 displays a cursor 822 within the content manipulation region 810. The cursor 822 indicates to a user that one of the keyboard devices is currently paired with the electronic device 120.

Figure 8F:
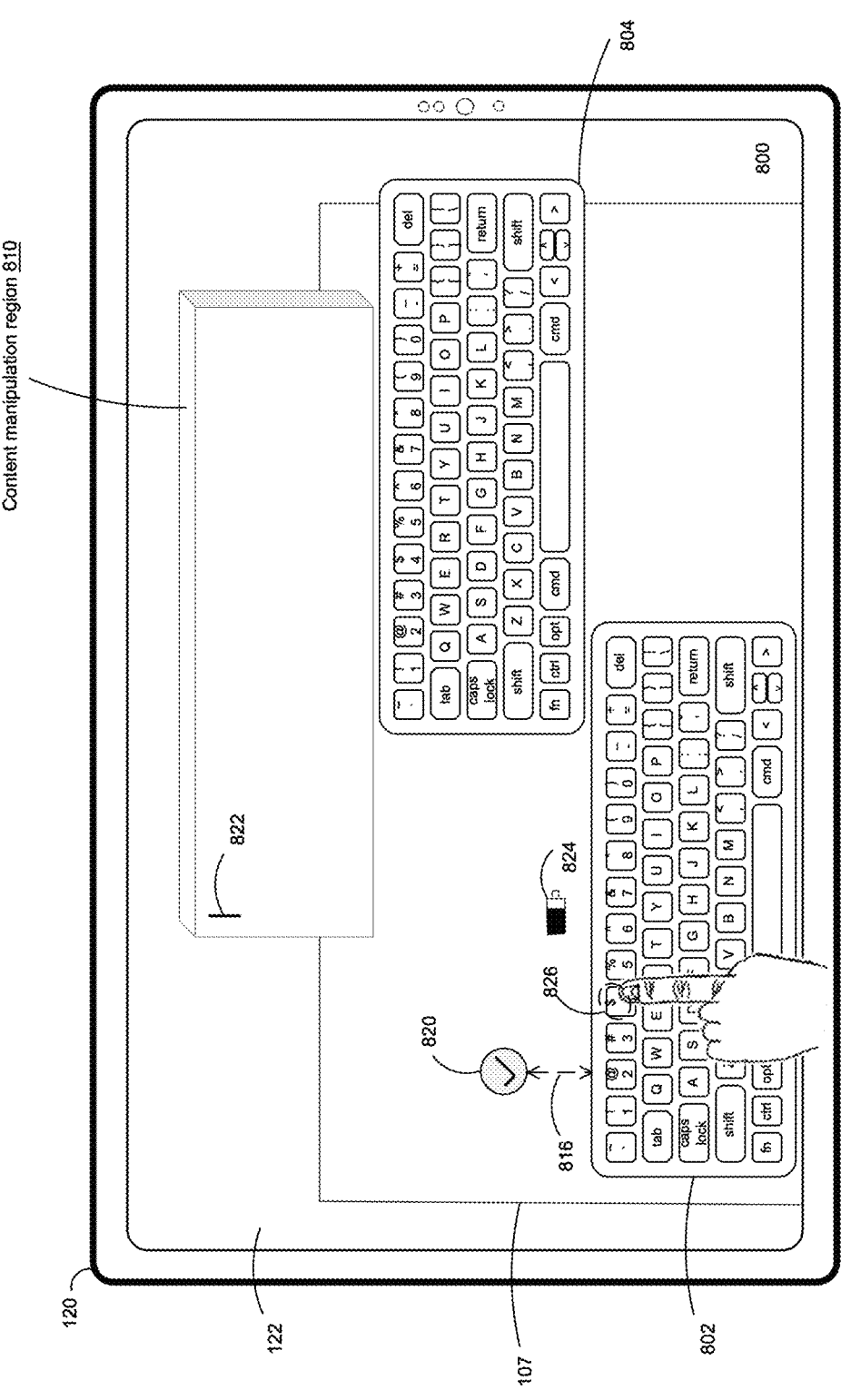
Figure 8G:
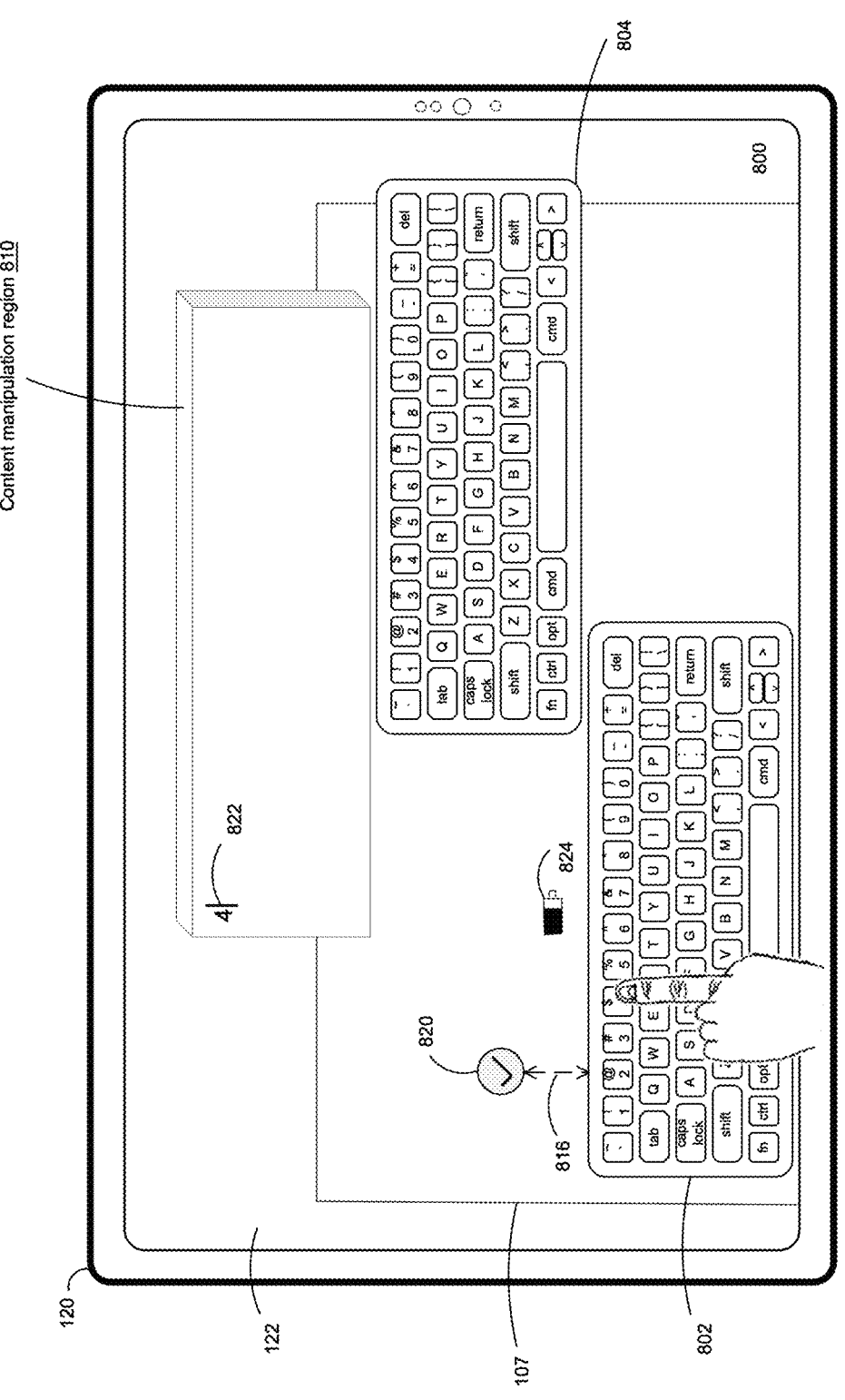

While the electronic device 120 is paired with the first keyboard device 802, the electronic device 120 receives sensor data from the first keyboard device 802. To that end, in some implementations, the electronic device 120 includes a communication interface provided to enable communication with the first keyboard device 802. As illustrated in FIG. 8F, the electronic device 120 receives sensor data indicating a keypress 826 of the '4' key of the first keyboard device 802. In response to receiving the sensor data, the electronic device 120 displays a '4' within the content manipulation region 810, and accordingly moves the cursor 822 rightwards, as illustrated in FIG. 8G.

Figure 8H:
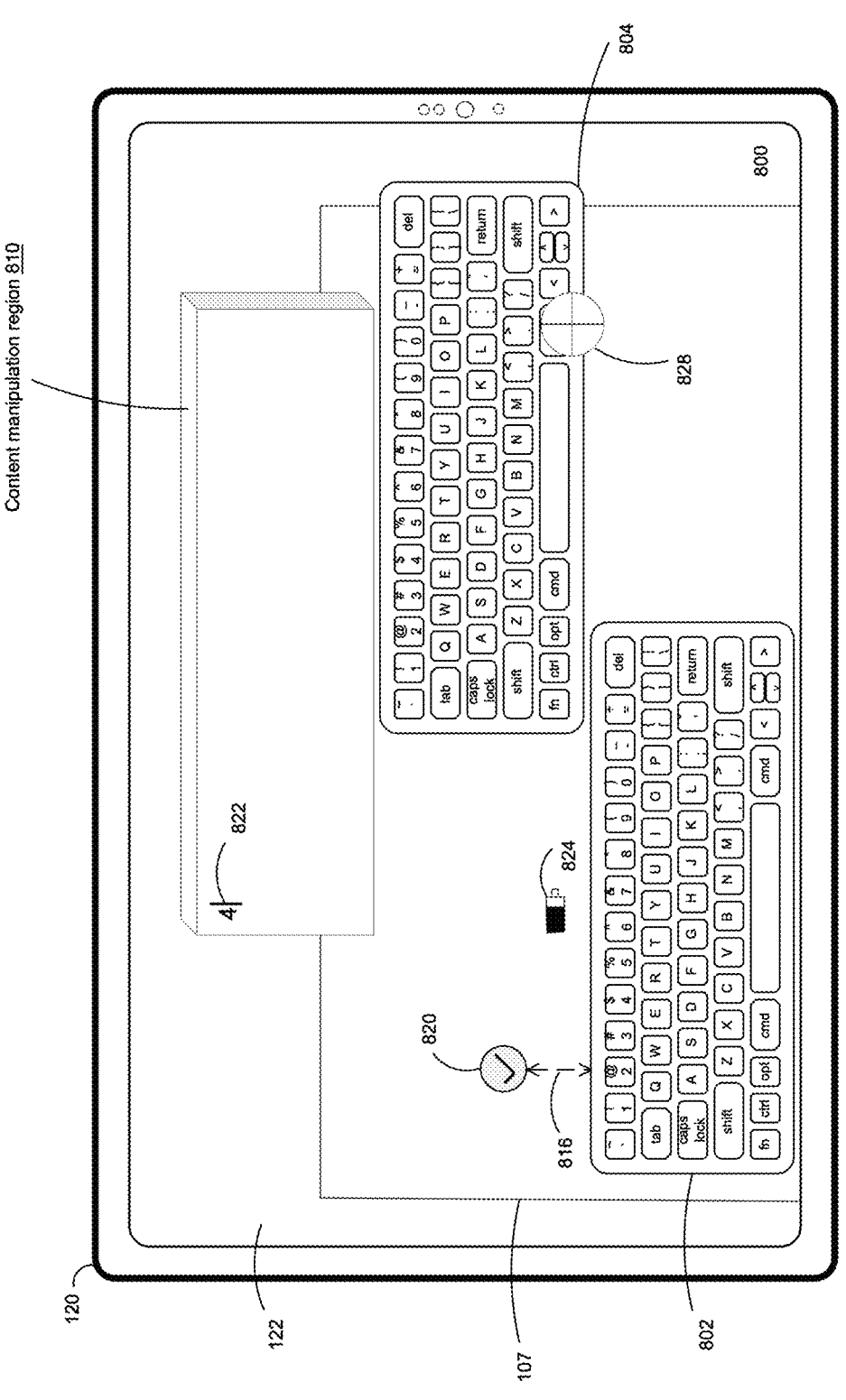
Figure 8I:
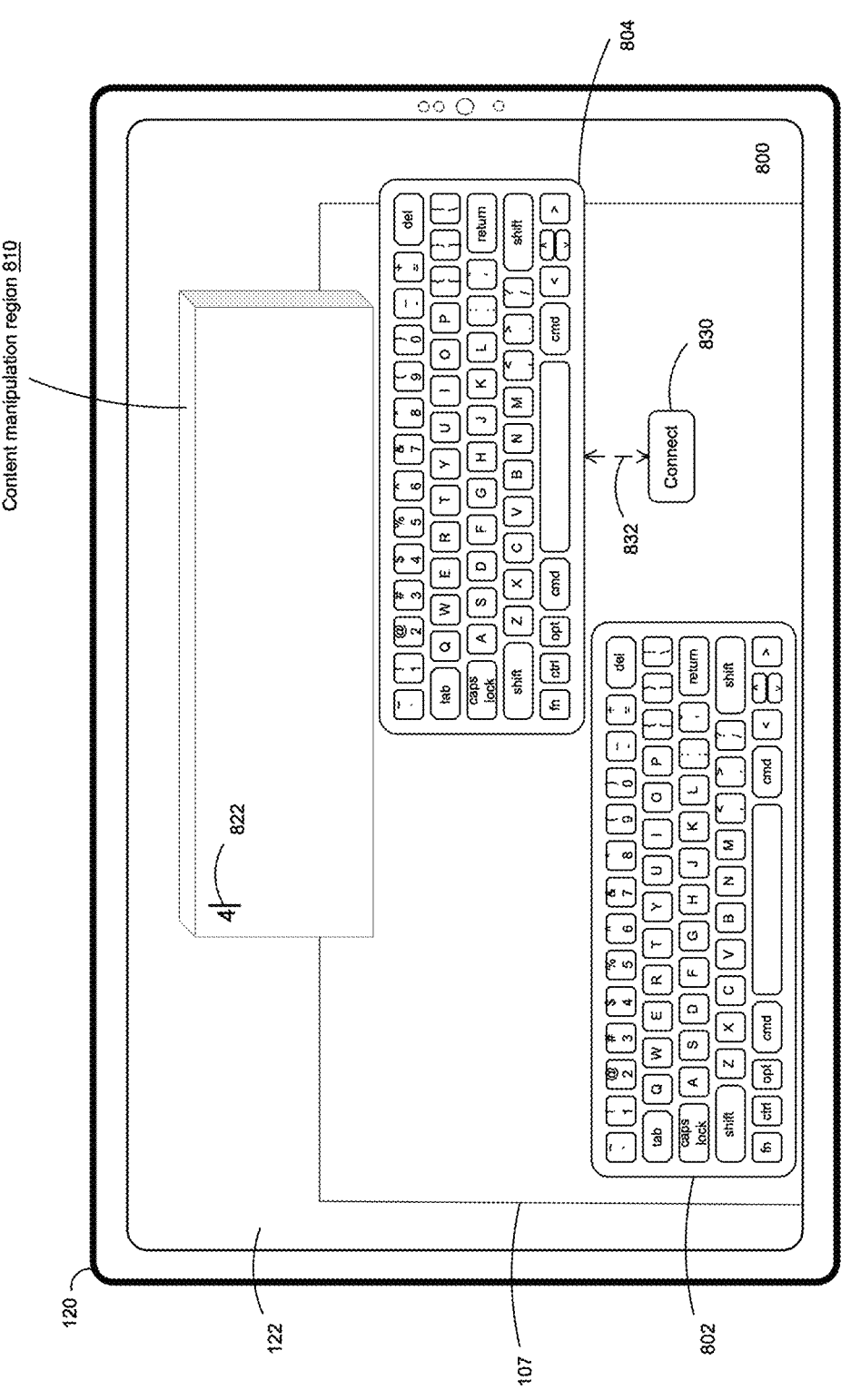

As illustrated in FIG. 8H, the electronic device 120 receives, via one or more input devices, a third user input 828 that is directed to the second keyboard device 804 within the 3D environment 800. For example, the third user input 828 corresponds to a gaze of a user that is directed to the second keyboard device 804, or an extremity of the user that is directed to the second keyboard device 804. In response to receiving the third user input 828 in FIG. 8H, the electronic device 120 displays a second pairing affordance 830 in FIG. 8I. The second pairing affordance 830 is world-locked to the second keyboard device 804. In some implementations, the second pairing affordance 830 is world-locked to a region or a specific point of the second keyboard device 804. For example, as illustrated in FIG. 8I, the second pairing affordance 830 is world-locked at a second fixed distance 832 from a point on the bottom edge of the second keyboard device 804. In order to maintain the second pairing affordance 830 as world-locked to the second keyboard device 804, the electronic device 120 moves the second pairing affordance 830 to an updated position on the display 122 based on detecting a change of a viewpoint of a user of the electronic device 120. In some implementations, as illustrated in FIG. 8I, in response to receiving the third user input 828, the electronic device 120 ceases to display the first paired indicator 820 and the first status indicator 824. In some implementations, in response to receiving the third user input 828, the electronic device 120 maintains display of the first paired indicator 820 and the first status indicator 824.

Figure 8J:
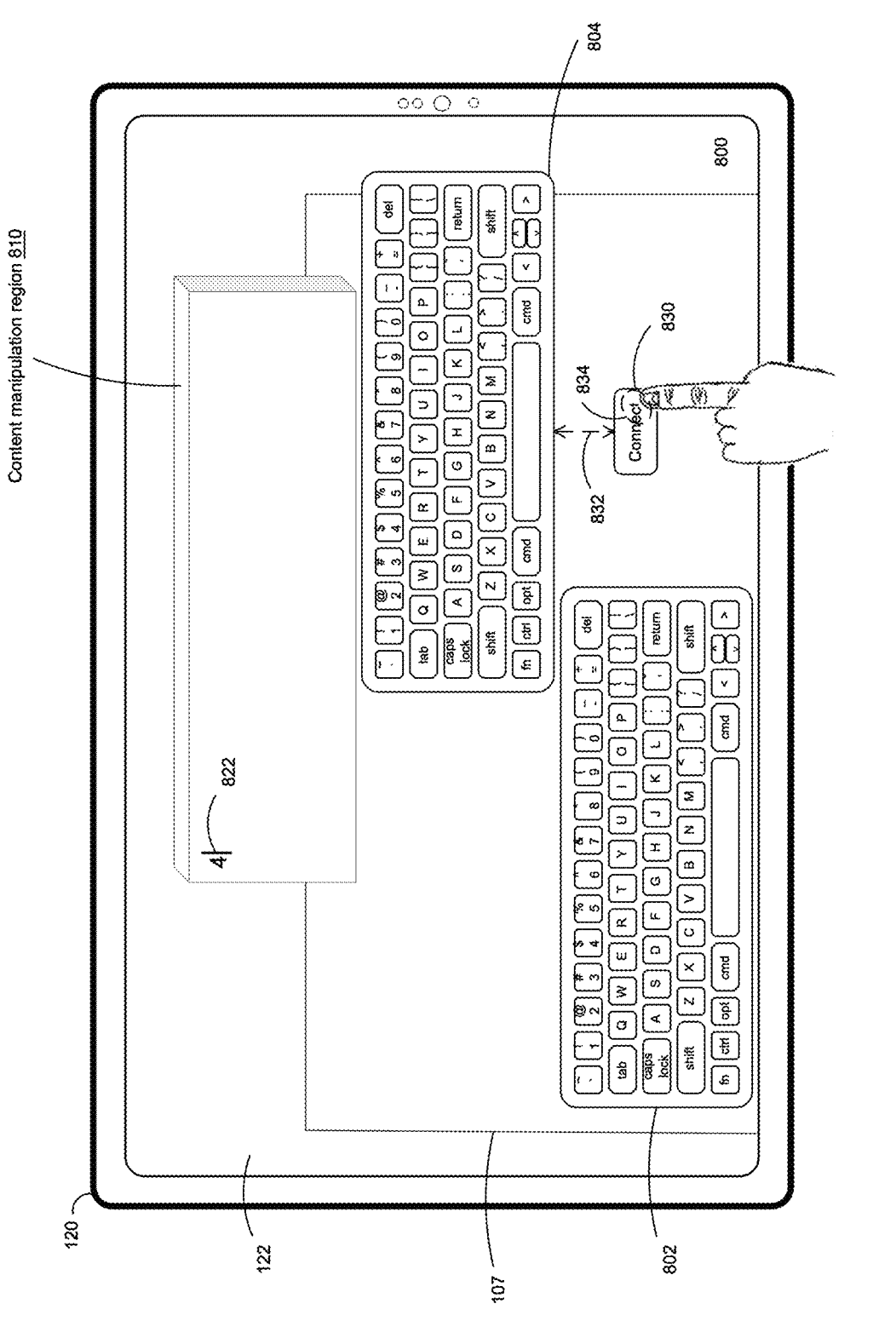
Figure 8K:
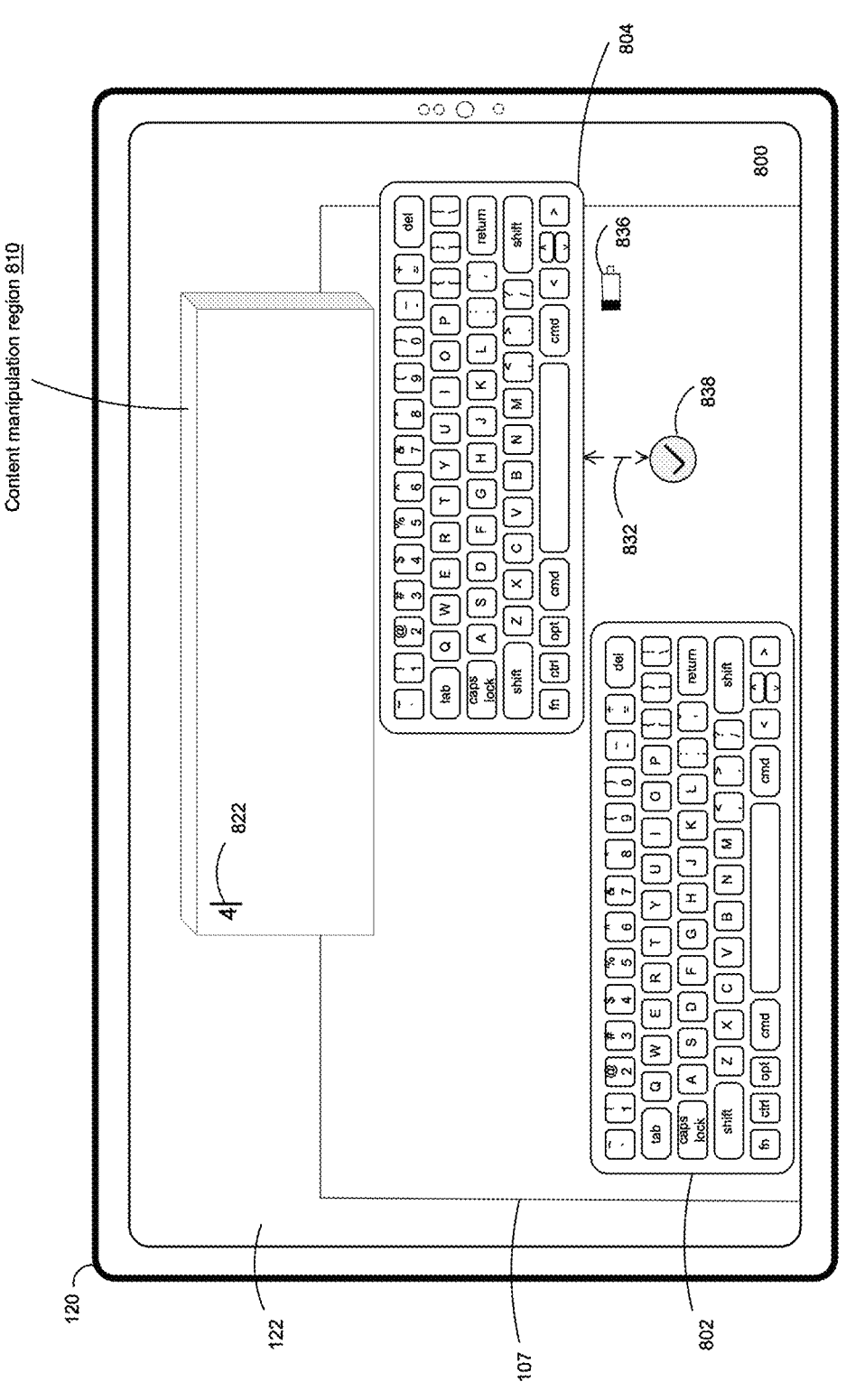

As illustrated in FIG. 8J, the electronic device 120 receives, via one or more input devices, a fourth user input 834 that is directed to the second pairing affordance 830. As illustrated in FIG. 8J, the fourth user input 834 corresponds to a finger of a user, which may be detected via a computer vision technique. However, one of ordinary skill in the art will appreciate that, in some implementations, the fourth user input 834 may correspond to a different input type that is directed to the second pairing affordance 830, such as a gaze input, physical object proximity input, etc. In response to receiving the fourth user input 834 in FIG. 8J, the electronic device 120 pairs the electronic device 120 with the second keyboard device 804 in FIG. 8K. Moreover, the electronic device 120 ceases pairing with the first keyboard device 802.

In some implementations, based on receiving the fourth user input 834, the electronic device 120 displays a second status indicator 836 indicating a status (e.g., current battery level) associated with the second keyboard device 804. The second status indicator 836 may be near and optionally world-locked to the second keyboard device 804, to indicate that the status is associated with the second keyboard device 804, and not associated with the first keyboard device 802.

Additionally, in some implementations, based on receiving the fourth user input 834, the electronic device 120 ceases to display the second pairing affordance 830, and displays a second paired indicator 838 indicating that the electronic device 120 is currently paired with the second keyboard device 804. For example, the second paired indicator 838 is near the second keyboard device 804 to indicate to a user that the electronic device 120 is paired with the second keyboard device 804, and not with the first keyboard device 802. In some implementations, the electronic device 120 replaces the second pairing affordance 830 with the second paired indicator 838, such as via an animation.

Figure 8L:
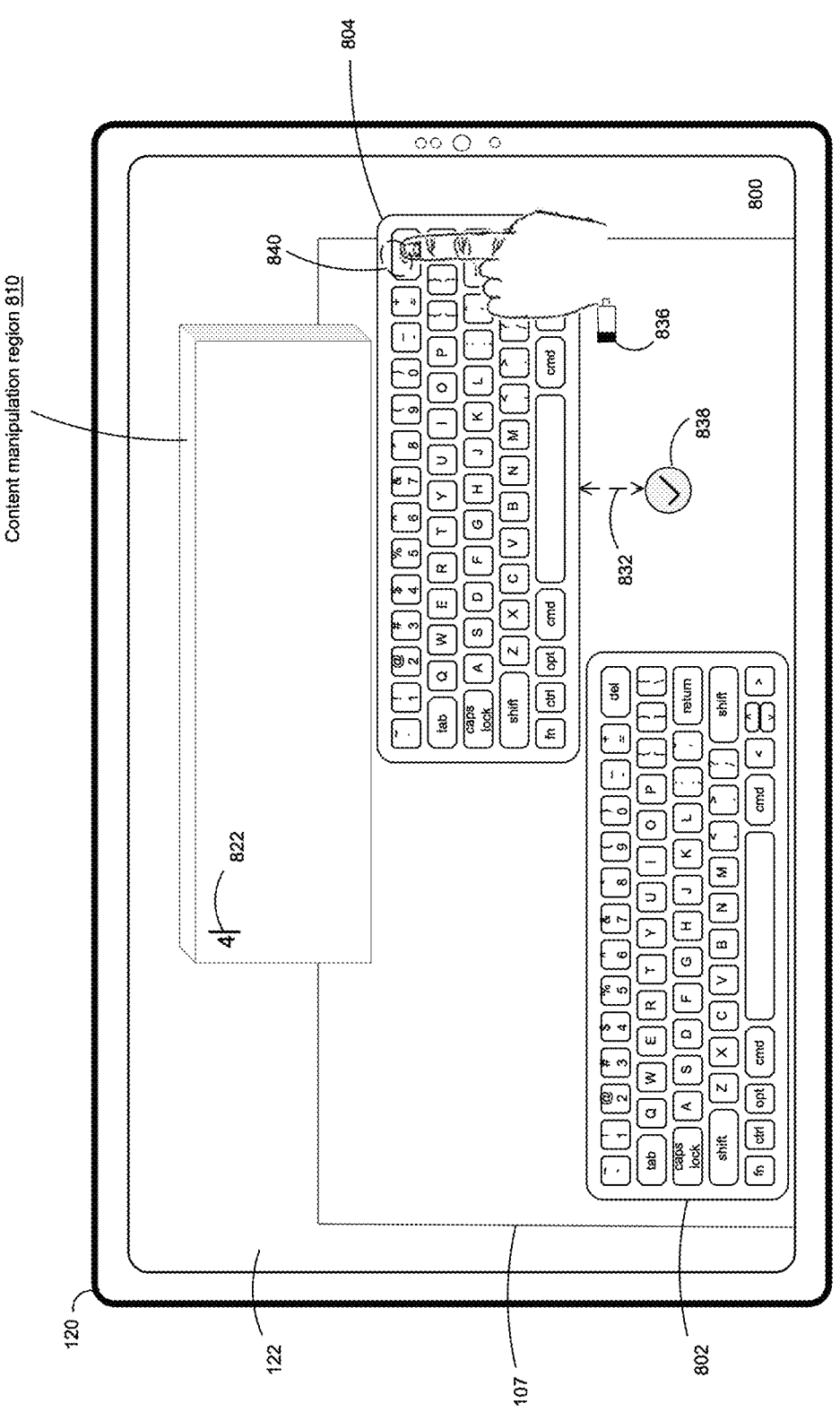
Figure 8M:
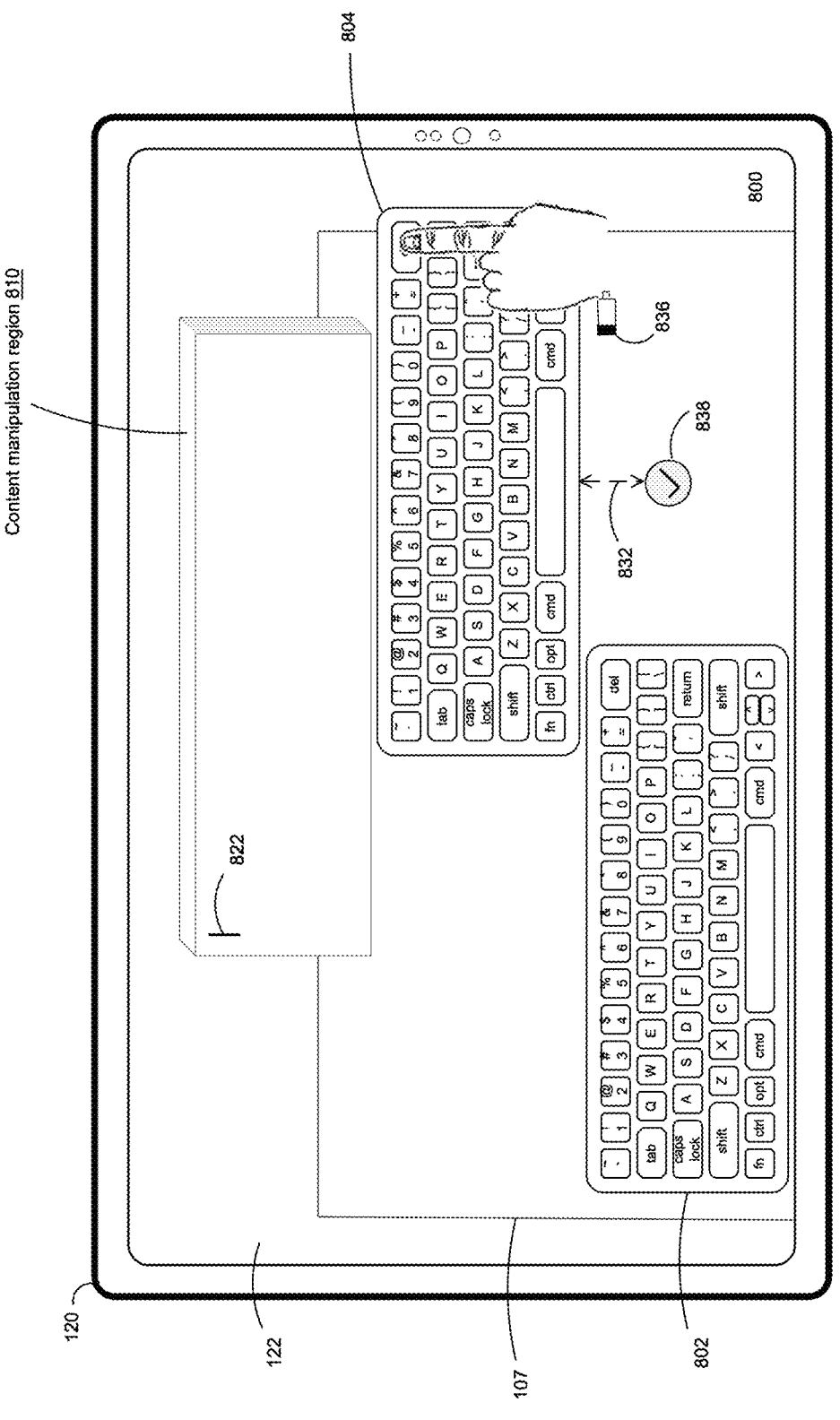

While the electronic device 120 is paired with the second keyboard device 804, the electronic device 120 receives sensor data from the second keyboard device 804. As illustrated in FIG. 8L, the electronic device 120 receives sensor data indicating a keypress 840 of the 'Delete' key of the second keyboard device 804. In response to receiving the sensor data, the electronic device 120 removes the '4' from the content manipulation region 810, and accordingly moves the cursor 822 leftwards, as illustrated in FIG. 8M.

Figure 9B:
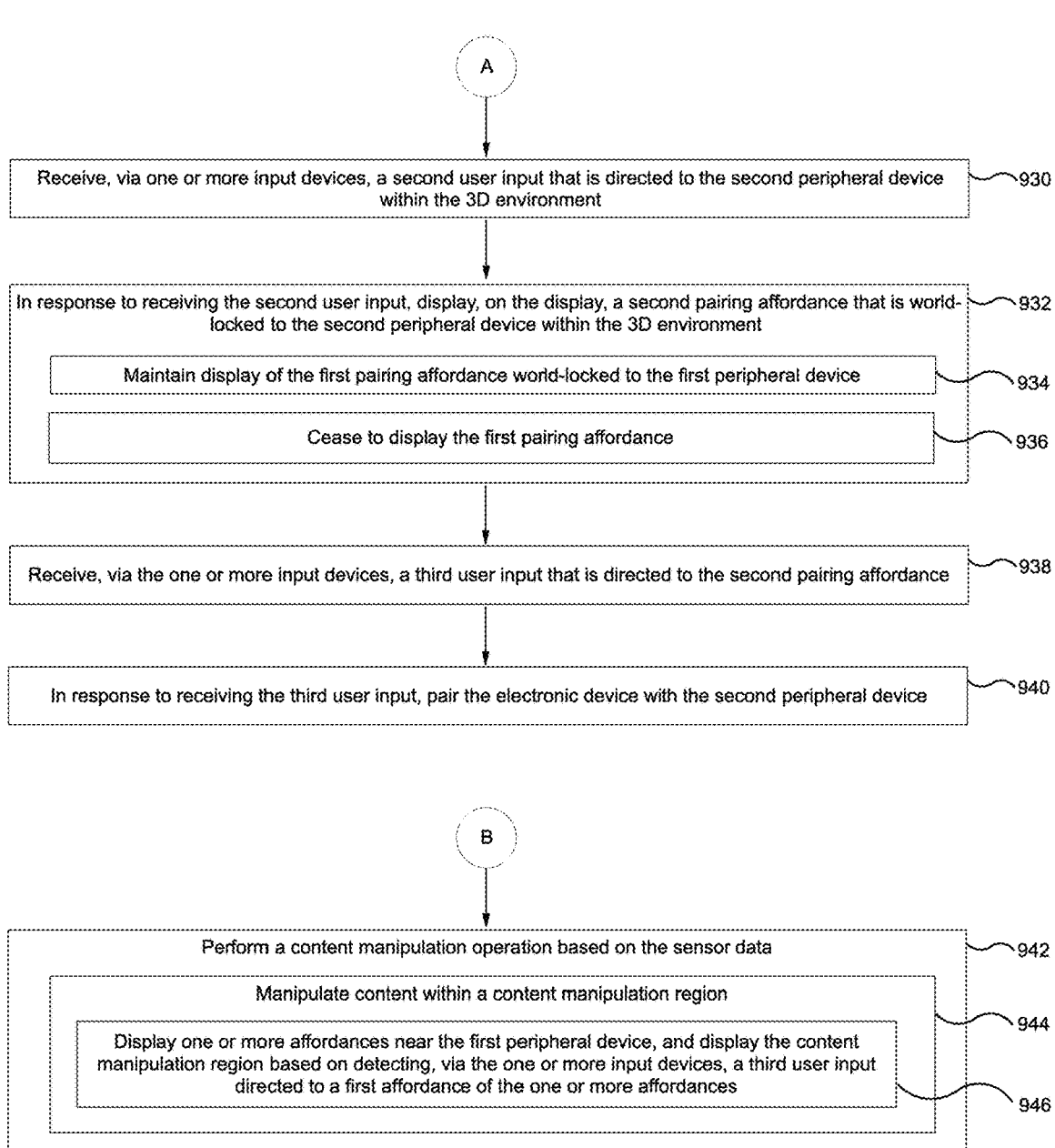

FIGS. 9A and 9B illustrate a flowchart representation of a method 900 of displaying one or more pairing affordances world-locked to respective peripheral devices in accordance with some implementations. In some implementations, the method 900 is performed at an electronic device (e.g., the electronic device 120 in FIGS. 7A-7M and/or FIGS. 8A-8M) with a non-transitory memory, one or more processors, a display, and one or more input devices. One example of the one or more input devices is an eye tracker that generates eye tracking data indicating a gaze (e.g., gaze position, focus point, point of regard, etc.) of a user within an XR environment. Another example of the one or more input devices is an extremity tracker that tracks an extremity (e.g., finger) of a user. In some implementations, the eye tracker and/or the extremity tracker perform a computer vision technique in order to identify an eye/extremity within image data. The image data may be generated by one or more image sensors (e.g., forward-facing camera or rear-facing camera), which are integrated in the electronic device.

Some operations in the method 900 are, optionally, combined and/or the order of some operations is, optionally, changed. In some implementations, the method 900 is performed by processing logic, including hardware, firmware, software, or a combination thereof. In some implementations, the method 900 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from one or more exterior-facing image sensors, a finger/hand/extremity tracking engine, an eye tracking engine, a touch-sensitive surface, and/or the like.

Pairing an electronic device with a peripheral device typically includes the electronic device receiving and processing a series of user inputs. Receiving and processing the series of user inputs is resource expensive for the electronic device and time consuming for the user. For example, based on receiving a first user input, the electronic device displays a pairing menu that includes options for pairing to currently available peripheral devices. Subsequently, based on receiving a second user input requesting pairing with a particular device, the electronic device initiates a pairing sequence with the particular peripheral device. The options listed in the pairing menu are not based on user engagement with a particular peripheral device, resulting in a degraded user experience. Moreover, the pairing menu is not spatially associated with a particular peripheral device, further degrading the user experience.

By contrast, various implementations disclosed herein include displaying a pairing affordance world-locked to a detected peripheral device, based on a user input directed to the peripheral device. The peripheral device may be detected via a computer vision technique. Display of the pairing affordance may be in response to receiving a user input that is directed to the peripheral device, such as a user gaze directed to the peripheral device. World-locking the pairing affordance to the peripheral device enables a more intuitive pairing process for the user. In some implementations, multiple pairing affordances are displayed as world-locked to respective peripheral devices.

By display a pairing affordance based on receiving an input (e.g., gaze) directed to a peripheral device, the electronic device provides a more intuitive process for pairing the electronic device with the peripheral device. For example, in contrast to other user interfaces that include a pairing menu for all currently pairable devices, the method 900 includes selectively displaying, based on an input directed to a particular peripheral device, a pairing affordance to initiate pairing with the particular peripheral device. Additionally, by foregoing displaying the pairing menu for all available pairable devices, the electronic device receives fewer inadvertent (e.g., not matching the user's intent) requests to pair with peripheral devices, reducing resource (e.g., processor) utilization by the electronic device. Moreover, because the pairing affordance is world-locked to the peripheral device, the pairing affordance is not persistently displayed, in contrast to a head-locked or display-locked pairing menu in other user interfaces. For example, when the electronic device turns sufficiently away from the peripheral device (e.g., the peripheral device is no longer within a field of view of an image sensor), the display ceases to include the pairing affordance, and instead the display includes other XR content.

Referring to FIG. 9A, as represented by block 902, the method 900 includes detecting a first peripheral device within a three-dimensional (3D) environment via a computer vision technique. The 3D environment may correspond to an XR environment. In some implementations, an electronic device includes the object tracking engine 410, which detects the first peripheral device. As another example, an electronic device includes an image sensor that captures image data of the 3D environment, and the electronic device identifies the first peripheral device within the image data, such as via per-pixel semantic segmentation. Examples of the first peripheral device includes a keyboard device, hand-held controller, stylus, etc. In some implementations, in response to detecting the first peripheral device, the method 900 includes displaying an indicator indicating the detection, such as a flashing boundary around the first peripheral device. As one example, with reference to FIG. 7B, the electronic device 120 detects the first keyboard device 701, based on image data from a camera having a field of view that includes the first keyboard device 701. Continuing with this example, the electronic device 120 may obtain one or more semantic values associated with the first keyboard device 701, such as "keyboard," "keyboard model xxx," etc. As represented by block 904, in some implementations, the first peripheral device corresponds to a keyboard device including a plurality of keys, such as the keyboard device 701 illustrated in FIGS. 7A-7M.

As represented by block 906, in some implementations, the method 900 includes detecting a second peripheral device within the 3D environment via the computer vision technique. For example, with reference to FIG. 8A, the electronic device 120 detects both the first keyboard device 802 and the second keyboard device 804. In some implementations, the method 900 includes detecting multiple peripheral devices within an image frame. In some implementations, the method 900 includes detecting multiple peripheral devices across a sequence of image frames.

As represented by block 908, the method 900 includes receiving, via one or more input devices, a first user input that is directed to the first peripheral device within the 3D environment. As one example, with reference to FIG. 7F, the electronic device 120 receives, via one or more input devices, a second user input 708 that is directed to the peripheral device 701 within the 3D environment. In some implementations, an electronic device determines that the first user input is directed to the first peripheral device based on determining that a spatial position (e.g., line of sight) associated with the first user input is less than a threshold distance from the first peripheral device.

In some implementations, as represented by block 910, the one or more input devices includes an eye tracker that generates eye tracking data, wherein receiving the first user input includes receiving the eye tracking data. The eye tracking data indicates a gaze that is directed to the first peripheral device. In some implementations, the gaze is directed to the first peripheral device for at least a threshold amount of time. In some implementations, the eye tracker includes the eye tracking engine 412.

In some implementations, the one or more input devices includes an extremity tracker that generates extremity tracking data associated with an extremity (e.g., finger) of a user. For example, the extremity tracking data indicates that the extremity is directed to the first peripheral device. In some implementations, the extremity tracker includes the body/head pose tracking engine 414, which performs the extremity tracking.

In some implementations, the one or more input devices includes a communication interface that receives sensor data from a controller (e.g., a stylus), such as IMU data from an IMU sensor integrated within the controller. Based on the sensor data and optionally based on computer vision data characterizing the position of the controller, an electronic device determines that the current position of the controller is directed to the first peripheral device.

As represented by block 912, the method 900 includes, in response to receiving the first user input, displaying, on a display, a first pairing affordance that is world-locked to the first peripheral device within the 3D environment. As one example, in response to receiving the second user input 708 directed to the peripheral device 701 in FIG. 7F, the electronic device 120 displays the pairing affordance 710 that is world-locked to the peripheral device 701. The first pairing affordance enables pairing with the first peripheral device. In some implementations, the first pairing affordance is a world-locked object that is locked to a volumetric region or a specific point of a particular physical environment, which corresponds to a position of the first peripheral device. In some implementations, the method 900 includes foregoing display of a pairing affordance based on determining that the first user input is directed to a peripheral device that is not pairable with an electronic device.

As represented by block 914, in some implementations, the method 900 includes detecting a physical surface associated with the first peripheral device (e.g., a physical surface on which the first peripheral device is resting), wherein displaying the first pairing affordance world-locked to the first peripheral device includes displaying the first pairing affordance as substantially parallel with respect to the physical surface. As one example, with reference to FIG. 7B, in addition to detecting the peripheral device 701, the electronic device 120 detects a surface of table 107 on which the peripheral device 701 sits. Continuing with this example, with reference to FIG. 7G, the electronic device 120 displays the pairing affordance 710 world-locked to the peripheral device 701 and substantially parallel with respect to the surface of the table 107. In some implementations, the method 900 includes detecting the physical surface via the computer vision technique, such as via a plane detection technique. In some implementations, displaying the first pairing affordance as substantially parallel with respect to the physical surface includes overlaying the first pairing affordance onto the physical surface.

According to various implementations, in order to world-lock the first pairing affordance to the first peripheral device, the method 900 includes moving the first pairing affordance on the display based on a change of a viewpoint of a user of an electronic device. To that end, as represented by block 916, the method 900 includes detecting the change of the viewpoint of the user of the electronic device. In some implementations, detecting the change of the viewpoint is based on rotational data or angular velocity data from an IMU. In some implementations, detecting the change of the viewpoint is additionally or alternatively based image data, such as based on differences in content within a first image frame and within a second image frame. Moreover, as represented by block 918, in response to detecting the change of the viewpoint of the user of the electronic device, the method 900 includes moving the first pairing affordance from a first position to a second position on the display in order to maintain the first pairing affordance as world-locked to the first peripheral device.

As one example, with reference to FIG. 7G, the electronic device 120 initially displays the pairing affordance 710 at a first position on the display 122, wherein the first position is directly above (e.g., higher y value) the left side of the '1' key of the keyboard device 701. Based on detecting the tilt 714 in FIG. 7H, the electronic device 120 moves the pairing affordance 710 from the first position to a second position on the display 122, wherein the second position is also directly above the left side of the '1' key of the keyboard device 701. The second position on the display 122 is to the right of the first position on the display 122.

As represented by block 920, in some implementations, the method 900 includes receiving, via the one or more input devices, a second user input that is directed to the first pairing affordance. As one example, with reference to FIG. 7J, the electronic device 120 receives the third user input 716 directed to the pairing affordance 710, wherein the third user input 716 corresponds to a finger of a hand of a user. To that end, in some implementations, the method 900 includes performing computer vision with respect to image data in order to identify a position of a finger; and determining whether or not the position of the finger is sufficiently close to the first pairing affordance. In some implementations, the second user input includes a gesture of the finger that is sufficiently close to the first pairing affordance, such as a pinch gesture that terminates within the first pairing affordance. As another example, the second user input corresponds to a gaze of a user directed to the first pairing affordance. As yet another example, the second user input includes a combination of an extremity directed to the first pairing affordance, and a gaze directed to the first pairing affordance. Accordingly, in some implementations, the method 900 includes preventing a user from inadvertently selecting the first pairing affordance when the user's finger is near the first pairing affordance, but the user's gaze is directed away from the first pairing affordance.

As represented by block 922, in some implementations, the method 900 includes, in response to receiving the second user input, pairing the electronic device with the first peripheral device. For example, in response to receiving the third user input 716 directed to the pairing affordance 710 in FIG. 7J, the electronic device 120 pairs the electronic device 120 with the peripheral device 701 in FIG. 7K. In some implementations, in response to pairing the electronic device with the first peripheral device, the method 900 includes replacing the first pairing affordance with a paired indicator, such as replacing (optionally with an animation) the pairing affordance 710 in FIG. 7J with the paired indicator 718 in FIG. 7K. The paired indicator 718 indicates that the electronic device 120 is currently paired with the peripheral device 701.

In some implementations, in further response to receiving the second user input directed to the first pairing affordance, the method 900 includes displaying one or more application affordances (e.g., the application affordance(s) 702a-702d in FIG. 7K). For example, each of the application affordance(s) is associated with a respective application. In some implementations, selection of a particular application affordance results in display of a corresponding content manipulation region. For example, when the particular application affordance is associated with a drawing application, the corresponding content manipulation region includes a drawing canvas and drawing tool affordances (e.g., pencil affordance, eraser affordance, etc.), which facilitate drawing operations on the drawing canvas.

As represented by block 924, in some implementations, the method 900 includes, in response to pairing the electronic device with the first peripheral device, displaying one or more status indicators associated with the first peripheral device and/or displaying a computer-generated representation of a numeric keypad. The status indicator and/or the computer-generated representation of the numeric keypad may be world-locked to the first peripheral device.

For example, the status indicator indicates a current battery level of the first peripheral device, such as the battery level indicator 722 illustrated in FIG. 7K. Other examples of a status indicator include a charging state indicator, information regarding the first peripheral device (e.g., model number, version number), and/or the like.

The computer-generated representation of the numeric keypad may emulate a 17-key section of a standard physical keyboard, which often corresponds to the far-right portion of the physical keyboard. An example of the computer-generated representation of the numeric keypad is the virtual numpad 572 illustrated in FIGS. 5H-5J. According to various implementations, selection of a key of the computer-generated representation of the numeric keypad results in a corresponding content manipulation operation.

As represented by block 926, in some implementations, while the electronic device is paired with the first peripheral device, the method 900 includes receiving, via a communication interface, sensor data from the first peripheral device. To that end, in some implementations, an electronic device includes a communication interface, such as a Bluetooth interface, Wi-Fi interface, NFC interface, etc. As represented by block 928, in some implementations, sensor data indicates a first keypress of a first key of the plurality of keys of the keyboard device. For example, with reference to FIG. 7L, the sensor data indicates the keypress 724 of the '2' key of the keyboard device 701. In some implementations, the sensor data includes finger manipulation data from a stylus. For example, the finger manipulation data indicates a gesture (e.g., swipe, tap, double tap) performed on the stylus. As another example, the sensor data indicates a hard press of a button of a controller.

Turning to FIG. 9B, as represented by block 930, in some implementations, the method 900 includes receiving, via the one or more input devices, a second user input that is directed to the second peripheral device within the 3D environment. For example, the second user input corresponds to a gaze of a user that is directed to the second peripheral device. As another example, the second user input corresponds to an extremity of a user that is directed to the second peripheral device. In some implementations, the second user input is directed to the second peripheral device for at least a threshold amount of time. As one example, the first user input 812 is directed to the first keyboard device 802 in FIG. 8B, and the third user input 828 is directed to the second keyboard device 804 in FIG. 8H.

As represented by block 932, in some implementations, in response to receiving the second user input, the method 900 includes displaying a second pairing affordance that is world-locked to the second peripheral device within the 3D environment. Continuing with the previous example, in response to third user input 828 in FIG. 8H, the electronic device 120 displays the second pairing affordance 830 that is word-locked to the second peripheral device 804 in FIG. 8I.

As represented by block 934, in some implementations, the method 900 includes maintaining display of the first pairing affordance world-locked to the first peripheral device while displaying the second pairing affordance world-locked to the second peripheral device. For example, the method 900 includes concurrently displaying the first and second pairing affordances world-locked to respective peripheral devices. Continuing with this example, based on detecting a change of a viewpoint of a user of an electronic device (e.g., a positional change of the electronic device), the method 900 includes moving the first and second pairing affordances to different positions on the display, in order to maintain the first and second pairing affordances as world-locked to the respective peripheral devices. As one example, based on detecting the change of the viewpoint of the user, the method 900 includes moving the first pairing affordance from a first position on the display to a second position on the display, and moving the second pairing affordance from a third position on the display to a fourth position on the display, in order to maintain the first and second pairing affordances world-locked to the respective peripheral devices.

In some implementations, based on detecting selection of a particular pairing affordance (e.g., the first pairing affordance), the method 900 includes pairing an electronic device with a corresponding peripheral device (e.g., the first peripheral device), and ceasing to display other pairing affordances (e.g., the second pairing affordance).

As represented by block 936, in some implementations, the method 900 includes, in response to receiving the second user input directed to the second peripheral device, ceasing to display the first pairing affordance. In some implementations, the method 900 includes, in response to receiving the second user input directed to the second peripheral device, ceasing to display a paired indicator and a status indicator. For example, with reference to FIGS. 8H and 8I, in response to detecting the third user input 828 directed to the second keyboard device 804, the electronic device 120 ceases to display the first paired indicator 820 and the first status indicator 824 that are associated with the first peripheral device 802.

As represented by block 938, in some implementations, the method 900 includes receiving, via the one or more input devices, a third user input that is directed to the second pairing affordance. The third user input may correspond to a gaze input, extremity input, etc. For example, the electronic device 120 receives the fourth user input 834 that is directed to the second pairing affordance 830, as illustrated in FIG. 8J. As represented by block 940, in some implementations, in response to receiving the third user input, the method 900 includes pairing the electronic device with the second peripheral device. For example, based on receiving the fourth user input in FIG. 8J, the electronic device 120 pairs the electronic device 120 with the second peripheral device 804, as indicated by the second paired indicator 838 illustrated in FIG. 8K. In some implementations, in further response to receiving the third user input directed to the second pairing affordance, the method 900 includes canceling pairing with the first peripheral device, which was previously paired via the first pairing affordance.

As represented by block 942, in some implementations, the method 900 includes performing a content manipulation operation based on the sensor data. For example, while the electronic device is paired with a peripheral device, the electronic device receives sensor data from the peripheral device and performs a content manipulation operation based on the sensor data. The content manipulation operation may correspond to any type of content manipulation type, such as adding content, removing content, moving content, resizing content, etc. In some implementations, the content manipulation operation includes a navigational operation, such as scrolling through a menu. In some implementations, the content manipulation operation includes selecting a particular drawing tool affordance.

As represented by block 944, in some implementations, the method 900 includes, while the electronic device is paired with the first peripheral device, displaying a content manipulation region on the display, wherein performing the content manipulation operation includes manipulating content within the content manipulation region. For example, based on receiving sensor data indicating the keypress 724 of the '2' key of the keyboard device 701 in FIG. 7L, the electronic device 120 displays, within the first content manipulation region 706, textual content corresponding to '2' in FIG. 7M. The content manipulation region may be associated with a particular application, such as a web browser application, text editing application, drawing application, etc. In some implementations, the content manipulation region is substantially rectangular, so as to mimic an application window.

As represented by block 946, in some implementations, displaying the content manipulation region is in response to detecting a third user input directed to a first application affordance that is associated with the content manipulation region. For example, as illustrated in FIGS. 7B and 7C, in response to detecting the peripheral device 701, the electronic device 120 displays the application affordance(s) 702a-702d near the peripheral device 701. Continuing with this example, the electronic device 120 detects the first user input 704 that is directed to the first application affordance 702a, as illustrated in FIG. 7D, and accordingly displays the first content manipulation region 706 in FIG. 7E. Continuing with this example, the first application affordance 702a and the first content manipulation region 706 are associated with a common application. In some implementations, the application affordance(s) 702a-702d are world-locked to the peripheral device 701.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device including a non-transitory memory, one or more processors, a display, and one or more input devices:
detecting a first peripheral device at a first location within a three-dimensional (3D) environment via a computer vision technique;
after detecting the first peripheral device at the first location, receiving, via the one or more input devices, a first user input that is directed to the first location within the 3D environment;
in response to receiving the first user input that is directed to the first location within the 3D environment, displaying, on the display, a first pairing affordance that is world-locked to the first peripheral device within the 3D environment;
after displaying the first pairing affordance that is world-locked to the first peripheral device within the 3D environment, receiving, via the one or more input devices, a second user input that indicates that attention of the user is directed away from the first location within the 3D environment; and
in response to receiving the second user input that indicates that attention of the user is directed away from the first location within the 3D environment, ceasing to display the first pairing affordance that is world-locked to the first peripheral device within the 3D environment.

2. The method of claim 1, wherein the one or more input devices includes an eye tracker, wherein receiving the first user input includes receiving first eye tracking data from the eye tracker, wherein the first eye tracking data indicates a first gaze that is directed to the first peripheral device, and wherein receiving the second user input includes receiving second eye tracking data that indicates a second gaze that is directed away from the first peripheral device.

3. The method of claim 1, further comprising:
after ceasing to display the first pairing affordance, receiving, via the one or more input devices, a third user input that is directed to the first location within the 3D environment;
in response to receiving the third user input, redisplaying, on the display, the first pairing affordance;
receiving, via the one or more input devices, a fourth user input that is directed to the first pairing affordance; and
in response to receiving the fourth user input, pairing the electronic device with the first peripheral device.

4. The method of claim 3, further comprising, in response to pairing the electronic device with the first peripheral device, displaying, on the display, a status indicator that is associated with the first peripheral device.

5. The method of claim 3, further comprising, in response to pairing the electronic device with the first peripheral device, displaying, on the display, a computer-generated representation of a numeric keypad near the first peripheral device.

6. The method of claim 3, wherein the electronic device includes a communication interface provided to communicate with the first peripheral device while the electronic device is paired with the first peripheral device.

7. The method of claim 6, further comprising, while the electronic device is paired with the first peripheral device:
receiving, via the communication interface, sensor data from the first peripheral device; and
performing a content manipulation operation based on the sensor data.

8. The method of claim 7, wherein the first peripheral device corresponds to a keyboard device including a plurality of keys, wherein the sensor data indicates a first keypress of a first key of the plurality of keys.

9. The method of claim 7, further comprising, while the electronic device is paired with the first peripheral device, displaying a content manipulation region on the display, and wherein performing the content manipulation operation includes manipulating content within the content manipulation region.

10. The method of claim 9, further comprising displaying, on the display, one or more application affordances near the first peripheral device, wherein displaying the content manipulation region is in response to detecting, via the one or more input devices, a fifth user input directed to a first application affordance of the one or more application affordances.

11. The method of claim 1, wherein displaying the first pairing affordance world-locked to the first peripheral device includes displaying the first pairing affordance at a first position on the display, the method further comprising:
detecting a change of a viewpoint of a user of the electronic device; and
in response to detecting the change of the viewpoint of the user of the electronic device, moving the first pairing affordance from the first position to a second position on the display in order to maintain the first pairing affordance world-locked to the first peripheral device.

12. The method of claim 1, further comprising detecting a physical surface associated with the first peripheral device, wherein displaying the first pairing affordance world-locked to the first peripheral device includes displaying the first pairing affordance as substantially parallel with respect to the physical surface.

13. The method of claim 1, further comprising:
detecting a second peripheral device at a second location within the 3D environment via the computer vision technique, wherein the second user input that indicates that attention of the user is directed away from the first location within the 3D environment is directed to the second peripheral device at the second location within the 3D environment, and wherein ceasing to display the first pairing affordance that is world-locked is based on the second user input is directed to the second peripheral device at the second location within the 3D environment; and in response to receiving the second user input, displaying, on the display, a second pairing affordance that is world-locked to the second peripheral device within the 3D environment.

14. The method of claim 13, further comprising:

receiving, via the one or more input devices, a third user input that is directed to the second pairing affordance; and in response to receiving the third user input, pairing the electronic device with the second peripheral device.

15. The method of claim 1, wherein the second user input that indicates that attention of the user is directed away from the first location within the 3D environment causes the first peripheral device to exit a field of view of an image sensor.

16. The method of claim 1, wherein the second user input includes a combination of an extremity directed to the first pairing affordance with a gaze directed away from the first pairing affordance.

17. An electronic device comprising:

one or more processors;

a non-transitory memory;

a display;

one or more input devices; and one or more programs, wherein the one or more programs are stored in the non-transitory memory and configured to be executed by the one or more processors, the one or more programs including instructions for:

detecting a first peripheral device at a first location within a 3D environment via a computer vision technique;

after detecting the first peripheral device at the first location, receiving, via the one or more input devices, a first user input that is directed to the first location within the 3D environment;

in response to receiving the first user input that is directed to the first location within the 3D environment, displaying, on the display, a first pairing affordance that is world-locked to the first peripheral device within the 3D environment;

after displaying the first pairing affordance that is world-locked to the first peripheral device within the 3D environment, receiving, via the one or more input devices, a second user input that indicates that attention of the user is directed away from the first location within the 3D environment; and in response to receiving the second user input that indicates that attention of the user is directed away from the first location within the 3D environment, ceasing to display the first pairing affordance that is world-locked to the first peripheral device within the 3D environment.

18. The electronic device of claim 17, wherein the one or more programs include instructions for:

after ceasing to display the first pairing affordance, receiving, via the one or more input devices, a third user input that is directed to the first location within the 3D environment;

in response to receiving the third user input, redisplaying, on the display, the first pairing affordance;

receiving, via the one or more input devices, a fourth user input that is directed to the first pairing affordance; and in response to receiving the fourth user input, pairing the electronic device with the first peripheral device.

19. The electronic device of claim 18, wherein the one or more programs include instructions for, while the electronic device is paired with the first peripheral device:

receiving, via a communication interface, sensor data from the first peripheral device; and performing a content manipulation operation based on the sensor data.

20. A non-transitory computer readable storage medium storing one or more programs, the one or more programs comprising instructions, which, when executed by an electronic device with one or processors, a display, and one or more input devices, cause the electronic device to:

detect a first peripheral device at a first location within a 3D environment via a computer vision technique;

after detecting the first peripheral device at the first location, receive, via the one or more input devices, a first user input that is directed to the first location within the 3D environment;

in response to receiving the first user input that is directed to the first location within the 3D environment, display, on the display, a first pairing affordance that is world-locked to the first peripheral device within the 3D environment;

after displaying the first pairing affordance that is world-locked to the first peripheral device within the 3D environment, receiving, via the one or more input devices, a second user input that indicates that attention of the user is directed away from the first location within the 3D environment; and in response to receiving the second user input that indicates that attention of the user is directed away from the first location within the 3D environment, ceasing to display the first pairing affordance that is world-locked to the first peripheral device within the 3D environment.

* * * * *